United States Patent [19]

Morgrey

[11] Patent Number: 5,158,493
[45] Date of Patent: Oct. 27, 1992

[54] REMOTE CONTROLLED, MULTI-LEGGED, WALKING ROBOT

[76] Inventor: Richard Morgrey, 1489 Valley View Dr., Mount Vernon, Wash. 98273

[21] Appl. No.: 707,770

[22] Filed: May 30, 1991

[51] Int. Cl.⁵ .................... A63H 11/18; B62D 57/02
[52] U.S. Cl. .................... 446/355; 446/279; 180/8.6; 901/1
[58] Field of Search ............ 446/285, 293, 294, 355, 446/356, 276; 180/8.6, 8.1, 8.5; 901/1

[56] References Cited

U.S. PATENT DOCUMENTS

| | | | |
|---|---|---|---|
| 1,800,874 | 4/1931 | Savage | 446/355 |
| 3,421,258 | 1/1969 | Gardel et al. | 446/355 X |
| 3,425,154 | 2/1969 | Lindsay et al. | 446/355 |

FOREIGN PATENT DOCUMENTS 143266  6/1986  Japan ..................... 180/8.6

*Primary Examiner*—Mickey Yu
*Attorney, Agent, or Firm*—J. Robert Cassidy

[57] ABSTRACT

A robotic biped, quadruped or the like including a skeletal frame having right and left leg/foot assemblies, skeletal structure interconnecting the right and left leg/foot assemblies with freedom for movement relative to one another in respective ones of spaced parallel vertical planes and with one leg/foot assembly leading the other when both are firmly planted on the ground, right and left leg actuating mechanisms for raising and advancing respective ones of the left and right leg/foot assemblies mounted on respective ones of the right and left leg/foot assemblies, a remotely operable motor/-transmission carried by the skeletal frame with freedom for right-to-left and left-to-right translation into the one of the right and left spaced parallel vertical planes containing the leading ground-engaged leg/foot assembly, a clutch or coupling mechanism for coupling the motor/transmission to the one of the right and left actuating mechanisms mounted on the leading one of the ground-engaged right and left leg/foot assemblies so as to cause the other trailing leg/foot assembly to be raised off the ground, advanced, and replanted on the ground in advance of the one initially leading leg/foot assembly, and a transfer mechanism for uncoupling the motor/transmission from the one actuating mechanism when the other initially trailing leg/foot assembly is replanted on the ground in advance of the initially leading, now trailing, one leg/foot assembly and shifting the motor/transmission laterally into the other of the right and left spaced parallel vertical planes.

21 Claims, 21 Drawing Sheets

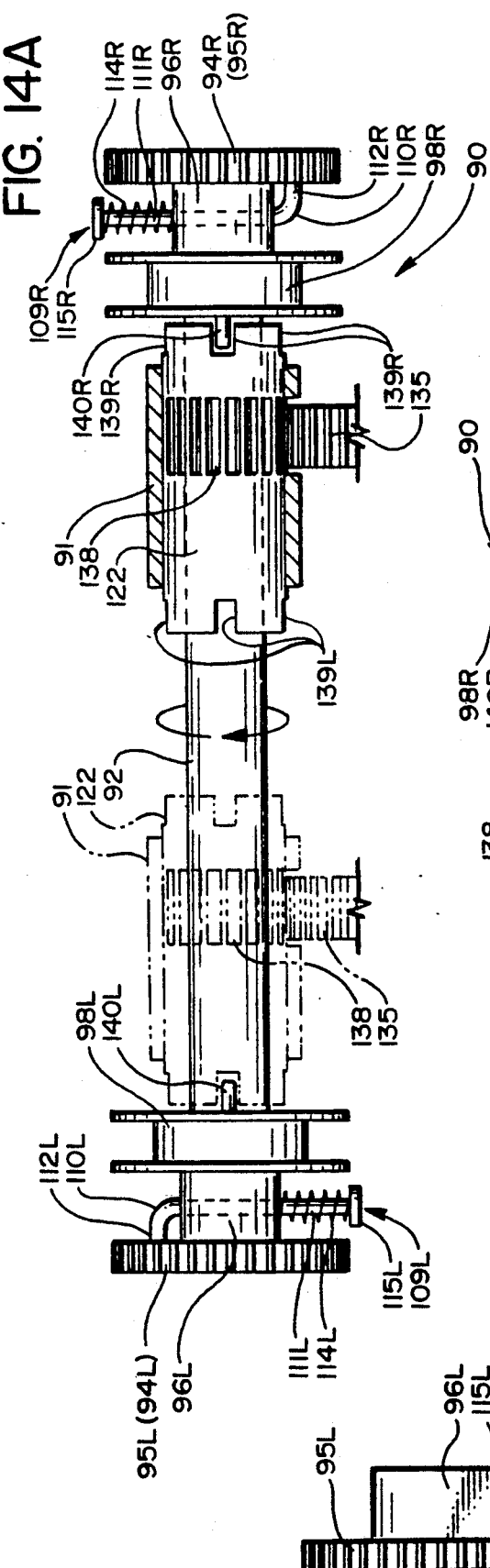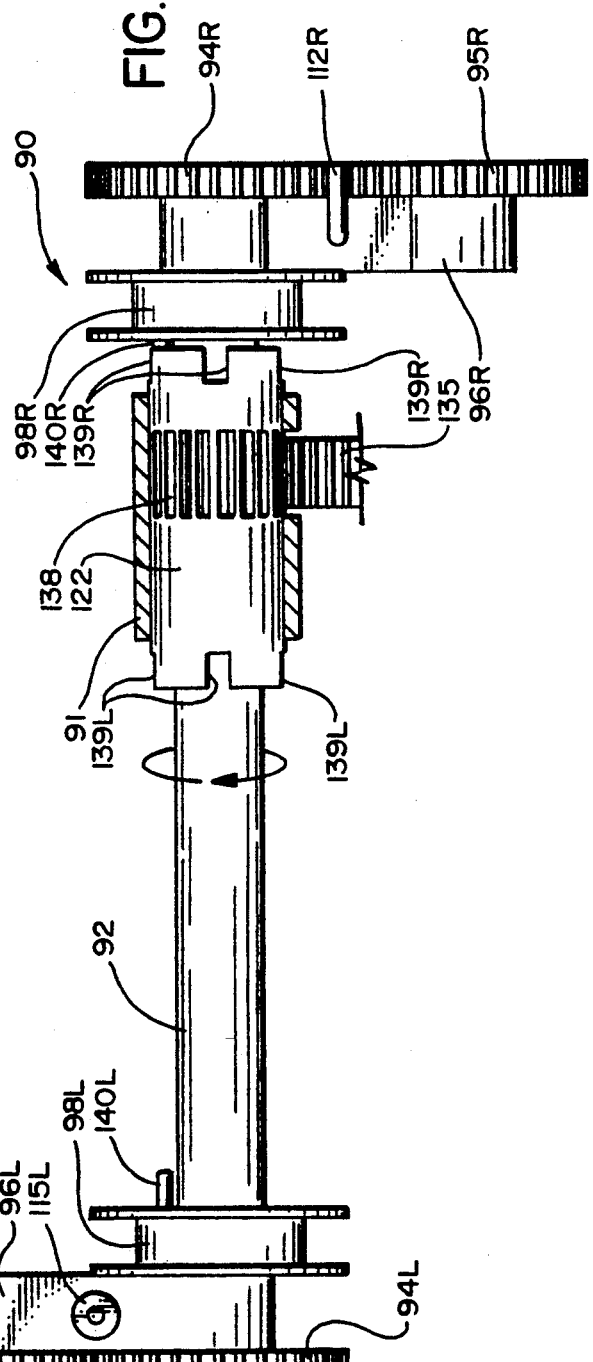

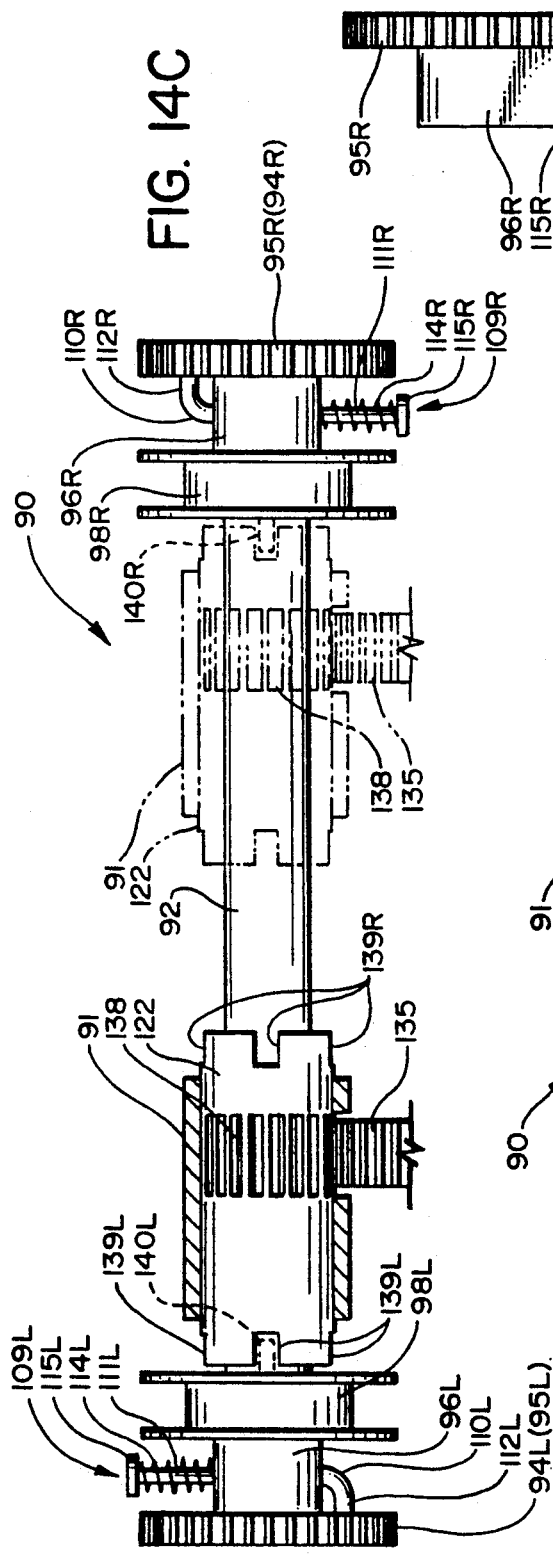
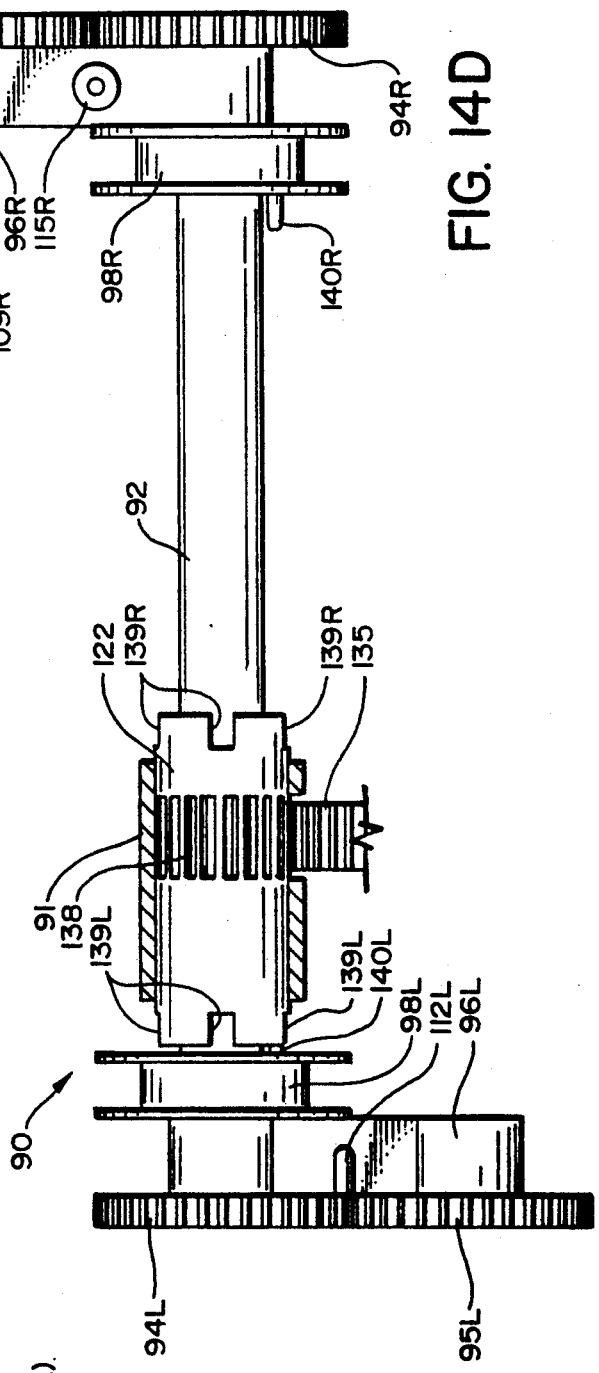

REMOTE CONTROLLED, MULTI-LEGGED, WALKING ROBOT

TECHNICAL FIELD

The present invention relates generally to remote controlled robots; and, more particularly, to robots characterized by their ability to walk without requiring driven tracks or wheels, and to turn either to the left or to the right through any desired angle ranging from 0° to 360°.

More specifically, the present invention relates to robotic mechanisms and methods of controlling multi-legged robots via remotely transmitted radio signals which enable the robot to: i) raise a first foot off the ground when the robot's center of gravity is located substantially in a vertical plane containing the robot's ground-engaged second foot; ii) swing the raised first foot forwardly and downwardly into engagement with the ground at a point advanced with respect to its second foot; iii) shift its center of gravity laterally to a point located in substantially a vertical plane containing the robot's previously advanced first foot; iv) raise the second, now rearwardly disposed, foot off the ground; v) swing the raised second foot forwardly and downwardly into ground-engaging contact at a position advanced with respect to the previously advanced first foot; vi) alternately shift its center of gravity in opposite lateral directions and to alternately lift the robot's left and right feet and swing the alternately lifted feet forwardly and downwardly to simulate walking movement; and vii), turn, either to the left or to the right, through any desired angle when one foot containing a ground-engaging turning mechanism is firmly planted on the ground.

BACKGROUND ART

Despite the ever-increasing trend toward the manufacture and distribution of highly sophisticated automated toys and the like, the field of robotics—particularly, robots intended to simulate the movement of humans, humanoids, animals, alien beings, and the like—has remained essentially devoid of any robotic mechanism capable of actually walking and/or turning in a manner similar to that of the particular entity or creature being simulated. There are, on the other hand, highly sophisticated robotic mechanisms capable of efficiently simulating the movement of fingers, hands and arms with a high degree of accuracy; but, while efforts have been directed towards simulated walking and/or turning, the problem of balance has apparently been so resistant to solution, that most robots available in the marketplace today employ wheels and/or continuously driven tracks to enable the robot to move over the ground by rolling or gliding.

Nevertheless, while most robots available in the marketplace today employ wheels and/or tracks to permit movement over the ground, the prior art is replete with long-standing efforts to provide a robot capable of walking. As evidence.. of this fact, attention is directed to U.S. Pat. No. 335,302 issued to Peloubet in 1886—viz., more than one hundred years ago—wherein a two-legged walking doll, or biped, is disclosed in which the doll's balance is maintained by providing left and right feet which are of sufficient width that the doll's center of gravity is disposed above the supporting foot at all times.

In U.S. Pat. No. 882,403 issued to Mikolasek in 1908, a walking toy biped is disclosed wherein the toy's left and right legs are alternately raised and lowered by a crank assembly; and, in order to maintain the toy's balance, a liquid-filled weight is coupled to the crank assembly for shifting the toy's center of gravity laterally to the left or to the right over the ground engaged supporting leg.

Such arrangements apparently represented the general state of the art until the 1930's when U.S. Pat. Nos. 1,897,670-Melville and 1,986,446-Powelson issued disclosing toys having pendulously supported weights for maintaining the robot's balance. In 1958, U.S. Pat. No. 2,827,735 issued to H. E. Grimm, Jr. disclosing a six-legged animal wherein two legs on one side of the toy were coupled to, and driven by, the same mechanism as was coupled to, and which drove, one leg on the opposite side of the toy so as to maintain the toy's balance. And, in 1961, U.S. Pat. No. 3,010,729 issued to Tomosy disclosing a four-legged walking toy wherein the legs were actuated using a cam-actuated rack and pinion assembly.

A robot amusement ride is disclosed in U.S. Pat. No. 3,093,372 issued in 1963 to Cirami wherein the robot's legs are crank operated and the robot is stabilized by physically connecting it to a continuous external supporting track. Other crank-actuated robotic mechanisms disclosed during the 1960's are found in U.S. Pat. Nos. 3,223,461 and 3,302,883, both of which issued to W. H. Stout and which disclose ambulatory irrigation systems.

More recently, U.S. Pat. Nos. 3,660,931-Gardel et al, 4,365,437-Jameson, and 4,834,200-Kajita have issued presumably disclosing state-of-the-art robotic technologies. In Gardel et al, issued in 1972, a walking doll is disclosed having legs mounted at an angle to the axis of the doll's torso so that as the legs move relative to the body, the body tilts to shift the center of gravity of the doll over the leg planted on the floor. In the Jameson Patent issued in 1982, the legs of the toy are crank-operated and a gyroscope is provided to prevent rotation and maintain stability. The Kajita Patent, which issued in May of 1989, discloses a walking robot wherein the lengths of the robot's legs and the angles between each foot and leg are continuously adjusted so as to maintain the robot's center of gravity within the support area defined by the robot's footprint.

However, notwithstanding the state-of-the-art as exemplified by the foregoing patents, no known prior art robot exists, either in the patented or published art, or in the form of a commercially available robot, wherein the robot is capable of walking in a manner similar to that of a human being—i.e., by lifting a first foot/leg assembly off the ground, striding forward with the raised first foot/leg assembly while the weight of the robot is supported by the ground-engaged second foot/leg assembly and replanting the raised first foot/leg assembly on the ground in advance of the second foot/leg assembly, and replicating the foregoing steps alternately with the second and first foot/leg assemblies so that the robot walks either in a straight line or in any desired non-linear path from Point "A" to Point "B". Rather, despite such prior art patent teachings, conventional robotic wisdom generally requires the use of wheels or moving tracks to enable a robot to roll or glide from Point "A" to Point "B"—requirements that are necessitated by the need to keep the robot from falling over due to shifting of its center of gravity.

The foregoing deficiencies in the prior art have clearly been recognized by persons skilled in the art. Thus, as stated in an article entitled "Scale Effects, A Livelihood Modeled After . . . Models!" written by January Anderson and appearing in a publication entitled "Central Coast", published by R J NELSON ENTERPRISES, INC. of Santa Maria, Calif., November, 1989 Edition, at pages 24–27:

"Another Scale Effects project is the perfection of what is known in the movie industry as a 'walker,' a multi-limbed mechanical creature, such as marching four-legged robots seen in space fantasy movies.

"The problem is that movie 'walkers' do not actually walk. A living two-legged or four-legged creature experiences considerable shifts in the weight of its body with each step, but uses its muscles to counter-balance it. As of yet, however, no one has been able to make a mechanical walker that will not tumble to the ground when its weight shifts. As a consequence, film makers must make the walkers appear to move across the screen by use of 'stop motion' photography in which a still shot is made, the walker model is moved slightly by hand, another still shot is made, and so forth. It is a long and tedious process." (Central Coast, November, 1989, page 24 at page 26.)

SUMMARY OF THE INVENTION

The present invention overcomes all of the foregoing disadvantages and problems by providing a robot—in the exemplary embodiment of the invention, a two-legged robot, or biped—which is capable of alternately lifting its left and right leg/foot assemblies off the ground and striding forward with the raised leg/foot assembly while the robot's weight is supported and balanced by the leg/foot assembly that is planted on the ground. To this end, the invention in its exemplary form consists of a robotic biped wherein the actuating mechanisms for the left and right legs are respectively mounted on the right and left legs, and wherein the remotely controlled motor and transmission are alternately shifted interiorly of the robot's upright torso laterally from right-to-left and left-to-right and are drivingly engaged with: i) the left leg actuating mechanism when the robot is conditioned to raise its right leg during a forward stride; and ii), the right leg actuating mechanism when the robot is conditioned to raise its left leg during a forward stride. Thus, as the motor and transmission shift laterally into a vertical plane containing the robot's left or right leg, the robot's center of gravity is simultaneously shifted laterally interiorly of the robot's body so as to be positioned over the leg/foot assembly that is planted on the ground when the opposite leg/foot assembly is being raised and moved forward through a full step. As a consequence, the robot is able to walk in a normal upright position without tilting to the left and right. At the same time, provision is made for enabling the robot to turn to either the left or the right through any desired angle ranging from 0° to 360° without affecting the robot's balance. The foregoing is accomplished using relatively few gears and moving parts—for example, in the exemplary form of the invention, only twenty-three (23) gears and five (5) gear racks are provided together with a pair of remotely actuated motors, thereby enabling the robot to be designed to walk at any desired speed dependent solely upon the judicious selection of gears.

To accomplish the foregoing objectives, the exemplary robotic biped of the present invention includes: i) right and left leg/foot assemblies; ii) right and left stationary pinion gears lying in parallel, laterally spaced, vertical planes and non-rotatably mounted on respective ones of the right and left leg/foot assemblies; iii) right and left rotatable pinion gears lying in the parallel, laterally spaced, vertical planes containing respective ones of the right and left stationary pinion gears and drivingly meshed with respective ones of the right and left stationary pinion gears; iv) right and left gear support brackets each having one end rotatably coupled to a respective one of the right and left rotatable pinion gears and its opposite end rotatably coupled to a respective one of the right and left stationary pinion gears, with the right and left gear support brackets extending in opposite directions with respect to one another—for example, where the robot has both feet firmly planted on the ground with the right foot advanced relative to the left foot, the right gear support bracket extends rearwardly from the right stationary pinion gear to the right rotatable pinion gear which is then located to the rear of, and is meshed with, the right stationary pinion gear, and the left gear support bracket extends forwardly from the left stationary pinion gear to the left rotatable pinion gear—thereby serving to maintain the right and left stationary pinion gears in meshed relation with respective ones of the right and left rotatable pinion gears at all times; v) a transverse, horizontally extending, drive shaft having its right end rotatably extending through the right gear support bracket and nonrotatably secured to the right rotatable pinion gear, and its left end rotatably extending through the left gear support bracket and non-rotatably secured to the left rotatable pinion gear; vi) right and left clutch mechanisms non-rotatably mounted on respective ones of the right and left ends of the drive shaft; vii) a drive sleeve rotatably mounted on the drive shaft with freedom for lateral right-to-left and left-to-right translation therealong; viii) power drive means coupled to the drive sleeve for rotating the drive sleeve about its longitudinal axis; ix) means for alternately translating the drive sleeve and power drive means from right-to-left and left-to-right on the transverse drive shaft; and x), means for drivingly coupling the right end of the drive sleeve to the right clutch member when the robot's right and left feet are on the ground with the right foot advanced relative to the left foot and when the drive sleeve and power drive means are fully translated to the right so as to establish a drive connection between the power driven rotating drive sleeve and the right rotatable pinion gear, thereby causing the right rotatable pinion gear to "walk" around the right stationary pinion gear through an angle of 90° from a position where the right rotatable pinion gear is to the rear of the stationary pinion gear to a position where the right rotatable pinion gear is directly above the right stationary pinion gear with the robot's left leg/foot assembly fully raised off the ground and, thereafter, through an additional 90° angle from a position where the right rotatable pinion gear is disposed forward of the right stationary pinion gear and the robot's left leg/foot assembly is again planted on the ground, but now in a position advanced relative to the trailing right leg/foot assembly.

Since, under the conditions hereinabove assumed, the right foot of the robot is initially planted firmly on the ground in advance of the left foot, as the right rotatable pinion gear "walks" up about the right stationary pinion gear on the right leg/foot assembly, the horizontally disposed transverse drive shaft upon which the right rotatable pinion gear is non-rotatably mounted will rotate with the gear and with the drive sleeve and, therefore, will be raised upwardly and moved forwardly with the distance of both upward and forward movement being equal to the axial spacing between the axes of the meshed right stationary and right rotatable pinion gears. Of course, as the transverse drive shaft rotates, such rotation will serve to simultaneously rotate the left rotatable pinion gear which is non-rotatably coupled to the left end of the drive shaft, causing the left rotatable gear to "walk" around the meshed left stationary pinion gear secured to the left leg/foot assembly through an angle of 90° from a position where the left rotatable pinion gear is immediately forward of the left stationary pinion gear to a position where the left rotatable pinion gear is directly below the left stationary pinion gear.

In short, rotation of the right rotatable pinion gear about the periphery of the right stationary pinion gear and simultaneous rotation of the left rotatable pinion gear about the periphery of the left stationary pinion gear serves to raise the left leg/foot assembly from its ground-engaged position rearward of the right leg/foot assembly to an elevated position above, and horizontally aligned with, the still ground-engaged right leg/foot assembly; and, the distance that the left leg/foot assembly is raised up is equal to the axial spacing between the axes of the right rotatable and stationary pinion gears (i.e., the distance up that the transverse drive shaft moves) plus a distance equal to the axial spacing between the axes of the left rotatable pinion gear coupled to the drive shaft and the left stationary pinion gear which is fixed to the left leg/foot assembly.

During the period of time that the various mechanisms described above have gone through the movements indicated to raise the trailing left leg/foot assembly off the ground and move it to a raised position aligned with the planted right foot, the power drive system, including motor and transmission, resides in a position fully translated to the right as described above, thus locating the robot's center of gravity in a position lying substantially in the vertical plane containing the right leg/foot assembly which is planted on the ground. This serves to maintain the robot firmly and stably balanced on the right leg/foot assembly even though the left leg/foot assembly is raised off the ground.

Since the translatable drive sleeve on the transverse drive shaft remains clutched to the right rotatable pinion gear on the right leg/foot assembly, the right and left rotatable pinion gears will continue to "walk" about respective ones of the right and left stationary pinion gears, thus moving the transverse drive shaft forward and downwardly towards the ground until such time as the right rotatable pinion gear is forward of the right stationary pinion gear, the left rotatable pinion gear is rearward of the left stationary pinion gear, and all four (4) pinion gears again lie in a common horizontal plane—i.e., the right and left rotatable pinion gears will have "walked" about the right and left stationary pinion gears from a start position where all are in a horizontal plane through an angle of 180° so as to move the left leg/foot assembly from a ground-engaged position rearwardly of the right leg/foot assembly to a ground-engaged position forwardly of the right leg/foot assembly, or, stated differently, through one complete step of the robot's left leg/foot assembly.

At this point, the rotatable drive sleeve is de-clutched from the right leg/foot assembly and, together with the power drive system, is translated fully right-to-left where the drive sleeve is clutched to the left leg/foot assembly in precisely the same manner as described above. The robot is now conditioned to step forward with its right leg/foot assembly as the left and right rotatable pinion gears move through arcuate paths and "walk" around the remaining 180° peripheries of respective ones of the left and right stationary pinion gears; and, during this cycle of operation, the robot's center of gravity remains fully shifted to the left so as to substantially lie in the vertical plane containing the left leg/foot assembly which remains planted on the ground as the right foot takes a full step.

As the ensuing description proceeds, it will become apparent to those skilled in the art that the exemplary embodiment of the present invention has been illustrated and will be described in connection with a two-legged robot or humanoid—i.e., a biped—and, it is in that environment that the invention finds particularly advantageous, but not necessarily exclusive, application. Thus, it will be evident to persons skilled in the art that more than one pair of robotic leg/foot assemblies can be combined in a single robot torso to simulate, for example, four-legged movement. But, in any case, the invention relates to movement of the right and left leg/foot assemblies of a robot in such a manner that enables the robot to walk by first lifting a first leg/foot assembly off the ground, striding forward with the lifted first leg/foot assembly and planting that foot on the ground in a position advanced relative to a second leg/foot assembly which remains on the ground and which serves to balance the robot during movement, and then lifting the second leg/foot assembly while the first leg/foot assembly remains firmly planted on the ground and supports the robot's body in a balance position as the robot strides forward with the second leg/foot assembly.

It will further be understood by those skilled in the art that the present invention has been described solely in connection with methods and apparatus for enabling the robot to walk in a manner simulating a human or two-legged biped without consideration of movement up and down steps, or over uneven ground, and without consideration of movement of the robot's arms, hands, or other extremities, all of which can be performed using conventional existing robotic technology. However, the exemplary robot is capable of walking along straight and/or curved paths on level ground regardless of whether the subsurface is carpeted, formed of dirt, concrete or other paving media.

BRIEF DESCRIPTION OF THE DRAWINGS

These and other objectives and advantages of the present invention will become more readily apparent upon reading the following Detailed Description and upon reference to the attached drawings, in which:

FIG. 14A is a fragmentary, schematic, rear elevational view here depicting a portion of the motor/transmission housing in solid lines with the transmission drivingly latched to the robot's right leg-actuating gears in readiness to initiate vertical movement of the robot's left leg/foot assembly off the ground—i.e., the position of the robot's movable components as shown in FIGS. 3 and 4 when both feet are firmly planted on the ground;

FIG. 14B is a fragmentary, schematic, rear elevational view similar to FIG. 14A, but here illustrating a portion of the motor/transmission housing with the transmission drivingly latched to the robot's right leg-actuating gears with the gear pairs on the right and left leg/foot assemblies having reached the positions shown in FIGS. 6 and 7 wherein the robot's left leg/foot assembly is lifted off the ground to its uppermost position halfway through a full stride;

FIG. 14C is a fragmentary, schematic, rear elevational view similar to FIGS. 14A and 14B, here depicting a portion of the motor/transmission housing in solid lines fully translated from right-to-left is viewed in the drawing and with the transmission drivingly latched to the robot's left leg-actuating gears, a position corresponding to that shown in FIGS. 8 and 9 wherein the left leg/foot assembly has completed a full stride, both left and right feet are firmly planted on the ground, and the actuating mechanisms are conditioned to initiate vertical movement of the robot's right leg/foot assembly off the ground;

FIG. 14D is a fragmentary, schematic, rear elevational view similar to FIGS. 14A, 14B and 14C, but here illustrating a portion of the motor/transmission housing with the transmission drivingly latched to the actuating gears on the robot's left leg/foot assembly with the gear pairs on the left and right leg/foot assemblies having reached the positions shown in FIGS. 10 and 11 wherein the robot's right leg/foot assembly is lifted off the ground to its uppermost position halfway through a full stride;

Figure 1:
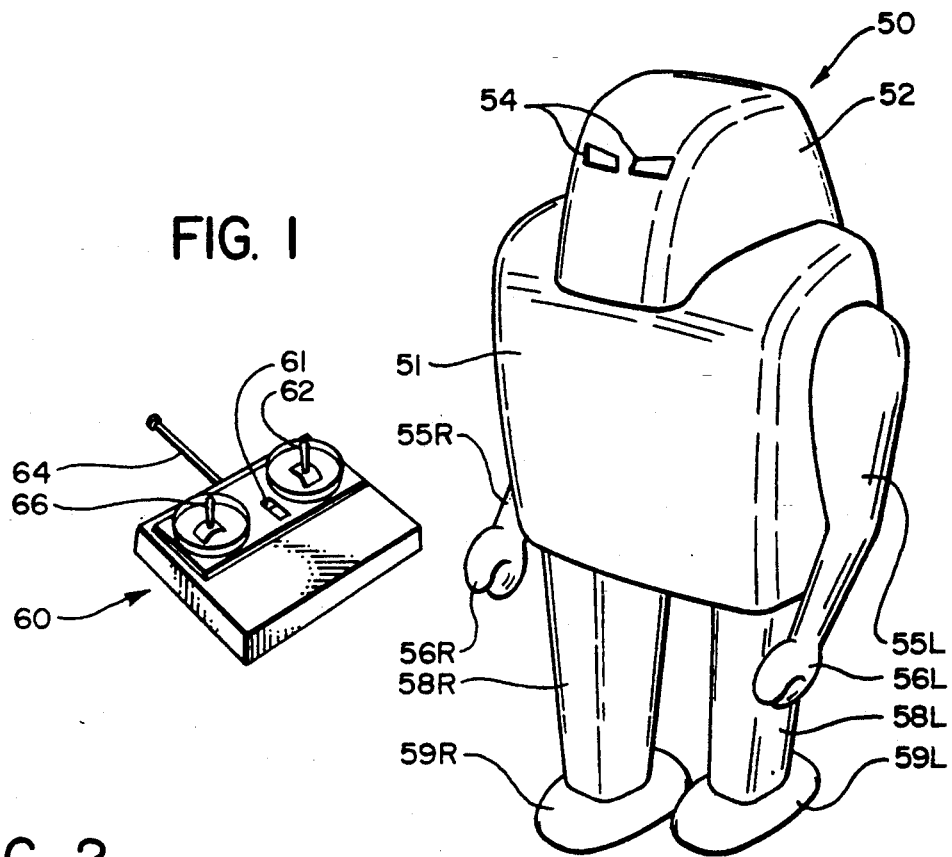
FIG. 1 is an isometric view here depicting a remote controlled, multi-legged, walking robot embodying features of the present invention together with a portable, and completely conventional, remote controlled transmitter for wireless actuation of the robot's motors and actuating mechanisms.

While the invention is susceptible of various modifications and alternative forms, a specific embodiment thereof has been shown by way of example in the drawings and will herein be described in detail. It should be understood, however, that it is not intended to limit the invention to the particular form disclosed; but, on the contrary, the intention is to cover all modifications, equivalents and/or alternatives falling within the spirit and scope of the invention as expressed in the appended claims.

DETAILED DESCRIPTION

General Environment

Figure 2:
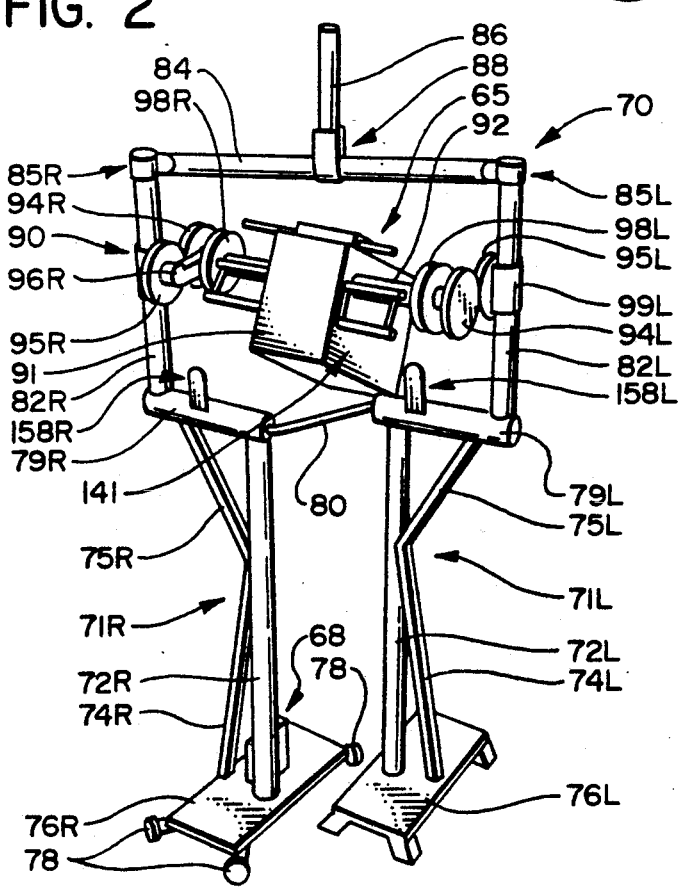
FIG. 2 is a highly simplified, diagrammatic, isometric view of the remote controlled, multi-legged, walking robot depicted in FIG. 1, here shown with its outer shell or body components removed so as to illustrate the relationship of certain of the robot's moving components which form its skeletal structure.

Turning now to the drawings, and with attention directed first to FIGS. 1 and 2 conjointly, an exemplary robotic biped, generally indicated at 50, embodying features of the present invention has been illustrated. As here shown, the illustrative robotic biped 50 includes a body or torso 51, a head 52, eyes 54, right and left arms 55R, 55L, right and left hands 56R, 56L, right and left legs 58R, 58L, and right and left feet 59R, 59L. Those skilled in the art will appreciate that since the exemplary robotic biped 50 is here intended to simulate a humanoid, the various extremities—e.g., arms, legs, etc.—will be symmetrical and essentially consist of identical symmetrical skeletal structure on both the right and the left sides. Therefore, like left and right components are herein identified by like reference numbers together with the designations "L" to indicate left and "R" to indicate right. Moreover, the designations "L" and "R" have been utilized to describe the exemplary robot's components as if it were a living two-legged vertebrate; and, therefore, when viewed frontally, as in FIGS. 1 and 2, the right arm, leg and similar components will actually be on the left of the drawing; whereas when viewed from the rear, as in FIGS. 13, 14A-14D, 19 and 20, the right side components will actually be on the right side of the drawing.

Because the illustrative embodiment of the present invention is intended to simulate a remote-controlled, two-legged, walking robot, there has also been illustrated in FIG. 1 a completely conventional remote-controlled transmitter, generally indicated at 60, for permitting operator-controlled transmissions of wireless or radio control signals used by the operator to control movement of the robot 50. Since the remote-controlled transmitter 60 is completely conventional and forms no part of the present invention—except for its use in transmitting wireless signals to actuate the robot 50—it will not be described in detail herein. It should suffice to note that the transmitter 60 includes: i) an "ON-OFF" switch 61; ii) a first manually-operable toggle switch 62 which, upon actuation by the user, serves to direct a wireless radio signal via antenna 64 to a receiver (not shown in FIGS. 1 or 2) mounted in the robot 50 for actuating the power drive system generally indicated at 65 in FIG. 2, thereby causing the robot to walk in a forward direction; and iii), a second manually operable toggle switch 66 which can be shifted to the right or to the left from a null central position to direct a wireless radio signal via antenna 64 to the robot's receiver for actuating a reversible servo motor, generally indicated at 68 in FIG. 2, to cause the robot 50 to turn to either the right or to the left, as desired and selected by the operator.

Exemplary Skeletal Structure 70

It will be apparent to those skilled in the art as the ensuing description proceeds that the outer shell of the exemplary robotic biped 50 and the upper extremities thereof, all of which are visible in FIG. 1 and are there shown only for purposes of cosmetic completeness, form no part of the present invention and may be varied to suit the requirements of the user. For example, the exemplary robotic biped 50 could simulate an ape, dinosaur or other desired creature or humanoid. Moreover, the present invention is not concerned with robotic mechanisms for enabling manipulation of the upper extremities such as the head 52, arms 55R, 55L or hands 56R, 56L since such mechanisms are believed to be completely conventional and well known to persons skilled in the art of robotics. Additionally, robotic mechanisms for articulating the robot's lower extremities—i.e., the legs 58R, 58L and feet 59R, 59L—at the knees and/or ankles so as to enable the torso and/or spine of the robot 50 to remain in a substantially upright vertical attitude at all times, even when navigating inclines and/or steps, are also believed to be known to persons skilled in the art—See, e.g., the aforesaid U.S. Pat. No. 4,834,200 issued to Kajita—and, therefore, form no part of the present invention and are not herein described.

Rather, the present invention is concerned solely with robotic mechanisms enabling a multi-legged robot, such as the exemplary robotic biped 50 depicted in FIG. 1, to walk with an essentially normal human gait by: i) shifting its center of gravity or point of balance substantially into the vertical plane containing its ground-engaged leading leg/foot assembly; ii) lifting its trailing leg/foot assembly off the ground and striding forward with the raised leg/foot assembly; and iii), thereafter lowering its raised leg/foot assembly into contact with the ground at a point advanced relative to its previously leading, and now trailing, leg/foot assembly so as to essentially mimic a human step. Such movements are achieved solely by manipulation of, and are herein described solely in connection with, the exemplary robotic biped's lower skeletal structure, depicted generally at 70 in FIG. 2 and in ensuing Figures, and here consisting of those skeletal components, considered en gross, simulating the lower posterior portion of, for example, a mammalian trunk including the pelvis and pelvic girdle, hips, femur, tibia, fibula, tarsometatarsus and like leg and foot bones, but excluding articulatable joints such as the knees and/or ankles.

Thus, considering the illustrative skeletal structure 70 depicted in FIG. 2, it will be understood that the right and left leg/foot assemblies, generally indicated at 71R, 71L, each include: i) a main upright vertical support 72R, 72L simulating unitary unarticulated tibias and femurs in respective ones of the robot's legs 58R, 58L shown in FIG. 1; ii) secondary support members 74R, 74L and 75R, 75L simulating smaller anthropoidal leg bones such, for example, as the fibulae which might be simulated by the lower secondary support members 74R, 74L; and iii), lower horizontal platforms 76R, 76L simulating the tarsometatarsus area of the robot's feet 59R, 59L shown in FIG. 1. In the exemplary skeletal structure 70, the upright vertical supports 72R, 72L are secured to respective ones of the horizontally disposed foot platforms 76R, 76L and are perpendicular thereto; while the lowermost secondary supports 74R, 74L are affixed at their upper ends to respective ones of the main supports 72R, 72L, and at their lower ends to respective ones of the platforms 76R, 76L.

Platform 76R of the exemplary robot's right foot skeletal structure also serves to support the reversible servo motor 68 which is drivingly coupled to at least two (2) of a plurality of ground-engaging wheels or rollers 78 so as to enable the robot 50 (FIG. 1) to turn to either the right or to the left at the command of the operator using toggle switch 66 on the remote-controlled transmitter 60 (FIG. 1) when the robot's right foot 59R/76R is planted on the ground. Of course, it will be understood that it is not critical to the present invention as to whether the robot's turning mechanism is mounted on the right leg/foot assembly 71R; and, it could, if desired, be mounted on the left leg/foot assembly 71L and achieve precisely the same desired results.

In order to tie the right and left leg/feet assemblies 71R, 71L of the skeletal structure 70 together for controlled synchronous operation, the upper or femoral ends of the vertical leg supports 72R, 72L and the upper ends of the uppermost secondary supports 75R, 75L are here coupled to respective ones of a pair of laterally spaced, horizontally oriented, support bars 79R, 79L which here simulate the pelvic girdle of a vertebrate. The lower ends of the upper secondary supports 75R, 75L are, in turn, coupled to the approximate midpoints of respective ones of the main supports 72R, 72L, thereby enhancing stability. To insure coordinated synchronous movement of the right and left leg/foot assemblies 71R/71L in the manner hereinabove described, the two (2) horizontal support bars 79R, 79L comprising a simulated pelvic girdle are interconnected by a crank-like tie-rod 80 (best shown in FIG. 5) having its opposite ends rotatably secured to, and retained captive within, axial bores 81R, 81L (best shown in FIG. 3) formed in the innermost ends of respective ones of the horizontal support bars 79R, 79L.

To complete the skeletal structure 70, the outermost extremities of the horizontal support bars 79R, 79L are coupled to respective ones of vertically upstanding supports 82R, 82L simulating the hips of a vertebrate, the upper ends of which are tied together by a transverse tie-rod 84 having its opposite ends received within fittings, generally indicated at 85R, 85L, rotatably secured to the upper ends of respective ones of the vertical hip supports 82R, 82L in such a manner, described in greater detail below, as to permit the tie-rod 84 to rotate about the vertical axes of the supports 82R, 82L and, at the same time, to pivot upwardly and downwardly relative to the vertical hip supports 82R, 82L out of a horizontal plane as the robotic biped 50 (FIG. 1) and its skeletal structure 70 (FIG. 2) ambulates. Finally, a vertically extending stub support 86 simulating the robot's spine and adapted to extend into, and be secured to, the robot's outer shell structure in any suitable manner (not shown) is coupled to the midpoint of tie rod 84 by means of a fitting, generally indicated at 88, which permits maintenance of the stub support 86 in a vertical attitude at all times despite the position of the tie rod 84.

Leg Actuating Mechanism 90—Generally

Before proceeding with a detailed explanation of the various robotic actuating mechanisms employed to enable the robotic biped 50 of FIG. 1 to ambulate, a brief generalized description of the basic overall leg-actuating assembly, generally indicated at 90 in FIG. 2, will be provided so as to orient the reader and to facilitate a clearer understanding of the present invention. To this end, and as generally illustrated in FIG. 2, the leg-actuating mechanism generally depicted at 90 includes a motor/transmission housing 91 rotatably carried on a transverse support shaft 92, which here functions as a drive shaft, with freedom for right-to-left and left-to-right translation therealong. The drive shaft 92 extends in a horizontal plane between the upright vertical hip supports 82R, 82L; and, the drive shaft 92 is secured to such supports 82R, 82L in accordance with one of the important features of the present invention.

More specifically, the leg-actuating mechanism 90 includes right and left pairs of meshed pinion gears 94R, 95R and 94L, 95L which are maintained in meshed relation at all times by virtue of being coupled to respective ones of right and left gear support brackets 96R, 96L, of which only bracket 96R is visible in FIG. 2. The gears 94R, 94L comprise rotatable pinion gears which are non-rotatably mounted on, and drivingly coupled to, respective ones of the right and left ends of the drive shaft 92 which also passes through, and is rotatable with respect to, one end of each of the gear support brackets 96R, 96L. Clutch mechanisms 98R, 98L, described in greater detail below, are non-rotatably mounted on respective ones of the right and left opposite ends of drive shaft 92, with the right and left gear support brackets 96R, 96L being interposed between respective ones of the right rotatable pinion gear 94R and right clutch mechanism 98R, and the left rotatable pinion gear 94L and left clutch mechanism 98L. Gears 95R, 95L are stationary, non-rotatable, pinion gears which are fixedly mounted on respective ones of the upright vertical hip supports 82R, 82L by brackets 99R, 99L in such a manner that the gears 95R, 95L are fixed with respect to the supports 82R, 82L and are incapable of rotation about their axes or vertical movement with respect to the supports 82R, 82L. The gear support brackets 96R, 96L which hold the pairs of meshed gears 94R, 95R and 94L, 95L in mesh at all times are rotatably secured to respective ones of the fixed stationary pinion gears 95R, 95L.

In accordance with this aspect of the present invention, the foregoing arrangement is designed such that the pairs of meshed pinion gears 94R, 95R and 94L, 95L all lie in a common horizontal plane whenever the robotic biped 50 (FIG. 1) and its skeletal structure 70 (FIG. 2) are oriented with both right and left leg/foot assemblies 71R, 71L firmly planted on the ground as shown in FIG. 2. As will become increasingly clear as the ensuing description proceeds in connection with FIGS. 3 through 11, in the case such as shown in FIG. 2 where the right leg/foot assembly 71R is advanced relative to the left leg/foot assembly 71L—i.e., when the robot's next step is to be taken by lifting the left leg/foot assembly 71L off the ground and striding forward while the robot is balanced solely on its right leg/foot assembly 71R—the right rotatable pinion gear 94R, which is non-rotatably mounted on the drive shaft 92, is disposed to the rear of the right stationary pinion gear 95R which is fixed to the right vertical hip support 82R. However, in the case of the left leg/foot assembly 71L, precisely the opposite is true—viz., the left rotatable pinion gear 94L, which is non-rotatably coupled to the left end of drive shaft 92, is disposed forwardly of the left stationary pinion gear 95L fixed to the left vertical hip support 82L.

Figure 3:
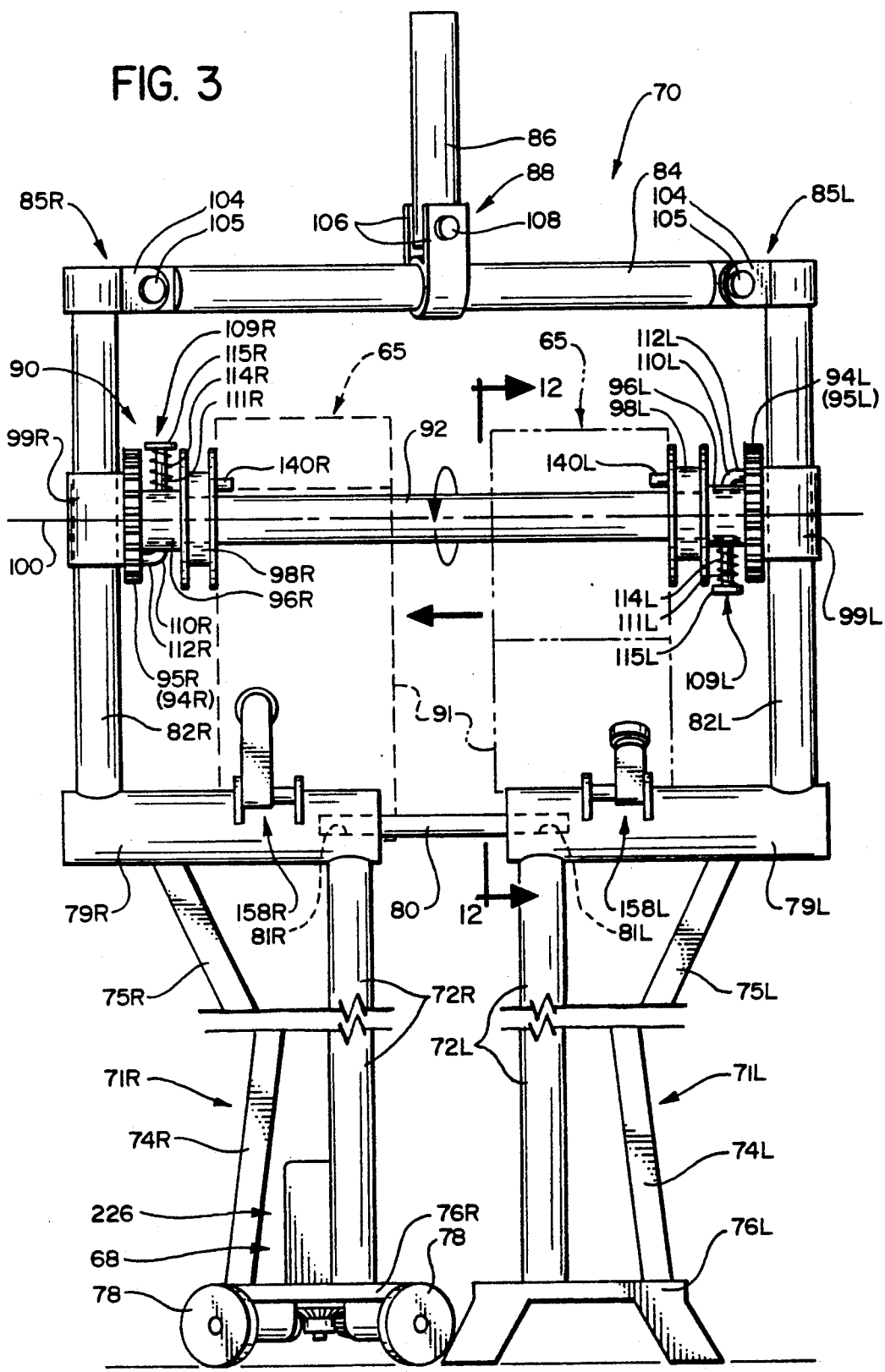
FIG. 3 is a highly simplified, fragmentary, front elevational view taken substantially along the line 3—3 in FIG. 5, here illustrating the basic skeletal structure of the robot's body and depicting the robot with both its right and left feet in contact with the ground and with its right foot—i.e., the left-most foot as viewed in the frontal elevation of FIG. 3—in a forward or advanced position relative to the trailing left foot prior to lifting of the robot's left leg and foot during the course of making one forward step with the left leg and foot, and also illustrating the robot's motor and transmission housing in block phantom form centered over the robot's left leg and foot and in readiness for right-to-left translation as viewed in the drawing to center the motor/transmission housing over the robot's right leg and foot as indicated in broken lines.
Figure 5:
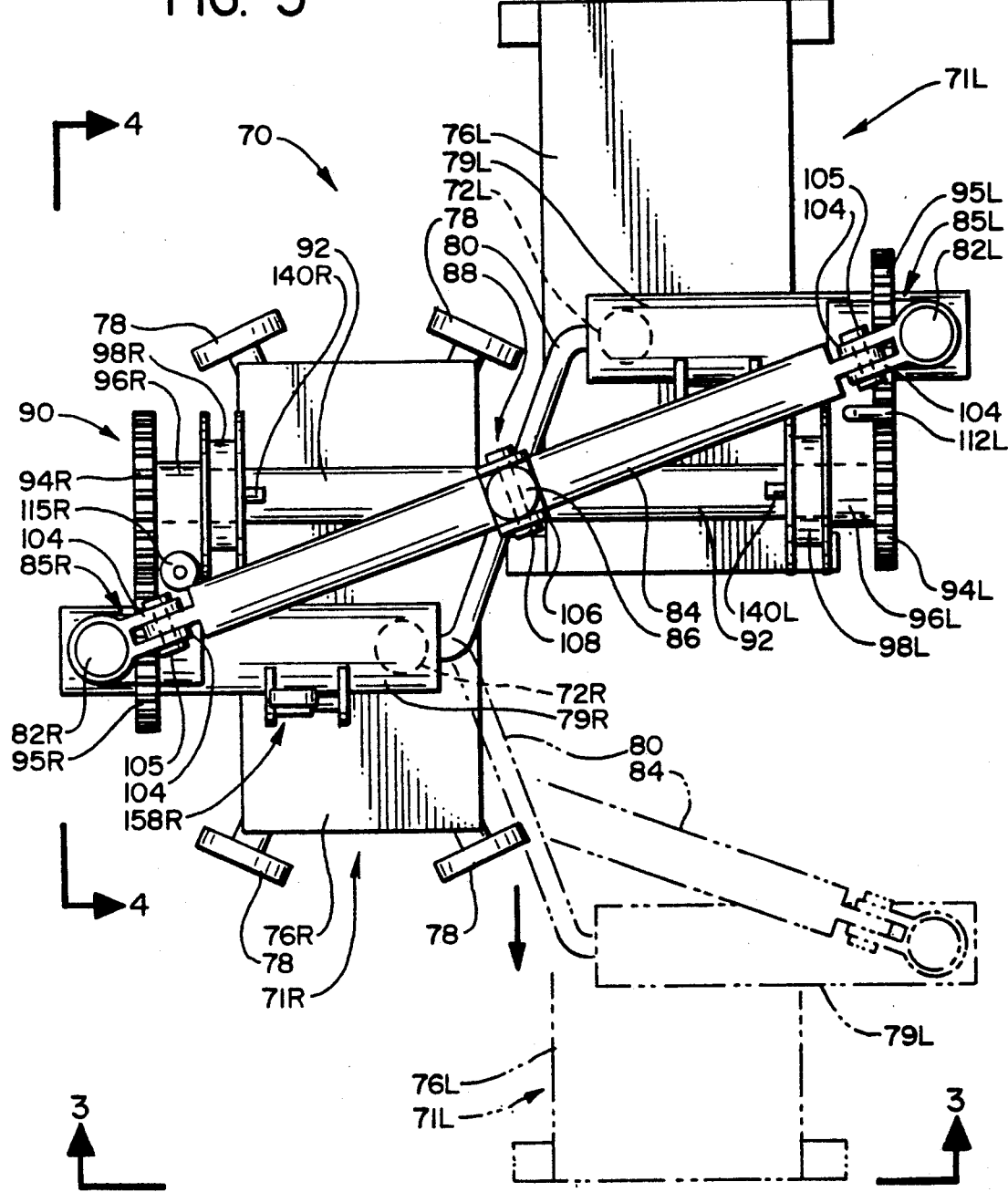
FIG. 5 is a top plan view taken substantially along the line 5—5 in FIG. 4, again depicting the robot's skeletal frame with both feet in contact with the ground and with the robot's right foot—i.e., the left-most foot as viewed in the drawing—advanced relative to the robot's left foot.

As best observed by reference to FIGS. 2, 3 and 5 conjointly, the foregoing arrangement results in cocking of the robot's skeletal frame 70 in such a manner that when the right leg/foot assembly 71R is advanced relative to the left leg/foot assembly 71L and both feet 59R, 59L (FIG. 1) are planted on the ground, the transverse tie rod 84 extends rearwardly in a horizontal plane from the advanced right vertical hip support 82R to the trailing left vertical hip support 82L, a condition permitted by rotation of the fittings 85R, 85L in a counterclockwise direction as viewed in FIG. 5 around respective ones of the vertical hip supports 82R, 82L. At the same time, the crank-like tie rod 80 is disposed in a horizontal plane as best shown in FIG. 3.

Movement of Leg/Foot Assemblies 71R, 71L

With the foregoing generalized description in mind, the sequence of movement of the robot's right and left leg/foot assemblies 71R, 71L to simulate a normal human gait will be described in more detail in connection with FIGS. 3 through 11. Considering first FIGS. 3 through 5 conjointly, the robotic skeletal structure 70 is here depicted with both its right and left leg/foot assemblies 71R, 71L firmly planted on the ground; but, with the right leg/foot assembly 71R advanced relative to the left leg/foot assembly 71L—i.e., the robotic skeletal structure 70 is conditioned such that its first step in a forward direction (to the right as viewed in FIG. 4) requires that the robot 50 (FIG. 1) be balanced solely on its right leg/foot assembly 71R as its left leg/foot assembly 71L is: i) lifted off the ground; ii) advanced in a forward direction; and iii), planted back on the ground in a position forward of the right leg/foot assembly 71R.

To accomplish this, the power drive system 65 housed within the motor/transmission housing 91 is shifted laterally from right-to-left as viewed in FIG. 3 from the phantom line position shown to the broken line position. The particular means for causing such right-to-left translation will hereinafter be described in connection with FIGS. 12 through 20. For the moment, it should suffice to point out that as the motor/transmission housing 91 moves from right-to-left as viewed in FIG. 3, it, in actuality, shifts from the left side of the skeletal structure 70 to the right side; and, as a consequence, the robot's center of gravity, or point of balance, is shifted to a location lying substantially in a vertical plane perpendicular to the robot's transverse axis and bisecting the robot's right leg/foot assembly 71R. This serves to engage the clutch mechanism 98R with the power drive system 65 in a manner described below, thus directly coupling the right rotatable pinion gear 94R to the power drive system 65 and causing positive driven rotation of the right rotatable pinion gear 94R in a clockwise direction as viewed in FIG. 4.

Figure 4:
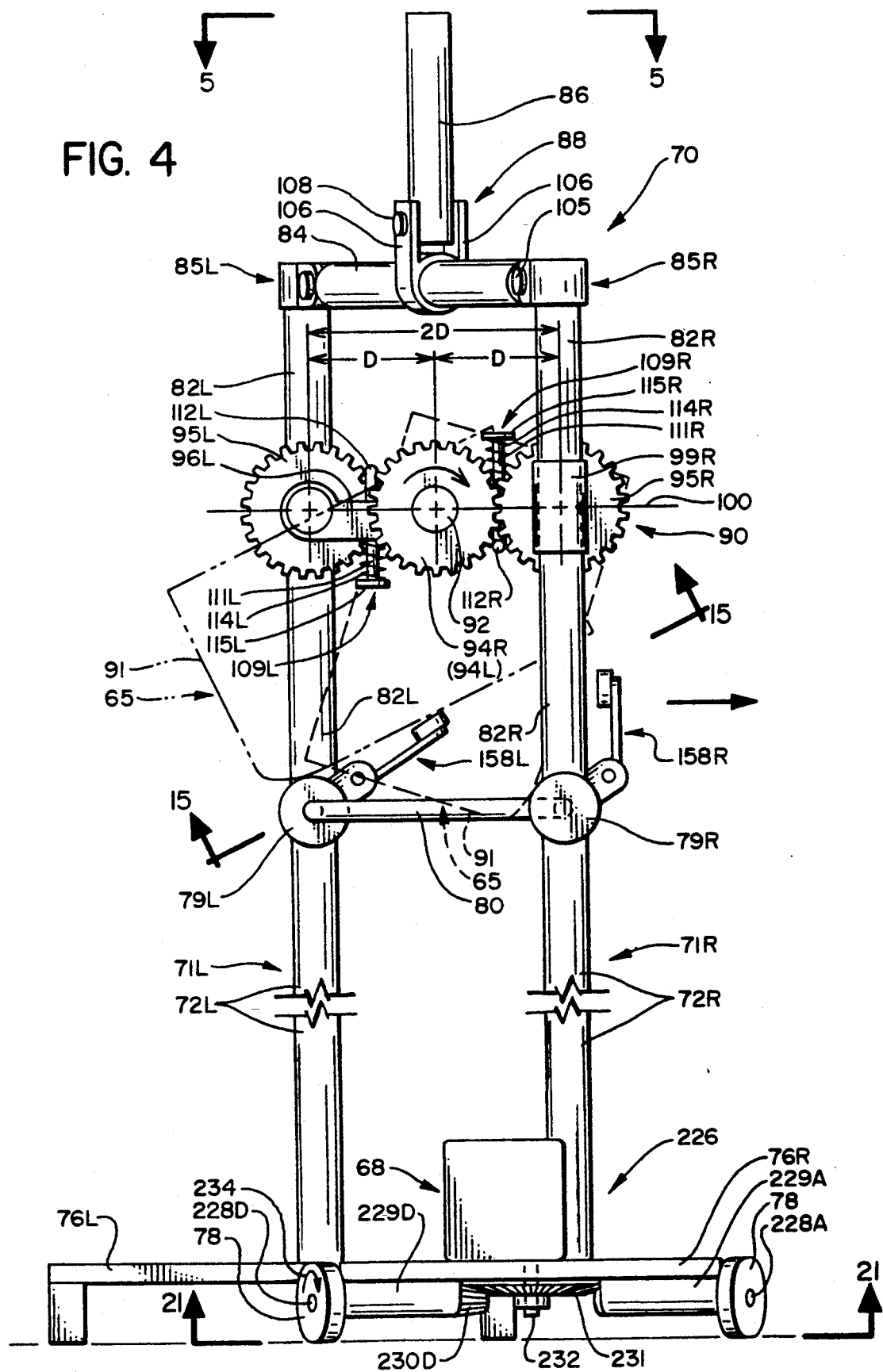
FIG. 4 is a fragmentary right side elevational view of the robot's skeletal frame here taken substantially along the line 4—4 in FIG. 5, again depicting both the right and left feet in ground-engaging contact with the right foot advanced relative to the left foot—a position wherein the pair of leg-actuating gears associated with the robot's right leg and a pair of leg-actuating gears associated with the robot's left leg (only one of which is visible in FIG. 4) all lie in a common horizontal plane—all preparatory to movement of the robot from left-to-right as viewed in the drawing by elevating the trailing left foot and leg off the ground and striding forwardly therewith.

As a consequence, and as will best be appreciated upon inspection of FIGS. 4 and 5 conjointly, the right rotatable pinion gear 94R, which is now being positively driven in a clockwise direction as viewed in FIG. 4, is forced to "walk" upwardly and forwardly about the periphery of the right stationary pinion gear 95R with which it is meshed since the latter pinion gear is fixedly, or unmovably locked, to the vertical hip support 82R forming part of the right leg/foot assembly 71R. At the outset of such clockwise rotation, the right rotatable pinion gear 94R is, as previously described and as shown in FIG. 4, disposed in a horizontal plane immediately to the rear of the right stationary fixed pinion gear 95R—i.e., the two gears are meshed at a nine o'clock position on the fixed stationary pinion gear 95R —and, therefore, as the driven rotatable right pinion gear 94R rotates in a clockwise direction, it progressively "walks" about the periphery of the fixed, stationary right pinion gear 95R from a nine o'clock position through positions at ten o'clock, eleven o'clock, twelve o'clock, etc.

Moreover, since the driven right rotatable pinion gear 94R is non-rotatably coupled to the drive shaft 92, and since the drive shaft 92 is non-rotatably coupled to the left rotatable pinion gear 94L (FIG. 5) on the robot's left leg/foot assembly 71L, clockwise rotation of gear 94R is simultaneously accompanied by corresponding clockwise rotation of drive shaft 92 and, therefore, the left rotatable pinion gear 94L, causing the latter gear to commence "walking" in a clockwise direction as viewed in FIG. 4 about the periphery of the left stationary pinion gear 95L which is fixedly and non-rotatably mounted on the left vertical hip support 82L forming part of the left leg/foot assembly 71L from an initial position wherein the left rotatable pinion gear 94L is meshed at a three o'clock position relative to the left stationary pinion gear 95L—i.e., the rotatable pinion gear 94L is directly forward of the left stationary pinion gear 95L as viewed in FIG. 4—toward successive positions at four o'clock, five o'clock, six o'clock, etc. In short, during the first 90° of clockwise rotation of the right and left rotatable pinion gears 94R, 94L, the pairs of leg-actuating gears 94R, 95R and 94L, 95L move from the positions shown in FIGS. 3-5 to the positions shown in FIGS. 6 and 7.

Figure 6:
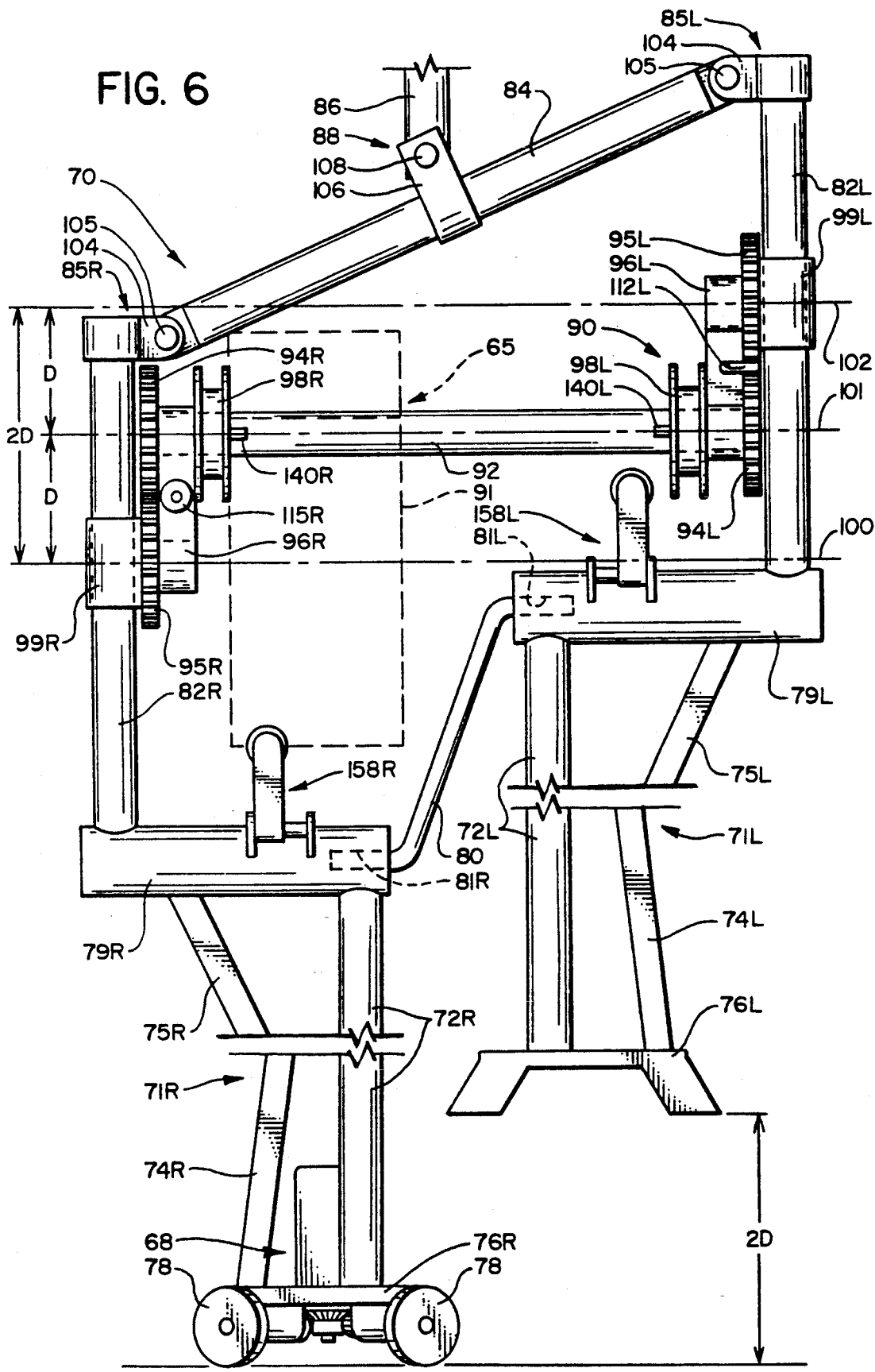
FIG. 6 is a highly diagrammatic, fragmentary, front elevational view of the robot's skeletal frame with parts removed for purposes of clarity, such view being similar to that shown in FIG. 3, but here depicting the robot's motor/transmission housing shown in broken lines translated fully to the left as viewed in the drawing and substantially centered in a vertical plane containing the robot's right leg and foot with the actuating gears associated with the right leg and side of the robot's skeletal frame drivingly engaged with the motor/transmission housing so as to have caused upward and forward rotational movement of the motor/transmission housing and its transverse support shaft, thereby lifting the robot's left leg and foot, which are coupled to the transverse support shaft, upwardly out of engagement with the ground and forwardly relative to the robot's right foot from the position shown in FIGS. 4 and 5 to that shown in FIGS. 6 and 7, all during the first half of one forward stride or step with the left leg and foot assembly.

The net result of such movement is, perhaps, best understood by comparison of FIGS. 4 and 6. Thus, as shown in FIG. 4, all of the pinion gears 94R, 94L, 95R, 95L and the drive shaft 92 are initially located in a horizontal plane diagrammatically represented in FIG. 4 at 100. Moreover, the axial spacing between the rotatable gears 94R, 94L and the stationary gears 95R, 95L is, as here diagrammatically illustrated, "D"; and, the axial spacing between the axis of drive shaft 92, which is coaxial with rotatable gears 94R, 94L, and each of the stationary gears 95R, 95L is also "D". Finally, the arrangement is such that the axial spacing between the axes of the fixed, stationary, non-rotatable gears 95R, 95L is, in this instance, diagrammatically represented as "2D".

Referring next to FIG. 6 depicting the position of the gears 94R, 94L and 95R, 95L and of the drive shaft 92 after 90° of rotation, it will be noted that the axis of the stationary pinion gear 95R mounted on the vertical hip support 82R associated with the right leg/foot assembly 71R, which remains firmly planted on the ground, is still located in the horizontal plane 100—i.e., because the right leg/foot assembly 71R has not moved, neither has the right stationary pinion gear 95R. However, as the right rotatable pinion gear 94R "walks" about the periphery of the fixed right stationary pinion gear 95R from the nine o'clock position shown in FIG. 4 to the twelve o'clock position shown in FIG. 7, the axis of the right rotatable pinion gear 94R—and, therefore, of both the drive shaft 92 and the left rotational pinion gear 94L—is moved upwardly by a distance "D" to a horizontal plane diagrammatically illustrated at 101 in FIG. 6. And, since the left rotatable pinion gear 94L has simultaneously rotated in a clockwise direction as viewed in FIGS. 4 and 7, rotatable gear 94L has "walked" through an angle of 90° about the periphery of the left stationary pinion gear 95L from a three o'clock position as shown in FIG. 4 to a six o'clock position in FIG. 7, thereby shifting the left stationary pinion gear 95L to a vertical position directly over the left rotatable pinion gear 94L as best shown in FIG. 7.

Figure 7:
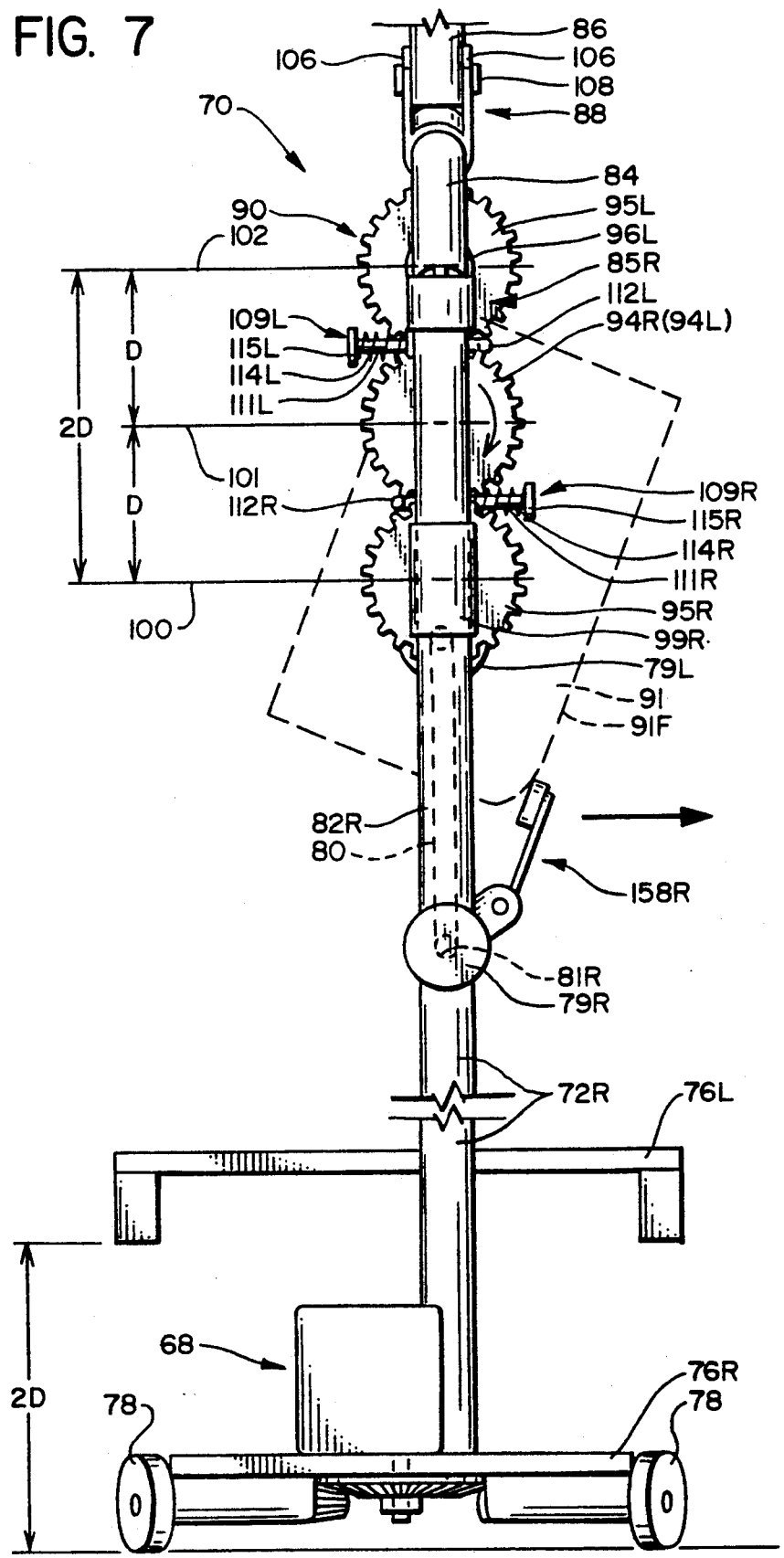
FIG. 7 is a highly simplified, fragmentary, diagrammatic, right side elevational view of the robot's skeletal frame similar to that shown in FIG. 4, but here illustrating the robot's moving components in the position shown in FIG. 6—i.e., with the left leg/foot assembly elevated off the ground as the robot strides to the right as viewed in the drawing—a position wherein the rotatable driving gear mounted on the right leg/foot assembly has "walked" 90° in a clockwise direction as viewed in FIG. 7 about the stationary gear on that leg/foot assembly from a nine o'clock position to a —. twelve o'clock position, while the driving gear (not visible in FIG. 7) mounted on the left leg/foot assembly has "walked" 90° in a clockwise direction about the stationary gear on that leg/foot assembly from a three o'clock position to a six o'clock position.

In short, while the right leg/foot assembly 71R remains firmly planted on the ground and the right stationary pinion gear 95R remains fixed in horizontal plane 100, the left stationary pinion gear 95L has moved upwardly by a distance "2D" and forwardly by a distance "D"; and, since the left stationary pinion gear 95L is fixedly attached to the left vertical support 82L, the left leg/foot assembly 71L is raised off the ground by a distance "2D", as best shown in FIGS. 6 and 7, and is moved forwardly through a distance "D" into a position where it is aligned with the right leg/foot assembly 71R, as best shown in FIG. 7.

Finally, during the first 90° of rotation described above, the crank-like tie rod 80 forming part of the pelvic girdle and interconnecting the right and left horizontal pelvic supports 79R, 79L, is moved from the horizontal plane shown in FIGS. 3, 4 and 5 to a vertical plane as shown in FIGS. 6 and 7. Similarly, the uppermost tie rod 84 is shifted from the cocked horizontal plane depicted in FIGS. 3 through 5 to the cocked vertical plane depicted in FIGS. 6 and 7, a movement permitted by the rotatable mounting of fittings 85R, 85L on respective ones of the vertical hip supports 82R, 82L, an arrangement wherein the opposite ends of tie rod 84 are received within spaced, parallel, bifurcated flanges 104 on the fittings 85R, 85L and pinned in place with freedom for vertical pivoting movement by pins 105.

Figure 8:
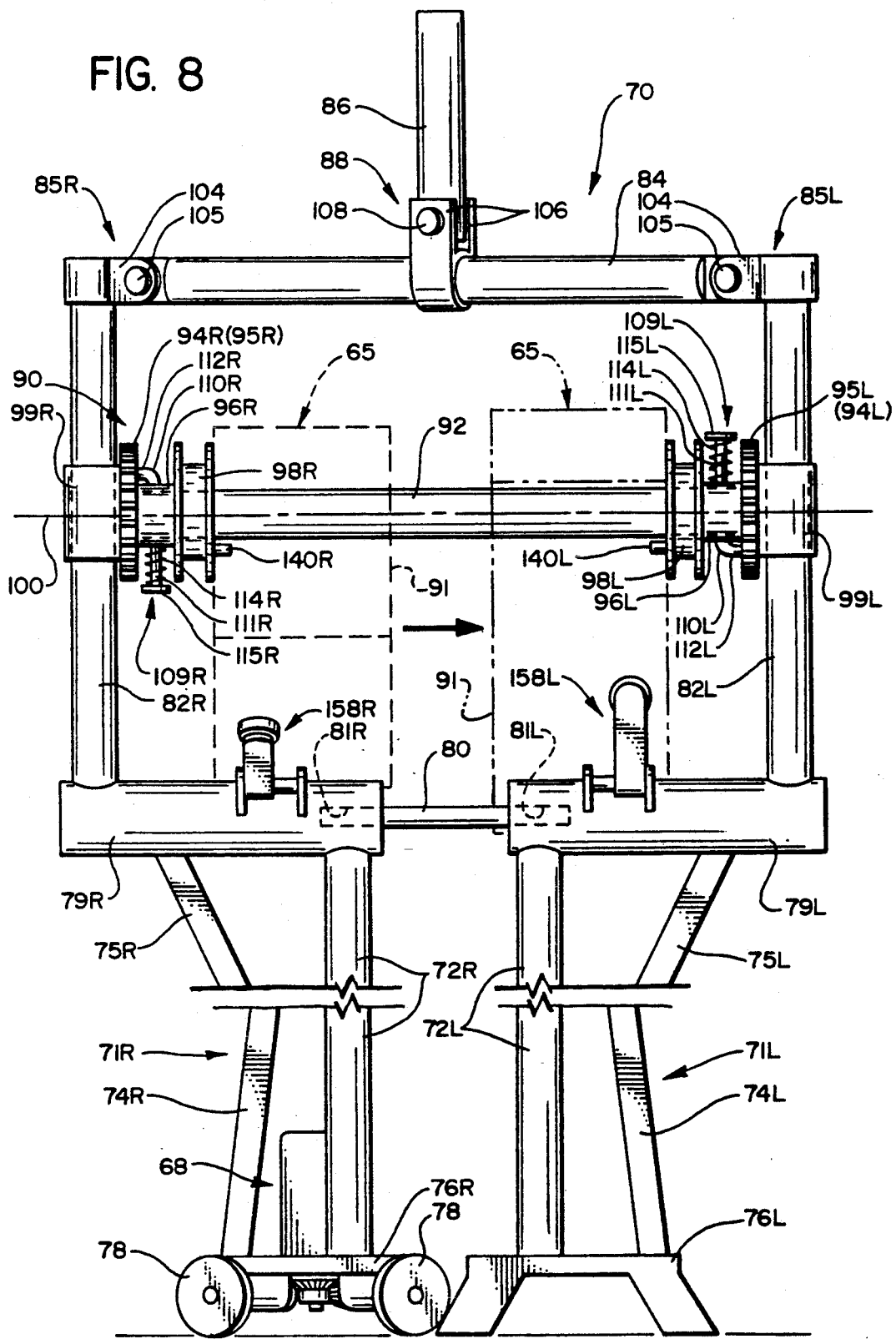
FIG. 8 is a front elevational view of the robot's skeletal frame similar to those depicted in FIGS. 3 and 6, but here illustrating the robot upon completion of the step depicted in FIGS. 6 and 7 with its left foot—i.e., the right-most foot as viewed in the drawing—in contact with the ground and advanced relative to the still ground-engaged trailing right foot and with the motor/transmission housing illustrated in broken lines lying substantially in the vertical plane containing the robot's right leg/foot assembly in readiness for left-to-right translation as viewed in the drawing preparatory to initiating a forward stride with the robot's right foot.
Figure 9:
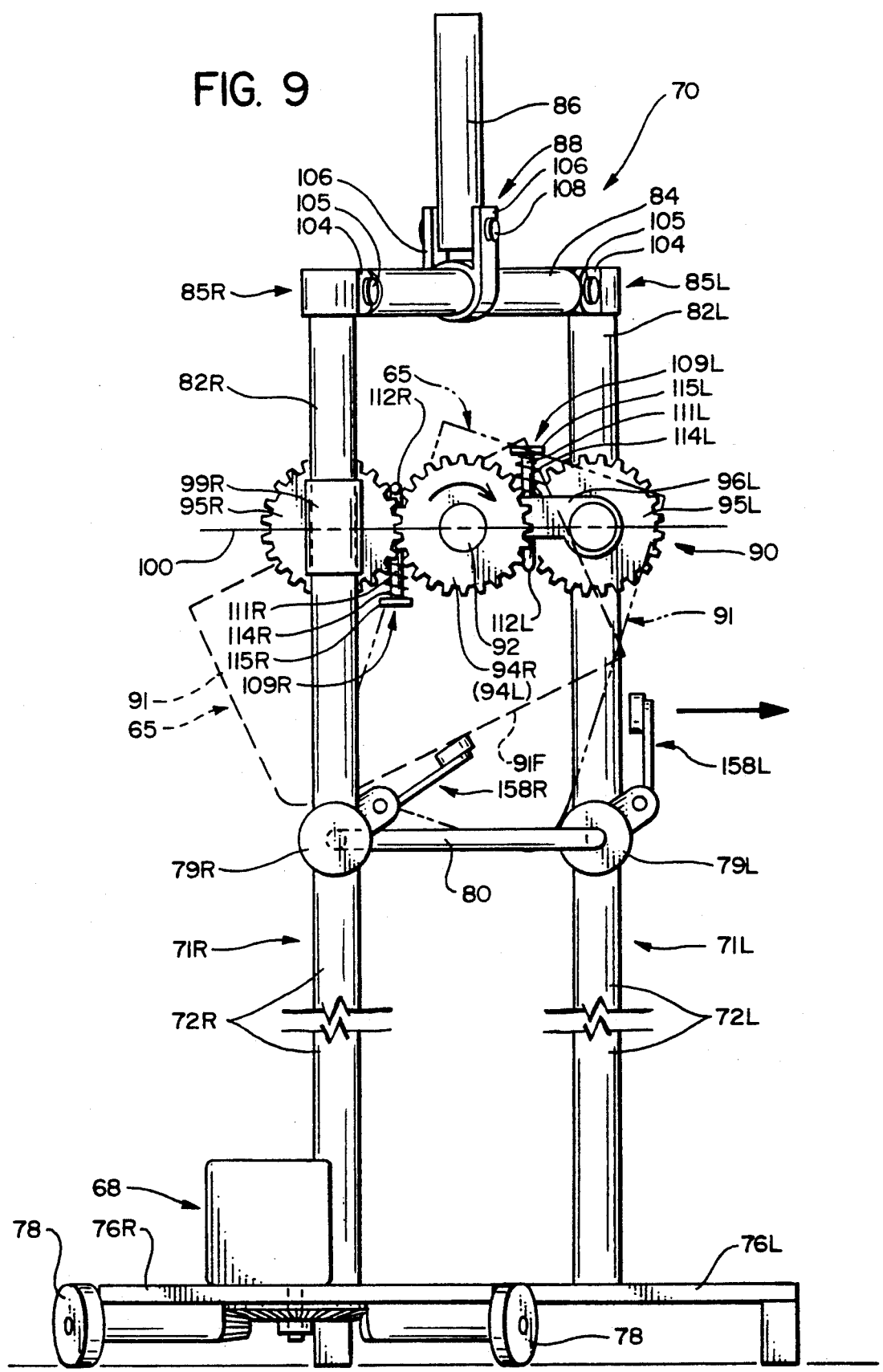
FIG. 9 is a fragmentary, diagrammatic, right side elevational view of the robot's skeletal frame similar to those shown in FIGS. 4 and 7, but here depicting the robot's skeletal frame with its left foot advanced relative to its trailing right foot—i.e., with the robot's movable components in the position shown in FIG. 8—a position wherein the driving gear on the right leg/foot assembly has "walked" from a twelve o'clock position relative to the stationary gear on that leg/foot assembly to a three o'clock position, while the driving gear (not visible in FIG. 9) on the left leg/foot assembly has "walked" from a six o'clock position relative to the stationary gear on that leg/foot assembly to a nine o'clock position.

Having in mind the foregoing description of the sequence of movements occurring during the first 90° of rotation of the right and left rotatable pinion gears 94R, 94L in the exemplary leg-actuating assembly 90, those skilled in the art will more readily understand the continuing movement of the left leg/foot assembly 71L during the ensuing 90° of rotation of such gears as the present description proceeds taken in conjunction with FIGS. 8 and 9. Thus, during the second 90° of rotation, the driven right rotatable pinion gear 94R continues to "walk" about the periphery of the right stationary pinion gear 95R in a clockwise direction as viewed in FIGS. 7 and 9 from the twelve o'clock position (FIG. 7) to the three o'clock position (FIG. 9), during which period the power driving system 65 remains clutched to the right rotatable pinion gear 94R and the motor/transmission housing 91 remains substantially centered in the vertical plane containing the right leg/foot assembly 71R, as indicated in broken lines at 91 in FIG. 8.

At the same time, the driven left rotatable pinion gear 94L continues to "walk" about the periphery of the left stationary pinion gear 95L in a clockwise direction as viewed in FIGS. 7 and 9 from the six o'clock position (FIG. 7) to the nine o'clock position (FIG. 9); and, as a consequence, the drive shaft 92, left rotatable pinion gear 94L, left stationary pinion gear 95L, and left leg/foot assembly 71L move forward by a distance "D", the drive shaft 92 and left and right rotatable pinion gears 94L, 94R move downwardly by a distance "D", and the left stationary pinion gear 95L and left leg/foot assembly 71L move downwardly by a distance "2D", thereby returning the left leg/foot assembly 71L to a position where the left foot platform 76L is firmly planted on the ground; but, is now in an advanced position relative to the previously leading, but now trailing, right leg/foot assembly 71R, i.e., thus completing one full stride or step with the left leg/foot assembly 71L.

It will be noted upon comparison of FIGS. 3 and 4 with respective ones of FIGS. 8 and 9, that during the first 180° of rotation of the leg-actuating assembly 90, all of the pinion gears 94R, 95R and 94L, 95L, the drive shaft 92, and the right and left gear support brackets 96R, 96L are, in effect, turned upside down and returned to a common horizontal plane 100. Moreover, during the latter half of that 180° rotation, the tie rods 80 and 84 are shifted from the vertical plane indicated in FIGS. 6 and 7 back into a horizontal plane as indicated in FIGS. 8 and 9; but, since the left leg/foot assembly 71L is now advanced relative to the right leg/foot assembly 71R, the two tie rods 80 and 84 and the left foot platform 76L will be oriented as indicated in phantom in FIG. 5. In this instance, the right rotating pinion gear 94R is forward of the right stationary pinion gear 95R and the left rotating pinion gear 94L is rearward of the left stationary pinion gear 95L—i.e., their relative positions have been reversed as the left leg/foot assembly 71L moves from a position trailing the right leg/foot assembly 71R to a leading position.

The first full stride or step of the left leg/foot assembly 71L having been completed, the robotic skeletal structure 70 is now ready to step forward with its right leg/foot assembly 71R. To enable such movement without toppling the robotic biped 50 (FIG. 1), it is necessary to de-clutch the power drive system 65 from the right leg/foot assembly 71R, and to shift the motor/transmission housing 91 from left-to-right as viewed in FIG. 8 from the broken line position lying substantially centered in a vertical plane containing the right leg/foot assembly 71R to the phantom line position shown lying substantially centered in a vertical plane containing the left/foot assembly 71L where the left clutch mechanism 98L serves to directly couple the motor and transmission in housing 91 to the left rotatable pinion gear 94L. Details of the mechanisms employed to accomplish the foregoing will be described below in connection with FIGS. 12 through 20. For the moment, however, it should suffice to emphasize that such lateral left-to-right and/or right-to-left translation of the motor/transmission housing 91 on drive shaft 92 occurs when both of the robot's right and left leg/foot assemblies 71R, 71L are firmly planted on the ground; and, during such translation, the motor and transmission are de-clutched from both the right and left rotatable pinion gears 94R, 94L and, therefore, from the drive shaft 92.

Figure 10:
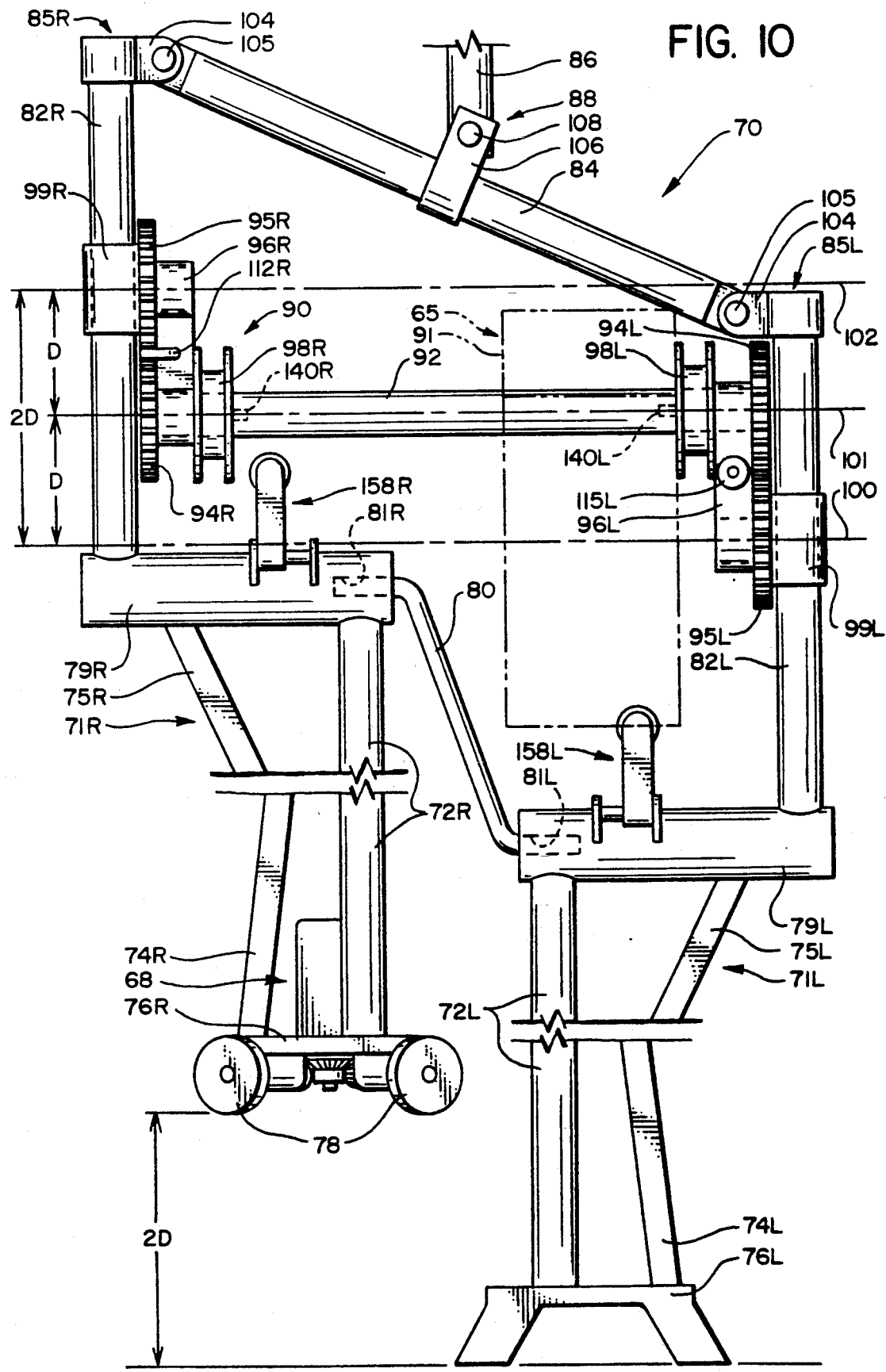
FIG. 10 is a fragmentary, diagrammatic, front elevational view similar to FIGS. 3, 6 and 8, but here depicting the robot with its right leg/foot assembly—i.e., the left-most leg/foot assembly as viewed in the drawing—elevated to its uppermost position above the ground as the robot advances towards the viewer by stepping forward with its right leg/foot assembly while its left leg/foot assembly is firmly planted on the ground and with the motor/transmission housing fully shifted to the right as viewed in the drawings and as depicted in phantom lines so as to shift the robot's center of gravity substantially into the vertical plane containing the left ground-engaging foot, thereby maintaining the robot's balance.
Figure 11:
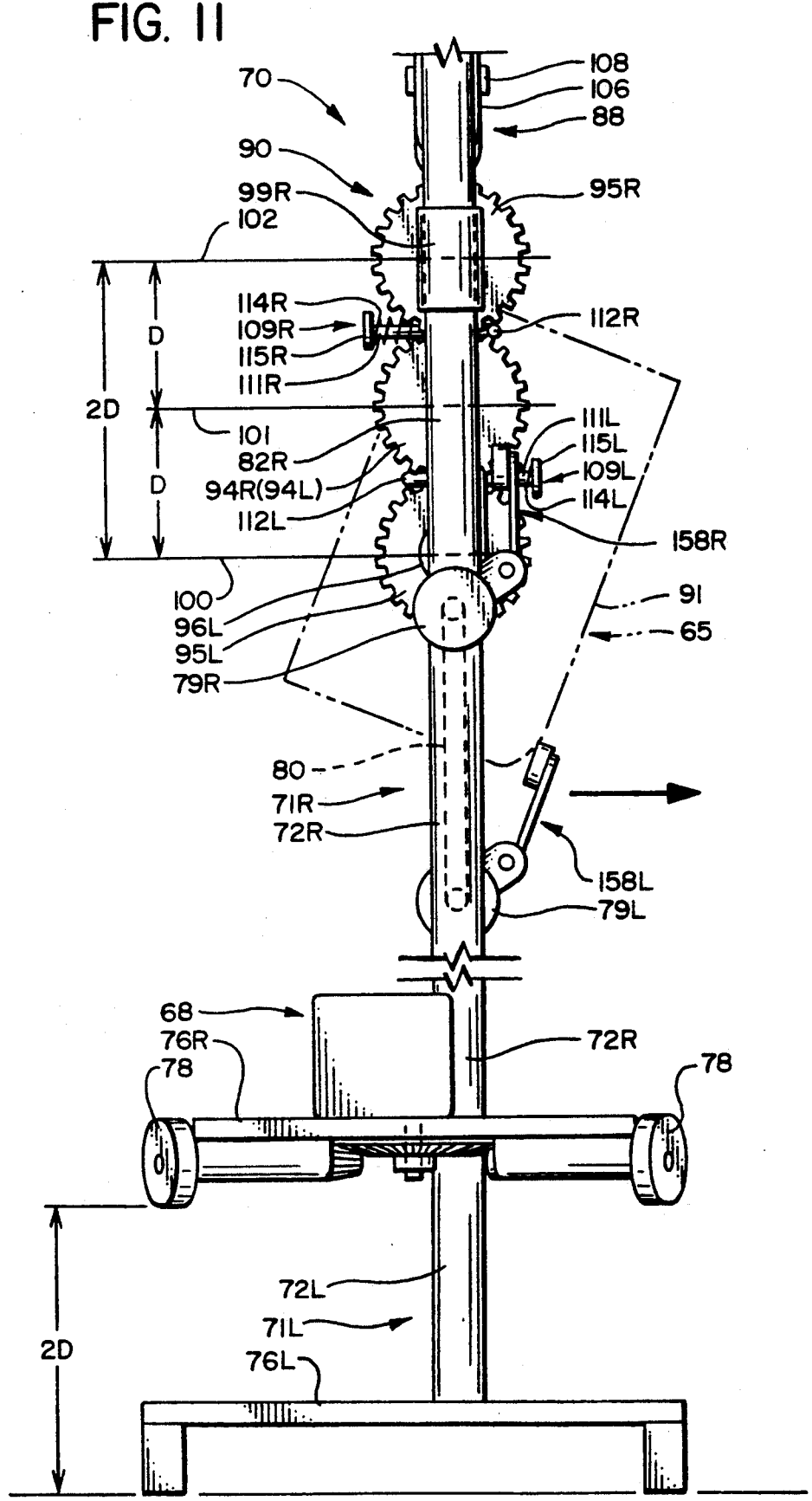
FIG. 11 is a fragmentary, diagrammatic, right side elevational view similar to those shown in FIGS. 4, 7 and 9, but here illustrating the robot with its right leg/foot assembly raised above the ground and in the position shown in FIG. 10 as the robot steps forward with the right foot—i.e., to the right as viewed in the drawing—a position wherein the driving gear on the right leg/foot assembly has "walked" from a three o'clock position relative to the stationary gear on that leg/foot assembly to a six o'clock position, while the driving gear (not visible in FIG. 11) on the left leg/foot assembly has "walked" from a nine o'clock position relative to the stationary gear on that leg/foot assembly to a twelve o'clock position.

Referring next to FIGS. 10 and 11 conjointly, particularly in comparison with FIGS. 8 and 9, it will be observed that during the third 90° of rotation of the rotatable pinion gears 94L, 94R and drive shaft 92 while the motor/transmission housing 91 is in the phantom line position shown in FIG. 10 with the power drive system 65 positively clutched to the left rotatable pinion gear 94L, the left and right rotatable pinion gears 94L, 94R continue to "walk" in a clockwise direction as viewed in FIGS. 9 and 11 around respective ones of the stationary pinion gears 95L, 95R—with rotatable pinion gear 94L moving from a nine o'clock position relative to stationary gear 95L (FIG. 9) to a twelve o'clock position (FIG. 11), while the right rotatable pinion gear 94R moves from a three o'clock position relative to the stationary gear 95R (FIG. 9) to a six o'clock position (FIG. 11). As a consequence of the foregoing arrangement: i) the left stationary pinion gear 95L associated with the ground-engaged planted left leg/foot assembly 71L remains in horizontal plane 100; ii) the rotatable pinion gears 94L, 94R and the drive shaft 92 move upwardly and forwardly into horizontal plane 101 as shown in FIGS. 10 and 11; and iii), the right stationary pinion gear 95R moves upwardly and forwardly into horizontal plane 102 as shown in FIGS. 10 and 11. Therefore, the robot's skeletal structure is now balanced on its ground-engaged planted left leg/foot assembly 71L and the trailing right leg/foot assembly 71R is raised off the ground by a distance "2D" and advanced by a distance "D" so that it is aligned with the left leg/foot assembly 71L as best shown in FIG. 11. At the same time, the tie rods 80 and 84 are shifted out of the horizontal planes depicted in FIGS. 8 and 9 to a common vertical plane as shown in FIGS. 10 and 11.

Finally, during the last 90° of rotatable movement of the drive shaft 90 and left and right rotatable pinion gears 94L, 94R, the left and right rotatable pinion gears 94L, 94R continue to "walk" in a clockwise direction as viewed in FIG. 11 about respective ones of the left and right stationary pinion gears 95L, 95R, returning to their initial positions shown in FIGS. 3, 4 and 5 where the actuating gears 94R, 94L and 95R, 95L, the gear support brackets 96R, 96L, and drive shaft 92 all lie in a common horizontal plane 100, and the tie rods 80 and 94 are returned to horizontal planes, with the right leg/foot assembly 71R again planted on the ground in advance of the left leg/foot assembly 71L.

Thus, it will be understood that for each 360° of rotation of the drive shaft 92 and actuating gears 94R, 94L, the robotic biped 50 (FIG. 1) will take two (2) full steps, one with its left leg/foot assembly 71L and one with its right leg/foot assembly 71R. And, after a full step with the left leg/foot assembly 71L and while both the right and left feet 59R, 59L (FIG. 1) are firmly planted on the ground, the power drive system 65, including the motor/transmission housing 91, will be shifted laterally substantially into a vertical plane containing the left leg/foot assembly 71L; while, after a full step with the right leg/foot assembly 71R, they will be translated laterally in the opposite direction substantially into a vertical plane containing the right leg/foot assembly 71R, thereby maintaining the balance of the robotic biped 50 (FIG. 1) at all times.

In carrying out the foregoing aspects of the present invention, provision is made for insuring that the right and left rotatable pinion gears 94R, 94L are restrained from "walking" backwards relative to the stationary pinion gears 95R, 95L with which they are respectively meshed whenever they are de-clutched from the power drive system 65. To accomplish this, and as best understood by reference to, for example, FIGS. 3 and 7 conjointly, the exemplary leg-actuating assemblies 90 respectively include right and left braking mechanisms, generally indicated at 109R, 109L, comprising L-shaped pins or detents 110R, 110L each having: i) a first leg 111R, 111L disposed in a vertical plane with the legs 111R, 111L passing through respective ones of the right and left gear support brackets 96R, 96L; and ii), a second horizontal leg 112R, 112L extending laterally outward and projecting into, and through, the downstream nip in respective ones of the pairs of meshed leg-actuating gears 94R, 95R and 94L, 95L. Preferably the pin-like detents defined by the laterally outwardly projecting legs 112R, 112L are spring biased into the downstream nips defined by the meshed pairs of actuating gears 94R, 95R and 94L, 95L. To this end, coil springs 114R, 114L are preferably mounted about the pin legs 111R, 111L and have their opposite ends bottomed on respective ones of: i) the gear support brackets 96R, 96L; and ii), an enlarged shoulder or flange 115R, 115L formed at the free ends of the legs 111R, 111L.

Thus, the arrangement is such that the outwardly extending lateral legs 112R, 112L are positively biased into seated relation in the downstream nips formed by the meshed pairs of leg-actuating gears 94R, 95R and 94L, 95L, thereby serving to insure that the rotatable gears 94R, 94L can rotate only in a single direction—viz., in a clockwise direction as viewed in FIG. 7. When the rotatable gears 94R, 94L are drivingly clutched to the power drive system 65 (FIG. 3), the gear teeth, as gears 94R, 94L rotate in a clockwise direction, serve to urge the horizontal legs 112R, 112L outwardly of the downstream nips and against the spring biasing force. On the other hand, when the rotatable leg-actuating gears 94R, 94L are de-clutched from the power drive system 65, any tendency of the gears 94R, 94L to rotate in a counterclockwise direction is precluded by the pin legs 112R, 112L which are biased into the nip and become firmly seated in the nip, thereby preventing relative rotation of the meshed gears.

Power Drive System 65

Figure 12:
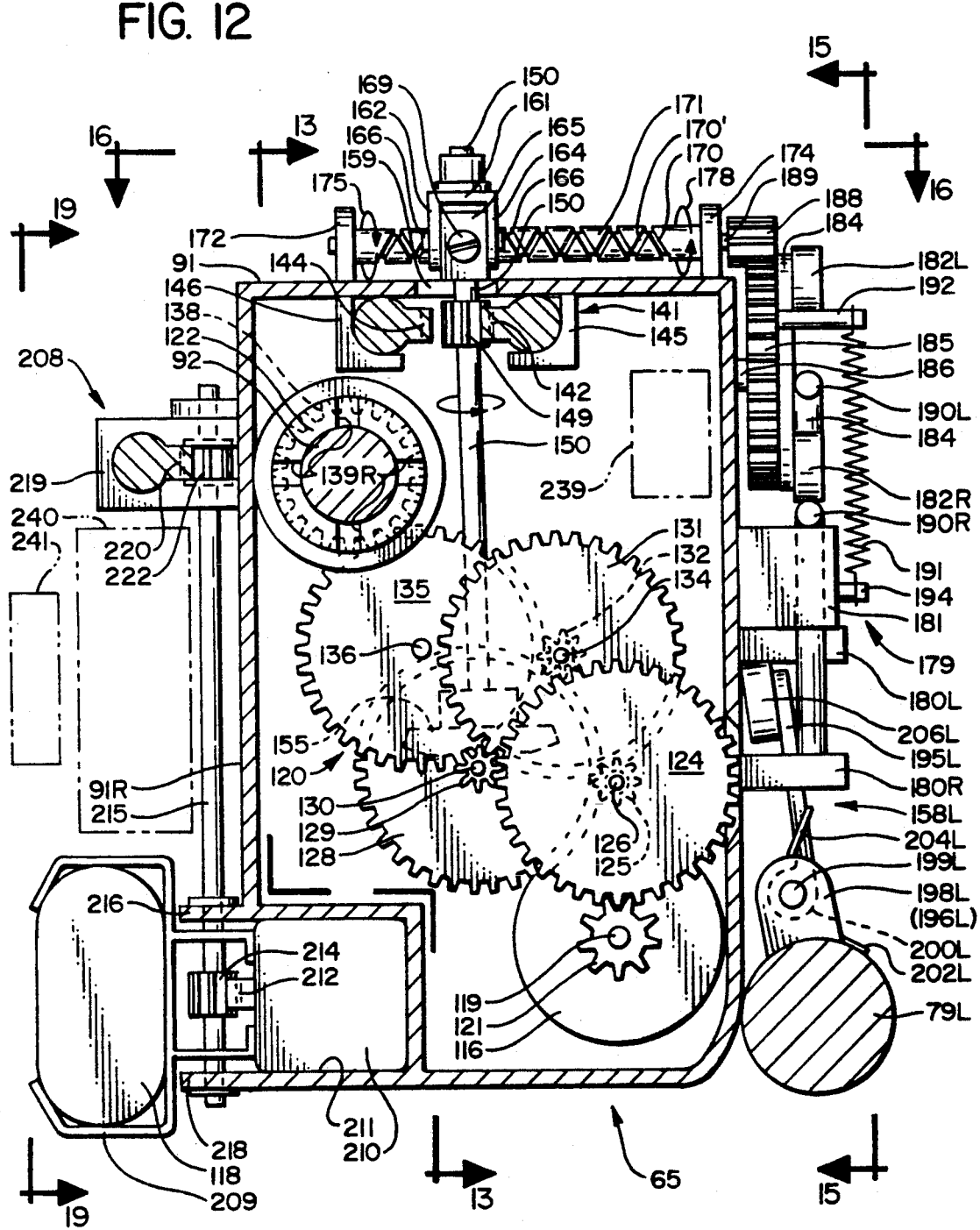
FIG. 12 is a fragmentary, vertical, side elevation, partially in section, taken substantially along the line 12—12 in FIG. 3, here depicting details of the robot's motor and transmission, it being understood that the motor/transmission housing has been rotated in a counterclockwise direction as viewed in FIG. 12 from the inclined position illustrated in FIGS. 3 and 4.
Figure 13:
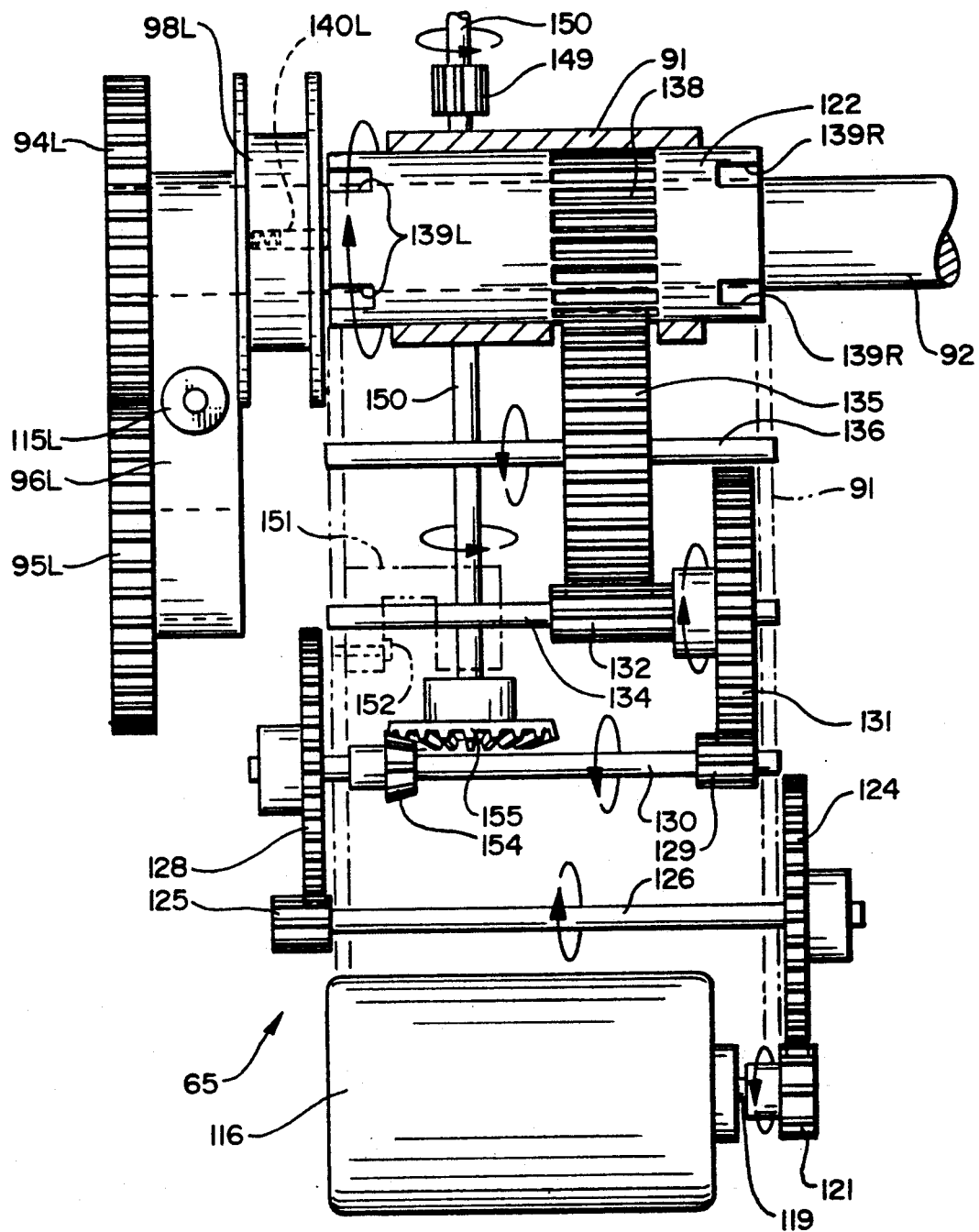
FIG. 13 is a detailed, fragmentary, schematic drawing representing a rear elevational view of the robot's motor/transmission housing, shown in phantom, taken substantially along the line 13—13 in FIG. 12, here particularly illustrating the continuously driven gear train comprising the motor's transmission prior to latching thereof to the actuating gears mounted on, and associated with, the robot's left leg/foot assembly for raising the robot's right foot and leg off the ground.
Figure 22:
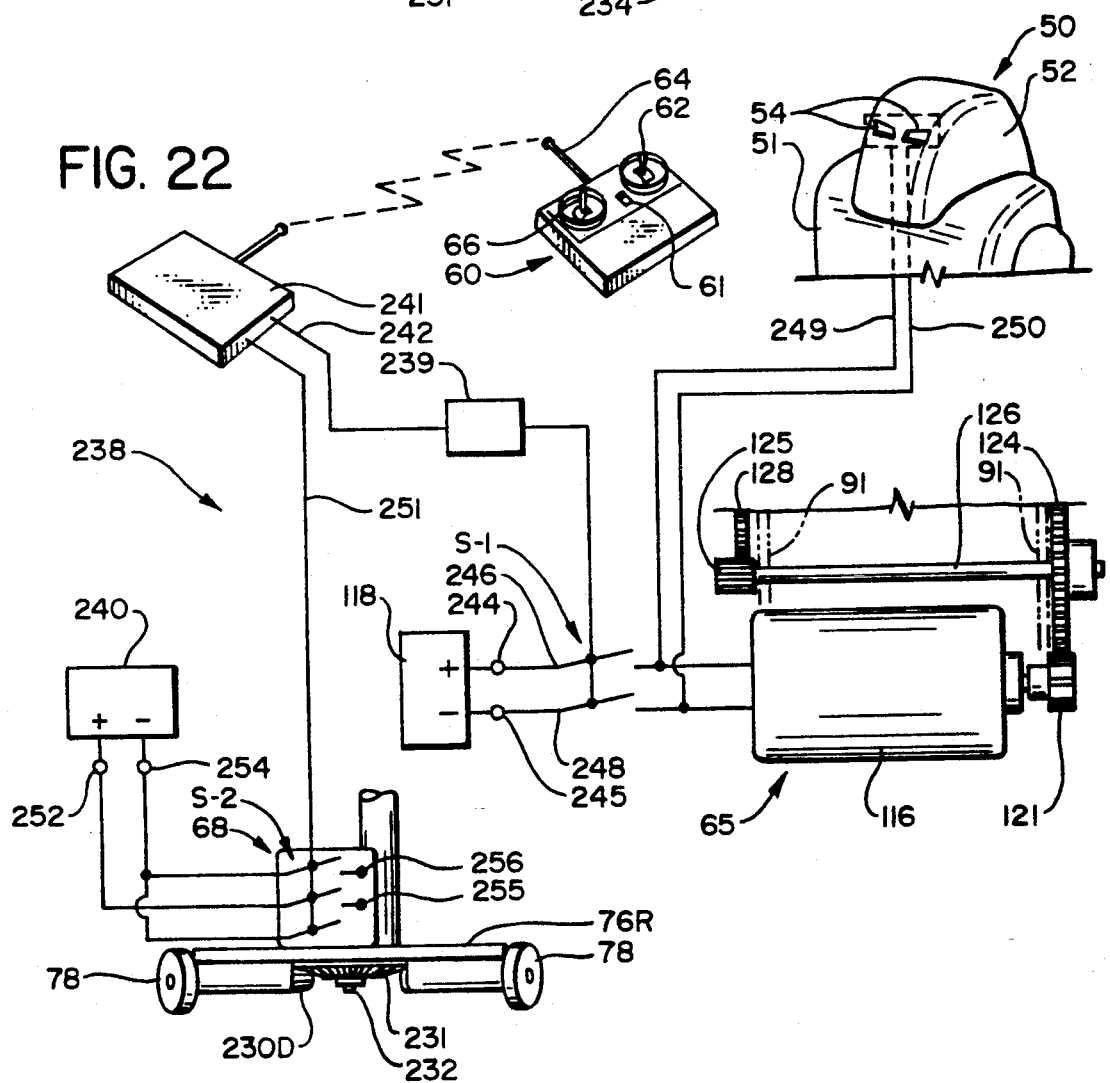

In keeping with the present invention, and in order to transmit power to the leg-actuating mechanism 90, the power drive system 65, as best shown in FIGS. 12 and 13, includes an electric motor 116 mounted within housing 91 and coupled directly to a battery pack 118 (FIG. 12) in any suitable manner shown only diagrammatically in FIG. 22. As shown in FIGS. 12 and 13, the output shaft 119 of the motor 116 is adapted to be selectively and alternately coupled to, and uncoupled from, one of the right and left rotatable pinion gears 94R, 94L (e.g., the left rotatable pinion gear 94L as shown in FIG. 13) by means of: i) respective ones of the right and left clutch mechanisms 98R, 98L (e.g., the clutch mechanism 98L shown in FIG. 13); and ii), a gear train or transmission, generally indicated at 120. In the illustrative power drive system 65, this is accomplished by coupling a spur gear 121, splined or otherwise keyed to the motor's output shaft 119, to a rotatable drive sleeve 120 rotatably and coaxially mounted about drive shaft 92 with freedom for lateral left-to-right and right-to-left translation therealong using a gear train consisting of: i) input and output gears 124, 125 mounted on a shaft 126 journaled for rotation in housing 91, with input gear 124 drivingly meshed with spur gear 121 on the motor's output shaft 119; ii) input and output gears 128, 129 mounted on shaft 130 journaled for rotation in housing 91, with input gear 128 drivingly meshed with output gear 125; iii) input and output gears 131, 132 mounted on shaft 134 journaled for rotation in housing 91, with input gear 131 drivingly meshed with output gear 129; and iv), a drive gear 135 mounted on shaft 136 journaled for rotation in housing 91, with drive gear 135 coupled to output gear 132 and to a circular gear rack 138 formed on the periphery of the rotatable drive sleeve 122.

Thus, the arrangement is such that when motor 116 is energized, power is transmitted from the motor's output shaft 119—via the gear train 124, 125, 128, 129, 131, 132 in transmission 120—to the transmission drive gear 135 which is drivingly meshed with the circular rack 138 on drive sleeve 122, causing the latter to be driven rotationally about its axis which is, of course, coaxial with the axis of the transversely extending drive shaft 92 about which the drive sleeve 122 is mounted with freedom for relative rotation and relative left-to-right and right-to-left translation.

Operation of Clutch Mechanism 98R, 98L

In order to permit powered driving engagement between the power drive system 65 and the leg-actuating mechanism 90 associated with the right and left leg/feet assemblies 71R, 71L, the right and left ends of drive sleeve 122 are each provided with a plurality of peripherally spaced, axially facing, detent openings 139R, 139L, there being four (4) such detent openings at each end of the exemplary drive sleeve 122 as best illustrated in FIG. 12. At the same time, the right and left clutch mechanisms 98R, 98L are each provided with an inwardly projecting, laterally extending, spring biased detent pin 140R, 140L, of which only detent pin 140L is visible in FIG. 13. As a consequence, assuming that motor 116 is energized and power is being transmitted via transmission 120 to cause driven rotation of the drive sleeve 122 about the axis of the drive shaft 92, as the motor/transmission housing 91 is fully translated to the left—i.e., substantially into a vertical plane containing the left leg/foot assembly 71L—the left end of the drive sleeve 122 will initially engage and depress the spring-loaded detent pin 140L as shown in FIG. 13. However, as the drive sleeve 122 continues to rotate about its axis, one of the detent openings 139L will become aligned with the spring biased detent pin 140L, permitting the latter to snap outwardly into the particular aligned detent opening 139L, thereby drivingly coupling the driven rotating drive sleeve 122 with the left rotatable pinion gear 94L through the clutch mechanism 98L which is fixedly and non-rotatably secured to the drive shaft 92. And, since both the rotatable pinion gear 94L and the engaged clutch mechanism 98L are non-rotatably splined or otherwise keyed on drive shaft 92, a positive drive connection is simultaneously established for the right rotatable pinion gear 94R (not shown in FIG. 13) which is splined or otherwise keyed to the right end of the drive shaft 92.

Leg Actuating Mechanism 90—Operation

Having in mind the general operation of the foregoing power drive system 65, attention is now directed to FIGS. 14A through 14D. Thus, referring first to FIG. 14A, it will be observed that the motor/ transmission housing 91, here shown only fragmentarily, is fully translated to the right with the leg-actuating gears 94R, 95R and 94L, 95L, all lying in a common horizontal plane—i.e., the skeletal structure 70 of the robotic biped 50 (FIG. 1) is in the position shown in FIGS. 3 through 5 with both leg/feet assemblies 71R, 71L firmly planted on the ground and the right leg/foot assembly 71R advanced relative to the left leg/foot assembly 71L. Assuming that the motor 116 (FIGS. 13 and 14) is energized and rotatable power is being transmitted to the drive sleeve 122 via the transmission's drive gear 135, when the spring-loaded detent 140R associated with the right clutch mechanism 98R snaps into one of the detent openings 139R in sleeve 122, the right rotatable pinion gear 94R is coupled directly to the drive sleeve 122; and, since pinion 94R is splined or otherwise keyed to drive shaft 92, the latter begins to rotate with the drive sleeve 122 in the direction shown. As a consequence, the right and left rotatable pinion gears 94R, 94L begin to "walk" about respective ones of the stationary pinion gears 95R, 95L in the manner previously described.

After 90° of rotation, the right and left leg/foot assemblies 71R, 71L are in the relative positions shown in FIGS. 6 and 7 with the left leg/foot assembly 71L raised off the ground and aligned with the right leg/foot assembly 71R; and, the leg-actuating mechanism 90 has shifted from the position shown in FIG. 14A to that shown in FIG. 14B. That is, the right rotatable pinion gear 94R is oriented above the right stationary pinion gear 95R rather than rearwardly thereof as shown in FIGS. 4 and 14A; while the left rotatable pinion gear 94L is below the stationary pinion gear 95L rather than forwardly thereof as shown in FIGS. 4 and 14A. As the driven rotatable drive sleeve 122 continues to rotate through an additional 90°, the left leg/foot assembly 71L is moved forward and lowered into ground-engaging contact in advance of the now-trailing right leg/foot assembly 71R in the manner previously described in connection with FIGS. 8 and 9; and, during this period the leg-actuating mechanism 90 is shifted from the position shown in FIG. 14B to that shown in FIG. 14C. However, until such time that the left leg/foot assembly 71L is firmly replanted on the ground, the motor/transmission housing 91 and drive sleeve 122 remain located on the right side of the robotic biped 50 (FIG. 1) substantially in the vertical plane containing the right leg/foot assembly 71R—i.e., in the position shown in phantom in FIG. 14C. Thus, it will be observed that once again all of the leg-actuating gears 94R, 95R and 94L, 95L are in a substantially horizontal plane; but, now the right rotatable pinion gear 94L is in front of the right stationary pinion gear 95R, while the left rotatable pinion gear 94L is to the rear of the left stationary pinion gear 95L.

At this point in the operating cycle, the drive sleeve 122 is shifted laterally to the left as viewed in FIG. 14C and is, therefore, de-clutched from the right clutch mechanism 98R as the motor/transmission housing 91 move from the right as shown in phantom in FIG. 14C to the solid line position shown fully to the left. Such lateral right-to-left translation occurs while the power drive system 65 (FIGS. 12 and 13) remains energized; and, consequently, the drive sleeve 122 continues to rotate, but, as it moves to the left it is disengaged from the spring-loaded detent 140R associated with the right clutch mechanism 98R. Upon full translation to the left, the left end of the drive sleeve 122 will engage and depress the left spring-loaded detent 140L which will remain depressed until the drive sleeve 122 rotates sufficiently to align one of the detent openings 139L with the spring-loaded detent 140L which will then snap into latched engagement therewith, clutching the left rotatable pinion gear 94L to the driven rotating drive sleeve 122 and, therefore, to the power drive system 65 (FIGS. 12 and 13).

As a consequence of the foregoing arrangement, during the ensuing period of 90° rotation, the leg-actuating mechanism 90 moves from the solid line position shown in FIG. 14C to that shown in FIG. 14D where the left rotatable pinion gear 94L is disposed above the left stationary pinion gear 95L and the right rotatable pinion gear 94R is disposed below the right stationary pinion gear 95R—i.e., the right leg/foot assembly 71R is fully raised to the position shown in FIGS. 10 and 11. During the final 90° rotation, the leg-actuating mechanism 90 moves from the position shown in FIG. 14D back to the position shown in FIG. 14A with: i) the motor/ transmission housing 91 located in the position indicated in phantom lines in FIG. 14A; ii) all gears 94R, 95R and 94R, 95L again located in a horizontal plane; and iii), both the right and left leg/foot assemblies 71R, 71L returned to the position shown in FIGS. 3 through 5 with both feet firmly planted on the ground and with the right leg/foot assembly 71R advanced relative to the left leg/foot assembly 71L. At this point, the motor/transmission housing 91 and drive sleeve 122 are shifted to the right from the phantom line position shown in FIG. 14A to the solid line position there shown in order to initiate the next step with the left leg/foot assembly 71L.

Lateral Translation Of Motor/Transmission Housing 91

In accordance with another of the important aspects of the present invention, provision is made for automatically causing the motor/transmission housing 91 and its rotatable drive sleeve 12 to: (a) translate from left-to-right when the robotic biped 50.(FIG. 1) has completed a full step forward with the right leg/foot assembly 71R so as to i) shift the robot's center of gravity from the left to the right substantially into a vertical plane containing the robot's right leg/foot assembly 71R and ii), drivingly clutch or engage the right end of the drive sleeve 122 to the right rotatable pinion gear 94R in the manner previously described to thereby initiate a full step with the left leg/foot assembly 71L; and (b), translate from right-to-left when the robotic biped 50 (FIG. 1) has completed a full step forward with the left leg/foot assembly 71L so as to iii) shift the robot's center of gravity from the right to the left substantially into a vertical plane containing the left leg/foot assembly 71L and iv), drivingly clutch or engage the left end of the drive sleeve 122 to the left rotatable pinion gear 94L in the manner previously described to thereby initiate a full step forward with the right leg/foot assembly 71R.

Figure 15:
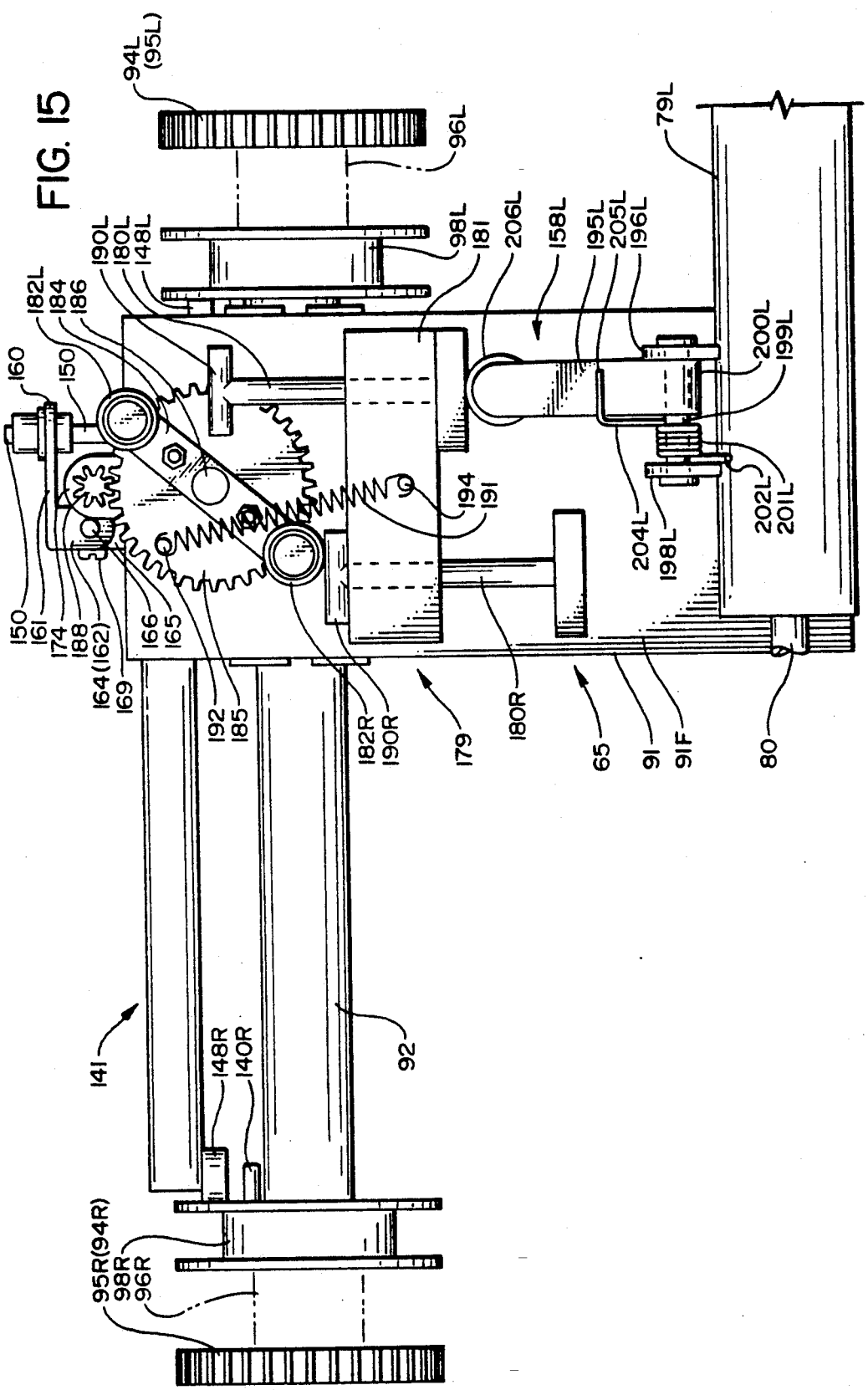
FIG. 15 is a fragmentary, schematic, front 15 in FIGS. 4 and 12, illustrating a portion of the robot's skeletal frame and the motor/transmission housing, and here depicting the motor/transmission housing in solid lines in the position indicated in phantom in FIG. 3 preparatory to left-to-right translation—i.e., right-to-left translation as viewed in FIG. 15—to the broken line position shown in FIG. 3.
Figure 16:
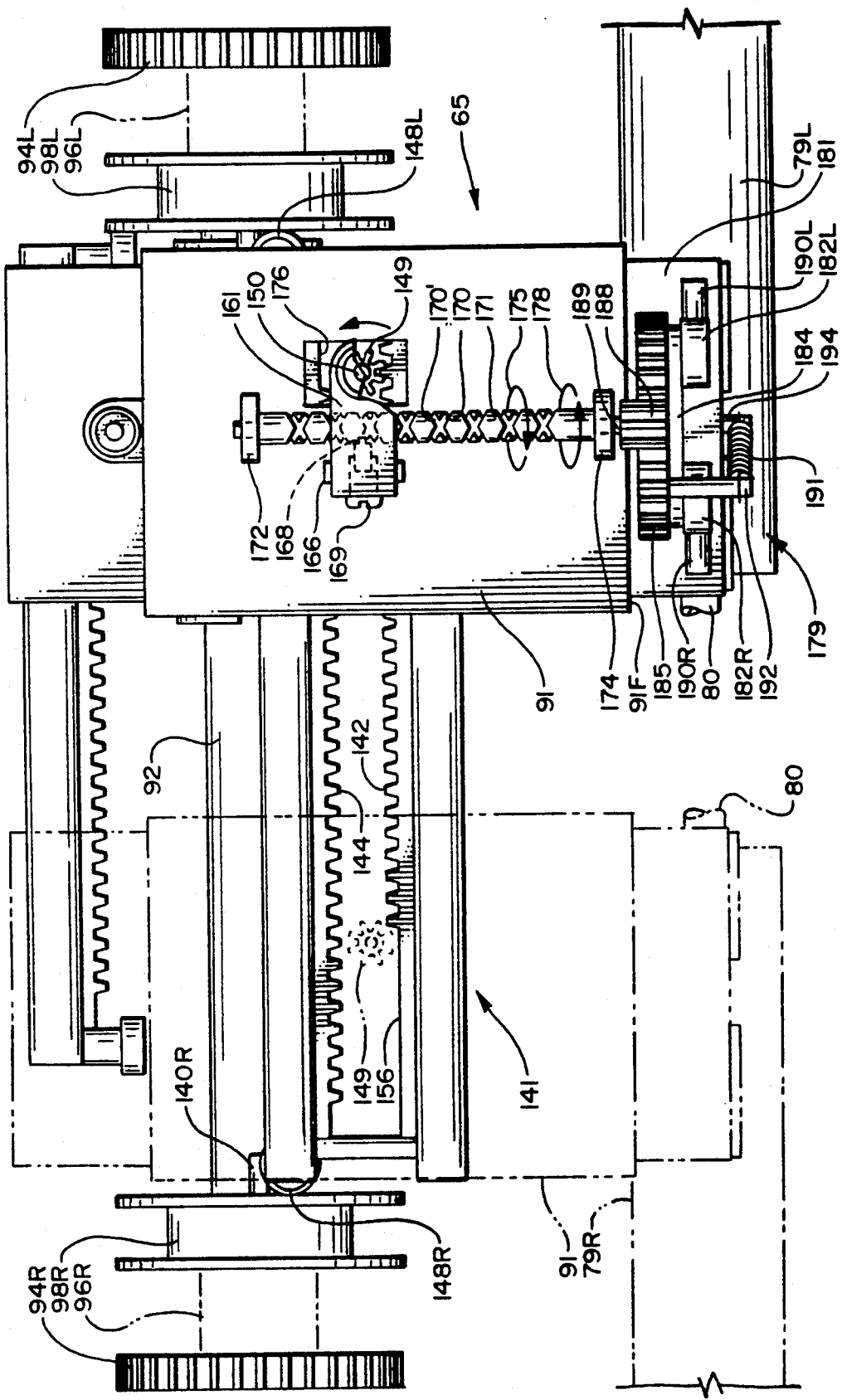
FIG. 16 is a fragmentary top plan view taken substantially along the line 16-16 in FIG. 12, here illustrating the motor/transmission housing in the position shown in FIGS. 3 and 15 preparatory to right-to-left translation as viewed in FIG. 16 to position the motor/transmission housing in the broken line position shown in FIG. 3.

To enable such lateral translation, the exemplary robotic skeletal structure 70 includes a rack assembly, generally indicated at 141 in FIGS. 12, 15 and 16, having spaced, transversely extending, front and rear racks 142, 144 which: i) extend through the upper end of the motor and transmission housing 91; ii) are supported on front and rear brackets 145, 146 integral with the housing 91; and iii), include right and left rollers 148R, 148L at the opposite extremities thereof engaging the inner faces of respective ones of the right and left clutch mechanisms 98R, 98L so as to preclude lateral movement of the rack assembly 141. A small pinion gear 149—dimensioned such that it is engagable with one or the other of the front and rear racks 142, 144, but not simultaneously with both—is mounted at the upper end of a vertical shaft 150 (as best shown in FIGS. 12 and 13). Shaft 150 is, in turn, mounted on the motor and transmission housing 91 by means of a bracket, indicated in phantom at 151 in FIG. 13; which bracket is capable of slight pivotal movement about a threaded fastener, indicated in phantom at 152 in FIG. 13. Vertical shaft 150 is coupled to the power drive system 65 by means of a power take-off assembly including a first bevel gear 154 splined or otherwise keyed to shaft 130 and a second bevel gear 155 splined or otherwise keyed to the lower end of vertical shaft 150, such bevel gears 154, 155 being disposed in meshed right angular relation.

Thus, the arrangement is such that pinion gear 149 rotates in a counterclockwise direction as viewed in FIGS. 13 and 16 whenever the motor 116 (FIG. 13) is energized. As a consequence, when the robotic biped 50 (FIG. 1) and its skeletal structure 70 (FIG. 2) complete a full forward step with the right leg/foot assembly 71R, the motor/transmission housing 91 will be shifted into the solid line position depicted in FIG. 16 where the small pinion gear 149 is meshed with the front rack 142; and, therefore, counterclockwise rotation of gear 149 causes the housing 91 to translate from left-to-right (i.e., right-to-left as viewed in FIG. 16), thereby shifting the housing 91 fully to the right (i.e., to the left as viewed in the drawing) from the solid line position shown to the position fragmentarily indicated in phantom so as to drivingly couple the right end of the drive sleeve 122 to the right rotatable pinion gear 94R in the manner depicted in FIG. 14A and as previously described.

In keeping with this aspect of the present invention, provision is made for disabling the rack assembly 141 whenever the power drive system 65 and the motor/transmission housing 91 have completed their left-to-right translation (i.e., right-to-left translation as viewed in FIG. 16) following completion of a full step with the robot's right leg/foot assembly 71R so as to enable the exemplary robotic biped 50 (FIG. 1) to initiate and complete a full stride with its left leg/foot assembly 71L while the housing 91 is substantially centered in a vertical plane containing the right leg/foot assembly 71R as indicated in phantom lines in FIG. 16. To accomplish this, and as best illustrated in FIG. 16, the right end of the front rack 142 in rack assembly 141 (viz., the leftmost end as viewed in the drawing) is provided with a region devoid of gear teeth, such region here being indicated at 156. As a consequence, when housing 91 is fully translated from left-to-right (i.e., right-to-left as viewed in FIG. 16) as a result of counterclockwise rotation of pinion gear 149 while engaged with the front rack 142, the pinion gear 149 moves towards the right end of the rack (i.e., to the left as viewed in FIG. 16), ultimately fully traversing the toothed portion of the front rack 142 and moving into the untoothed region 156 on the rack.

Thereafter, although pinion gear 149 continues to rotate in a counterclockwise direction since the robot's motor 116 (FIGS. 12, 13 and 22) remains energized, no further left-to-right translation can occur and the pinion gear 149 simply idles. Moreover, no right-to-left translation can occur until such time as the counterclockwise rotating pinion gear 149 is shifted rearwardly into meshed engagement with the rear rack 144 in a manner to be described below. It is during this idle or dwell period while the driven pinion gear 149 resides in the untoothed region 156 of the front rack 142 that the robotic biped 50 (FIG. 1) and its skeletal structure (FIG. 2) initiate and complete one full stride or step with the robot's left leg/foot assembly 71L.

Referring now to FIGS. 4, 7 and 9 conjointly—which Figures respectively depict the position of the motor/transmission housing 91 and the robotic biped's right and left leg/foot assemblies 71R, 71L at: i) the instant when the robot's skeletal structure 70 is conditioned to lift its left leg/foot assembly 71L off the ground (FIG. 4); ii) the instant when the left leg/foot assembly 71L has reached a position one-half way through its full stride with the left foot platform 76L raised above the ground by a distance "2D" (FIG. 7); and iii), the instant when the left leg/foot assembly 71L has completed a full step and the left foot platform 76L is again engaged with the ground in advance of the now trailing right leg/foot assembly 71R (FIG. 9)—it will be noted that the housing 91, which is supported on and suspended from shaft 92, moves upwardly and forwardly relative to the right leg/foot assembly 71R and its horizontal support 79R during the first 90° of rotation of the robot's right rotatable pinion gear 94R, with the housing 91 moving from the broken line position shown in FIG. 4 to the broken line position shown in FIG. 7. During the next 90° of rotation of the rotatable pinion gear 94R—i.e., during the last half of the full stride or step with the robot's left leg/foot assembly 71L—the motor/transmission housing 91 continues to move forwardly relative to the now trailing right leg/foot assembly 71R and, at the same time, it moves downwardly with respect thereto, from the broken line position indicated in FIG. 7 to that depicted in FIG. 9.

Upon inspection of FIGS. 4, 7 and 9, it will be observed that during the foregoing movement of the robot's skeletal structure 70, the front face 91F of the housing 91 moves through successive different positions relative to the transverse horizontal support 79R—and, more particularly, relative to a spring biased switch actuator mounted thereon and generally indicated at 158R. Such movement of the housing 91 is used to shift the pinion gear 149 on shaft 150 rearwardly—i.e., to the left as viewed in FIG. 12—from its idle or dwell position in the untoothed region 156 of the front rack 142 as shown in FIG. 16 into meshed engagement with the rear rack 144 so as to enable right-to-left translation of the housing 91 (i.e., left-to-right translation as viewed in FIGS. 17 and 18) from the solid line position shown in FIGS. 17 and 18 to the position shown fragmentarily in phantom in FIG. 18 where the housing 91 is again substantially located in a vertical plane containing the robot's left leg/foot assembly 71L.

In carrying out this aspect of the invention, and in order to permit fore-and-aft movement of the pinion gear 149, the vertical shaft 150 upon which the pinion gear 149 is splined or otherwise keyed is, as previously described, pivotally supported at its lower end by a bracket, shown in phantom at 151 in FIG. 13, capable of slight pivotal movement about the axis of fastener 152 which serves to pivotally couple the bracket 151 to the housing 91—i.e., the shaft 150 is capable of slight pivotal movement towards and away from the viewer as viewed in FIG. 13 or from right-to-left and left-to-right as viewed in FIG. 12. To this end, and as best shown in FIG. 12, the vertical shaft 150 upon which pinion gear 149 is mounted, extends upwardly through the pinion gear 149 and through a fore-and-aft slot 159 formed in the upper wall of housing 91, with the upper end of the shaft 150 being journaled for rotation in the horizontal leg 160 of an L-shaped support bracket 161, best shown in FIGS. 15 and 17. The vertical leg of the L-shaped bracket 161 is, as best shown in FIG. 12, defined by downwardly extending, spaced, parallel flanges 162, 164 which are coupled by means of a pin 166 to a block-like support 165 that sits on top of, but which is free to slide back and forth on the housing 91 (i.e., from right-to-left and left-to-right as viewed in FIG. 12).

Figure 18:
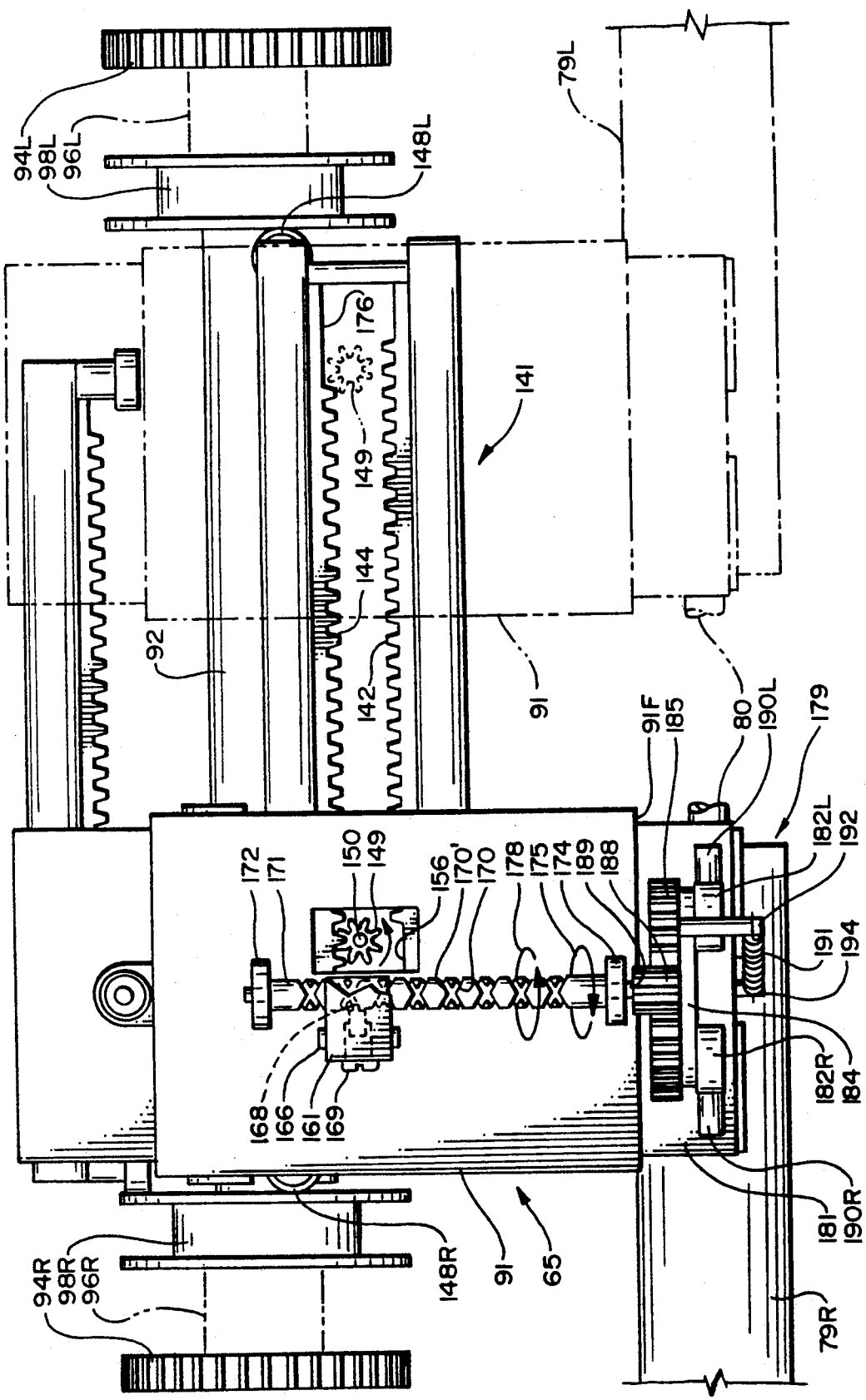
FIG. 18 is a fragmentary top plan view similar to FIG. 16, here illustrating the motor/transmission housing following right-to-left translation thereof as viewed in the drawing to the broken line position shown in FIG. 3.

In keeping with the invention, support 165 serves to carry a laterally directed, horizontally oriented, pin 168 formed on the inner end of a bolt 169 threadably engaged with support 165, such pin 168 being positioned within one of a pair of reversely oriented helical grooves 170, 170' formed in a rod-like double or reverse helix gear 171. Gear 171 is, in turn, supported at its opposite ends in brackets 172, 174 fixedly mounted on housing 91; and, is journaled for rotation in either direction about its axis, as best shown in FIGS. 12, 16 and 18. The reversing mechanism can, for example, take the same form as conventionally employed in automatic screwdrivers, fishing reels, and the like, wherein the double helix gear 171 incorporates two (2) oppositely wound helical grooves 170, 170' such that upon rotation of the gear 171, the pin 168 received within one or the other of the helical grooves 170, 170' is caused to translate from right-to-left or from left-to-right as the gear 171 rotates, with the direction of translation of pin 168 being a function of the direction of rotation of the gear 171. However, unlike a screwdriver or a fishing reel where the pin received within the helical grooves is intended to relatively translate the full length of the helix gear, in this instance it is only necessary for the pin 168 to move a short distance from right-to-left and left-to-right—i.e., a distance sufficient to enable the pinion gear 149 to move from the front rack 142 to the rear rack 144 and from the rear rack 144 to the front rack 142. Therefore, only a single one of the helical grooves 170, 170' on this otherwise conventional double helix reversing gear 171 is required.

Thus, as the double helix gear 171 rotates in the direction of the arrow 175 in FIGS. 12, 16 and 18 (i.e., in a counterclockwise direction as viewed from the front), the pin 168 and, therefore, support 165 and the L-shaped bracket 161 will all move from right-to-left as viewed in FIG. 12, causing the vertical shaft 150 carried by bracket 161 to pivot slightly in a counterclockwise direction as viewed in the drawing to shift the idling pinion gear 149 from the untoothed region 156 on the front rack 142 (FIG. 16) rearwardly into meshed engagement with the toothed portion on the rear rack 144, thus causing the housing 91 to translate from left-to-right as viewed in FIG. 16 from the position fragmentarily indicated in phantom lines adjacent the right clutch mechanism 98R towards the opposite end of the rack assembly 141. When the housing 91 has fully translated from left-to-right as viewed in FIG. 16, the pinion gear 149, as it reaches the left end of the rear rack 144 (i.e., the right end as viewed in FIG. 18) adjacent the left clamping mechanism 98L, will leave the toothed portion of the rear rack 144 and commence idling in an untoothed region 176 formed at the extreme left end (the right end as viewed in FIG. 18) of the rear rack, a region comparable to the untoothed region 156 previously described at the opposite end of the front rack 142.

Conversely, whenever the double helix gear 171 is rotated in the opposite direction (i.e.: in a clockwise direction as viewed from the front; or, in the direction of arrow 178 in FIGS. 12, 16 and 18), the pin 168, support 165 and L-shaped bracket 161 will move from left-to-right as viewed in FIG. 12, thereby causing the vertical shaft 150 carried by the clamp 161 to pivot slightly in a clockwise direction as viewed in FIG. 12 to shift the pinion gear 149, which is then idling in the untoothed region 176 (FIG. 18) at the extreme left end of the rear rack 144, forward or from left-to-right as viewed in FIG. 12 so as to re-engage the pinion gear 149 in meshed relation with the front rack 142 as shown in FIGS. 12 and 16, thereby causing the motor/transmission housing 91 to again translate from left-to-right (i.e., right-to-left as viewed in FIG. 16) so as to return the housing 91 to the phantom position shown in FIG. 16 where the housing 91 is substantially located in the vertical plane containing the robot's right leg/foot assembly 71R preparatory to again striding forward with the now-trailing left leg/foot assembly 71L.

Those skilled in the art will appreciate from the foregoing description that whenever the robotic biped 50 (FIG. 1) and its skeletal structure 70 (FIG. 2) are oriented as shown in, for example, FIGS. 3 through 5 (i.e., with the right leg/foot assembly 71R advanced relative to the left leg/foot assembly 71L) and the motor/transmission housing 91 has been shifted laterally into the broken line position shown in FIG. 4 (i.e., it has been translated to the right so as to be substantially located in the vertical plane containing the right leg/foot assembly 71R preparatory to initiating a full stride or step with the left leg/foot assembly 71L), the housing 91 will be fully translated to the right (i.e., fully to the left as viewed in FIG. 16 in phantom); and, therefore, pinion gear 149 will be idling in the untoothed region 156 of the front rack 142. Since the motor 116 (FIGS. 12, 13 and 22) continues to be energized under these assumed operating conditions, drive sleeve 122 continues to rotate coaxially about drive shaft 92; and, when any one of the detent openings 139R on the right end of the sleeve 122 is aligned with the detent pin 140R on the right clutch mechanism 98R (i.e., when the leg-actuating mechanism 90 is conditioned as shown in FIG. 14A corresponding to the position of the skeletal structure 70 shown in FIG. 4), the drive sleeve 122 is positively clutched to the right rotatable pinion gear 94R, thereby initiating a full stride or step with the left leg/foot assembly 71L. As that step proceeds, the motor/transmission housing 91 progressively moves from the broken line position shown in FIG. 4 to: i) that shown in FIG. 7 when the left leg/foot assembly 71L is fully raised off the ground; and ii), that shown in FIG. 9 when the left leg/foot assembly 71L is replanted on the ground in advance of the now-trailing right leg/foot assembly 71R.

Right-To-Left and Left-To-Right Switching Mechanism 179—Generally

Figure 17:
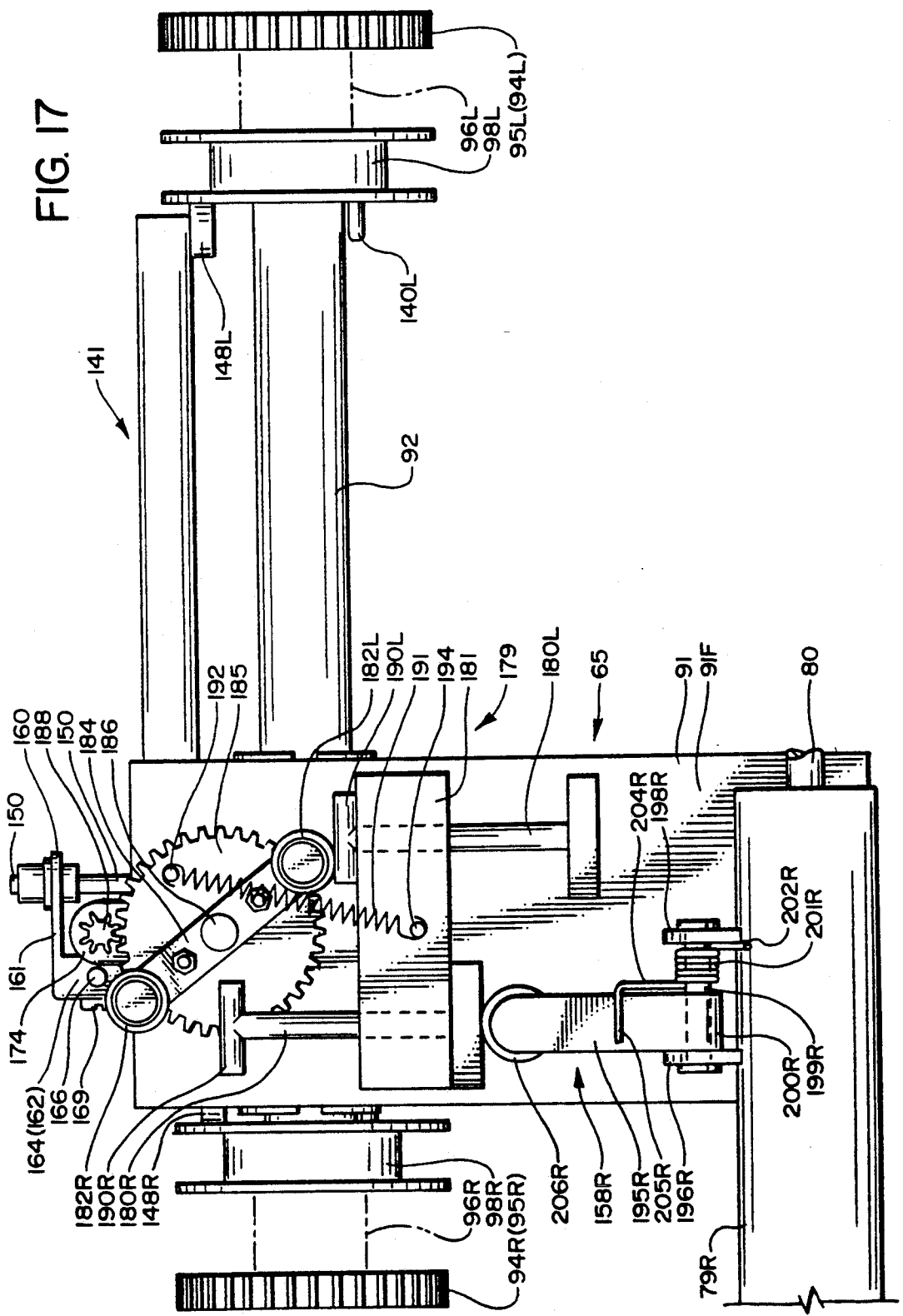
FIG. 17 is a fragmentary front elevational view similar to that shown in FIG. 15 following right-to-left translation of the motor/transmission housing as shown in FIG. 17 to the broken line position shown in FIG. 3.

Referring next to FIGS. 12, 15 and 17 conjointly, an exemplary switching mechanism, generally indicated at 179, has been illustrated which is cooperable with the spring biased switch actuators 158R, 158L on respective ones of the horizontal legs 79R, 79L to alternately rotate the double helix gear 171: i) in the direction of the arrow 175 in FIGS. 12 and 16 when the robotic biped 50 (FIG. 1) has completed a full stride or step with its left leg/foot assembly 71L so as to shift the pinion gear 149 rearwardly into engagement with the rear track 144, thus shifting the housing 91 laterally from right-to-left (i.e., left-to-right as viewed in FIGS. 15 and 16) from the phantom line position shown in FIG. 16 to the phantom line position shown in FIG. 18 where the motor/transmission housing 91 is substantially located in the vertical plane containing the robot's left leg/foot assembly 71L; and ii), in the direction of the arrow 178 in FIGS. 12 and 18 when the robotic biped 50 (FIG. 1) has completed a full stride or step with its right leg/foot assembly 71R so as to shift the idling pinion gear 149 from the phantom line position shown in FIG. 18 forwardly into mesh with the forward rack 142 as shown in FIG. 16 so as to cause the housing 91 to translate from left-to-right (i.e., from right-to-left as viewed in FIG. 16) from the solid line position there shown to the phantom line position located substantially in the vertical plane containing the robot's right leg/foot assembly 71R' thereby initiating a full stride or step with the robot's left leg/foot assembly 71L.

To accomplish the foregoing objectives, the exemplary switching mechanism 179, best depicted in FIGS. 12, 15 and 17, includes a pair of side-by-side right and left crank actuators 180R, 180L which are mounted on the front face 91F of the motor/transmission housing 91 with freedom for limited vertical reciprocation by means of a bracket 181 rigidly secured to the housing 91 in any suitable manner (not shown). In the exemplary device, the upper ends of the crank actuators 180R, 180L are arranged so as to be alternately engagable with respective ones of right and left rollers 182R, 182L mounted on the opposite ends of a reversibly rotatable crank arm 184, such crank arm being affixed to a gear 185 mounted for both clockwise and counterclockwise rotation about the axis of a stub shaft 186 which serves to rotatably mount the gear 185 on the front face 91F of housing 91.

To this end, gear 185 is meshed with a pinion gear 188 splined or otherwise keyed to a shaft-like axial extension 189 formed on, and integral with, the helical gear 171 (FIG. 12) which projects forward through mounting bracket 174. Gear 185 is limited to reversible rotation through an angle of approximately 78° by virtue of the limit positions of the right and left crank actuators 180R, 180L as they reciprocate up and down-that is, and as will become evident upon comparison of FIGS. 15 and 17, the crank arm 184 and gear 185 are limited in their counterclockwise rotation as shown in FIG. 15 by bottoming of a horizontal leg 190R, integral with the upper end of actuator 180R, on bracket 181; and, they are limited in their clockwise rotation as shown in FIG. 17 by bottoming of a horizontal leg 190L, integral with the upper end of actuator 180L, on bracket 181.

In keeping with this aspect of the invention, the crank arm 184 and gear 185 are biased into one of the two (2) limit positions shown in FIGS. 15 and 17 by means of a spring 191 having its upper end affixed to a pin 192 integrally mounted on the gear 185 and its lower end affixed to a pin 194 integrally mounted on the bracket 181. Thus, the arrangement is such that when the crank arm 184 is shifted in a counterclockwise direction from the position shown in FIG. 17 to that shown in FIG. 15 by upward movement of the left crank actuator 180L, as the pin 192 on gear 185 passes a point oriented vertically above the axis of stub shaft 186, the spring 191 serves to rapidly rotate the gear 185 in a counterclockwise direction to the limit position shown in FIG. 15. At the same time, engagement of the roller 182R on crank arm 184 with the horizontal leg 190R on the right actuator 180R serves to force the actuator 180R downwardly from the raised position shown in FIG. 17 to the lowered position shown in FIG. 15. Conversely, when the crank arm 184 is shifted in the opposite direction—i.e., a clockwise direction—from the position shown in FIG. 15 to that shown in FIG. 17 by upward movement of actuator 180R, the spring 191 will again, once the pin 192 passes a point vertically aligned above the shaft 186, serve to rapidly rotate gear 185 in the desired clockwise direction to the limit position shown in FIG. 17; and, the roller 182L on the crank 184 will engage horizontal leg 190L to shift the left actuator 180L downwardly to its lowest position.

Of course, it will be apparent to those skilled in the art from the foregoing description that as the gear 185 rotates in a clockwise direction from the position shown in FIG. 15 to that shown in FIG. 17, pinion gear 188 will be driven in a counterclockwise direction as viewed in FIGS. 15 and 17, thereby rotating the double helix gear 171 in the direction of arrow 175 in FIGS. 12, 16 and 18 so as to cause the pin 168, support 165 and L-shaped bracket 161 to move from right-to-left as viewed in FIG. 12 and from bottom-to-top or front-to-rear as viewed in FIG. 18, thereby pivoting shaft 150 in a counterclockwise direction as viewed in FIG. 12 so as to shift the pinion gear 149 on shaft 150 rearwardly from its idle or dwell position in the untoothed region 156 on front rack 142 into meshed engagement with the toothed portion of the rear rack 144, thereby causing right-to-left translation of the housing 91 from the solid line position shown in FIG. 18 to the phantom position there shown where the housing will be substantially located in a vertical plane containing the robot's left leg/foot assembly 71L and the pinion gear 149 will be idling or dwelling in the untoothed region 176 of the rear rack 144 as the robot steps forward with its right leg/foot assembly 71R.

Conversely, when gear 185 is rotated in a counterclockwise direction as viewed in FIGS. 15 and 17 so as to shift the crank arm 184 from the position shown in FIG. 17 to that shown in FIG. 15, the pinion gear 188 meshed therewith is rotated in the opposite direction—i.e., in a clockwise direction—causing the double helix gear 171 shown in FIGS. 12, 16 and 18 to rotate in the direction of the arrow 178, thereby shifting the pin 168, support 165 and L-shaped bracket 161 from left-to-right as viewed in FIG. 12 and from top-to-bottom or rear-to-front as viewed in FIG. 16, causing the shaft 150 to pivot in a clockwise direction as viewed in FIG. 12 and shifting the pinion gear 149 from an idle or dwell position in the untoothed region 176 of the rear rack 144 forwardly into meshed engagement with the toothed portion of the front rack 142. The motor/transmission housing 91 now translates from left-to-right (i.e., right-to-left as viewed in FIG. 16) from the solid line position in FIG. 16 to the phantom line position there shown where the pinion gear 149 will again idle or dwell in the untoothed region 156 of the front rack 142 in a position substantially located in a vertical plane containing the robot's right leg/foot assembly 71R as a full stride or step is taken with the robot's left leg/foot assembly 71L.

Switching Mechanism 179—Operation

With the foregoing description in mind, the overall operation of the exemplary switching mechanism 179 will now be described, proceeding with the assumption that the robotic biped 50 (FIG. 1) and its skeletal structure 70 (FIG. 2) are initially in the positions shown in FIGS. 1 through 5—i.e., both the right and left leg/foot assemblies 71R, 71L are firmly planted on the ground with the left leg/foot assembly 71L trailing the right leg/foot assembly 71R. That is, the robotic biped 50 (FIG. 1) is conditioned to step forward with its left leg/foot assembly 71L as soon as the motor/transmission housing 91 is fully translated from the solid line position shown in FIGS. 15 and 16 to the phantom position shown in FIG. 16 wherein the pinion gear 149 is idling or dwelling in the untoothed region 156 of the front rack 142. As previously described, the motor/transmission housing 91, when fully translated to the right (i.e., when the housing 91 is in the phantom line position shown in FIG. 16), will lie substantially in the vertical plane containing the robot's right leg/foot assembly 71R so as to position the robot's center of gravity at a point substantially centered above the leading ground-engaged right leg/foot assembly 71R. As a consequence, the robotic biped 50 (FIG. 1) and its skeletal structure 70 (FIG. 2) remain balanced as the left leg/foot assembly 71L: i) is raised off the ground (i.e., in the manner previously described in connection with, and as shown in, FIGS. 6 and 7); and ii), is moved forwardly and downwardly into a ground-engaged position in advance of the now-trailing right leg/foot assembly 71R (i.e., as shown in FIGS. 8 and 9).

Under these assumed conditions, as the rotating drive sleeve 122 reaches the position shown in FIG. 14A, the spring loaded detent pin 140R on the right clutch mechanism 98R snaps into the aligned one of the detent openings 139R in the right end of the drive sleeve 122 so as to clutch and, therefore, drivingly engage the rotatable pinion gear 94R to the power drive system 65, thus initiating lifting of the left leg/foot assembly 71L and advancing of the lifted left leg/foot assembly 71L in a full forward step in the manner previously described. As the robotic biped 50 (FIG. 1) strides forwardly with its left leg/foot assembly 71L, housing 91 remains in the broken line positions shown in FIGS. 3 through 7 with the pinion gear 149 idling or dwelling in the untoothed region 156 of the front rack 142 as indicated in phantom in FIG. 16. Moreover, under these conditions, when the housing 91 translates from left-to-right from the solid line position shown in FIGS. 15 and 16 to the phantom position shown in FIG. 16, the crank arm 184 remains in the spring biased position shown in FIG. 15 with actuator 180R urged to its lowermost position by the roller 182R on the crank arm 184.

However, as the housing 91 is progressively raised and advanced from the broken line position shown in FIG. 4 to that shown in FIG. 7, and is thereafter advanced and lowered from the broken line position shown in FIG. 7 to that shown in FIG. 9, it swings about the drive shaft 92 in a clockwise direction as viewed in the drawings from an almost vertical position as shown in FIG. 7 wherein the spring biased switch actuator 158R is in sliding engagement with the lowermost portion of the front face 91F of the housing 91— viz., well below the right crank actuator 180R which, as noted above, is in the lowermost position shown in FIG. 15, but is now oriented on the right side of the robotic biped 50 vertically above the horizontal support 79R carrying the right spring biased switch actuator 158R—to a more closely horizontal position as shown in FIG. 9. During this clockwise swinging movement of the housing 91—which occurs during the latter half of the step being taken by the robot's left leg/foot assembly 71L while the left leg/foot assembly is moving forwardly and downwardly toward the ground—the spring biased switch actuator 158R is maintained in face-to-face contact with the front face 91F of housing 91; and, as the housing 91 moves downwardly, an actuating arm 195R on the switch actuator 158R is forced downwardly by the housing 91—or pivoted in a clockwise direction from the position shown in FIG. 7 to that shown in FIG. 9.

As the housing 91 continues to move downwardly and forwardly, and as the actuating arm 195R pivots in a clockwise direction, the arm: i) slides upwardly on the front face 91F of the housing 91; ii) engages the lowermost end of the right crank actuator 180R; and iii), begins to shift the actuator 180R upwardly through support bracket 181 against the biasing effect provided by the spring 191 which is tending to urge the gear 185, and therefore the crank arm 184 in a counterclockwise direction. Such sequence of movements tends to gradually shift the right crank actuator 180R upwardly from its lowermost position shown in FIG. 15 towards its uppermost position as shown in FIG. 17; thereby rotating the crank arm 184, against the biasing force provided by spring 191, in a clockwise direction as viewed in FIG. 17, while simultaneously rotating the pinion gear 188, which is meshed therewith and mounted on the double helix gear 171 (FIG. 12), in a counterclockwise direction. Thus, coaction between the right actuator arm 195R and the right crank actuator 180R as the former slides upwardly over the front face 91F of the housing 91 serves to rotate the double helix gear 171 in the direction of the arrow 178 shown in FIGS. 12, 16 and 18, causing the vertical shaft 150 upon which pinion gear 149 is mounted to pivot in a counterclockwise direction as viewed in FIG. 12 to shift the pinion gear 149 rearwardly from its idle or dwell position in the untoothed region 156 of the front rack 142 into meshed engagement with the toothed portion of the rear rack 144.

In keeping with the present invention, the parts comprising the right and left spring biased switch actuators 158R, 158L are preferably dimensioned and positioned such that the spring biased gear 185 commences moving rapidly in a clockwise direction as the pin 192 mounted thereon and coupled to the spring 191, during its clockwise movements, passes through a point disposed vertically above the axis of stub shaft 186, thereby insuring that the pinion gear 149 is meshed with the toothed portion of the rear rack 144 substantially simultaneously with replanting of the robot's left leg/foot assembly 71L on the ground in advance of the trailing right leg/foot assembly 71R as shown in FIG. 9. That is, at virtually the same instant that the left leg/foot assembly 71L is again placed on the ground as shown in FIG. 9, the pin 192 on gear 185 moves in a clockwise direction through a point vertically aligned above the axis of stub shaft 186; the biasing force provided by the spring 191 causes the gear 185 and crank arm 184 to rapidly complete its clockwise rotation as the crank arm 184 moves to the limit position shown in FIG. 17; and, such rapid clockwise rotation is accompanied by rapid rearward movement of the pinion gear 149 into meshed engagement with the toothed portion of the rear rack 144. The housing 91 now shifts from its broken line position shown in FIGS. 6 and 8 corresponding to the phantom position shown in FIG. 16 to the phantom line position shown in FIGS. 8 and 10 corresponding to the phantom position shown in FIG. 18 preparatory to initiation by the robotic biped 50 of a full step with the right leg/foot assembly 71R. As the pinion gear 149 translates from right-to-left along the rear rack 144 (i.e., from left-to-right as viewed in FIGS. 16 and 18), it moves off the toothed portion of the rack 144 into the untoothed region 176 shown in FIG. 18 where it idles or dwells during movement of the robot's right leg/foot assembly 71R.

In order to permit the right and left actuating arms 195R, 195L to pivot in a clockwise direction as described above in connection with FIGS. 7 and 9, and as best shown by reference to FIGS. 12, 15 and 17 conjointly, the right and left spring biased switch actuators 158R, 158L each include a pair of laterally spaced, vertically upstanding, support brackets 196R, 198R and 196L, 198L which are integrally mounted, in any suitable manner (not shown), on respective ones of the horizontal supports 79R, 79L defining the pelvic girdle of the exemplary skeletal structure 70. The pairs of brackets 196R, 198R and 196L, 198L fixedly support respective ones of transverse round support shafts 199R, 199L, each having an effective length intermediate the brackets 196R, 198R and 196L, 198L approximately twice the transverse width of the right and left actuator arms 195R, 195L.

To permit pivotal movement of the relatively rigid right and left actuator arms 195R, 195L on respective ones of the fixed horizontal support shafts 199R, 199L when the actuator arms are engaged by the housing 91, the lower ends of the actuator arms are formed with integral, hollow, transverse sleeves 200R, 200L (best shown in FIG. 12 in broken lines) which are adapted to be rotatably mounted coaxially about respective ones of the horizontal support shafts 199R, 199L. Compressible coil springs 201R, 201L are also mounted coaxially about respective ones of the support shafts 199R, 199L in the region intermediate the actuator arms 195R, 195L and the immediately adjacent inboard support brackets 198R, 198L. In the exemplary arrangement, the inboard free ends 202R, 202L of respective ones of the coil springs 201R, 201L extend tangentially therefrom and engage respective ones of the horizontal supports 79R, 79L; while the outboard free ends 204R, 204L of respective ones of the coil springs 201R, 201L extend tangentially therefrom at substantially right angles to the tangentially extending inboard ends 202R, 202L, as best shown in FIG. 12. Each outboard free end 204R, 204L is bent at right angles to form a horizontally oriented, transversely extending, leg 205R, 205L engaging the forward face of respective ones of the right and left actuator arms 195R, 195L so as to normally bias the actuator arms rearwardly (i.e., in a counterclockwise direction as viewed in FIG. 12) towards engagement with the front face 91F of the motor and transmission housing 91.

Finally, the upper ends of the right and left and actuator arms 195R, 195L are provided with rollers, respectively indicated at 206R, 206L in FIGS. 15 and 17, which are engagable with both the front face 91F of the motor/transmission housing 91 and the bottoms of respective ones of the right and left crank actuators 180R, 180L, thereby facilitating lateral translation of the housing 91: i) from left-to-right (i.e., right-to-left as viewed in FIG. 15) when the pinion gear 149 is initially meshed with the front rack 142 as shown in FIG. 16; and ii), from right-to-left (i.e., left-to-right as viewed in FIG. 17) when the pinion gear 149 is initially meshed with the rear rack 144 as shown in FIG. 18.

Optional Counterbalance System 208

Those skilled in the art will appreciate from the foregoing that there has hereinabove been described a skeletal structure 70 (FIGS. 2 through 11) for, e.g., a robotic biped 50 (FIG. 1) which is characterized by its ability to walk in a manner simulating a human gait—i.e., by: i) lifting its trailing first leg/foot assembly when the robot's weight is stably balanced on its leading ground-engaged second leg/foot assembly; ii) striding forwarding with the raised first leg/foot assembly and replanting such assembly on the ground in advance of the previously leading, and now trailing, second leg/foot assembly; iii) lifting its now trailing second leg/foot assembly while the robot's weight is stably balanced on its now leading ground-engaged first leg/foot assembly; iv) striding forward with the raised second leg/foot assembly and replanting such assembly on the ground in advance of the previously leading, and now trailing, ground-engaged first leg/foot assembly; and v), iterating the foregoing steps (i) through (iv) a sufficient number of times to enable the robotic biped 50 (FIG. 1) to "walk"—as contrasted with rolling or gliding on wheels or tracks—any desired distance from point "A" to point "B". Moreover, it will also further be appreciated that the exemplary robotic biped 50 (FIG. 1) as thus far described is, in actuality, self-balancing without the need for gyroscopes such as used in the aforesaid Jameson Patent or separable weights such as used in the aforesaid Mikolasek, Melville and Powelson Patents; and, this has been accomplished by causing the power drive system 65 itself to traverse from left-to-right when the robot's left leg/foot assembly 71L is to be raised off the ground and from right-to-left when the robot's right leg/foot assembly 71R is to be raised off the ground.

However, in the practice of the present invention, it may, in some instances, be desirable to provide additional counterbalancing mechanisms to insure stability under a wide range of operating conditions. To this end, the exemplary robotic biped 50 (FIG. 1) of the present invention may optionally include an additional counterbalance system such as that generally indicated at 208 in FIGS. 12, 19 and 20 which takes advantage of lateral left-to-right and right-to-left translation of the motor/transmission housing 91 to shift one or more additional counterbalance weights left or right as required. In carrying out this aspect of the invention, and as best shown in FIG. 12, it will be observed that the exemplary battery pack 118—which can comprise any suitable, conventional, and, if desired, rechargeable battery pack available in the marketplace—used to provide power for the motor 116 is removably mounted in a generally C-shaped transverse support bracket 209, thereby facilitating removal and replacement of the battery pack for purposes of recharging and/or replacement, as required. Bracket 209 is, in turn, fixedly secured to any suitable lead weight or like counterbalance, here indicted at 210, which is mounted within a rearwardly facing C-shaped channel 211 formed in the lowermost portion of the rear face 91R of the motor/transmission housing 91 with freedom for left-to-right and right-to-left translation therein.

Figure 19:
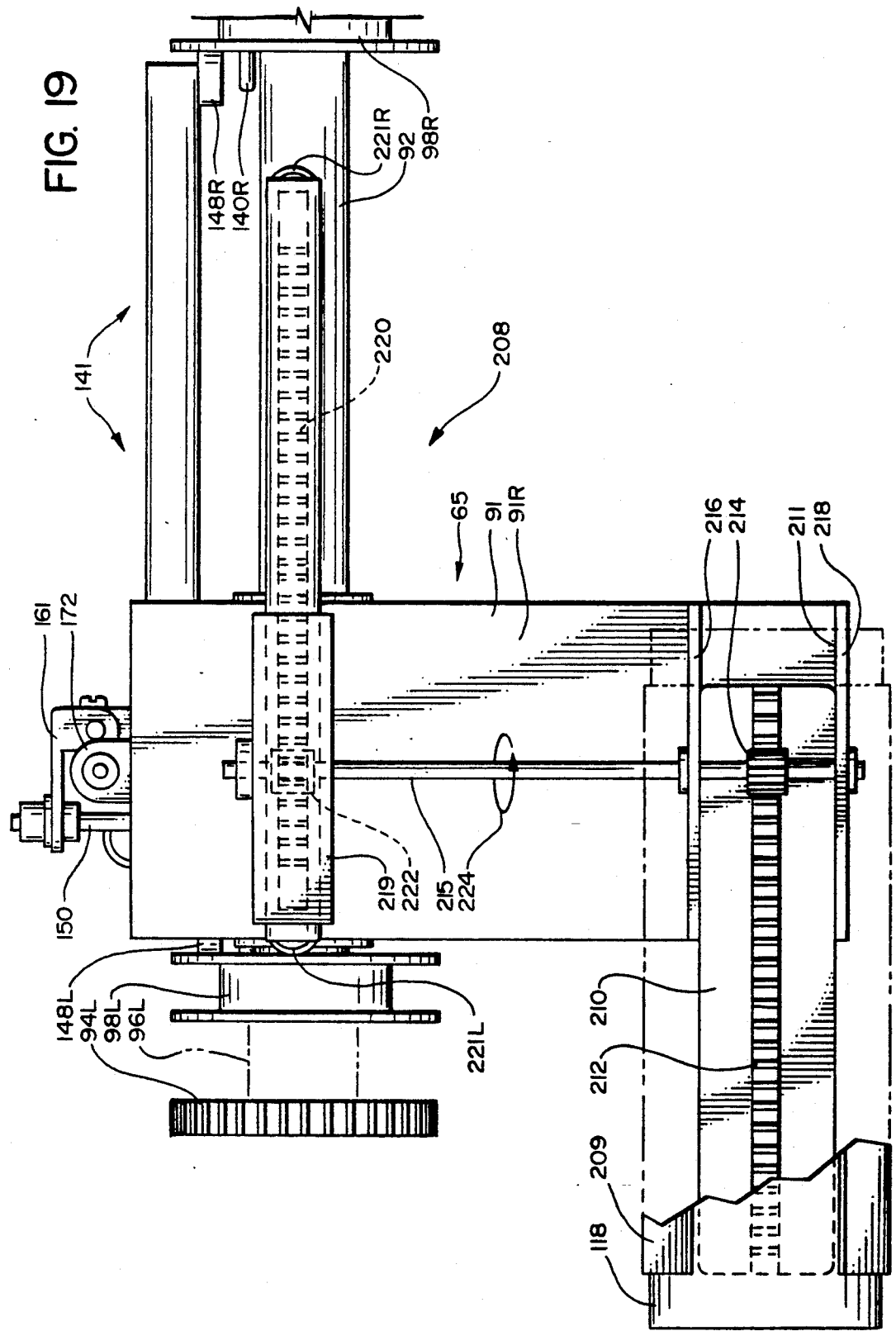
FIG. 19 is a fragmentary rear elevational view, taken substantially along the line 19—19 in FIG. 12, illustrating a portion of the robot's skeletal frame and here depicting an exemplary, but optional, counterbalance system for the robot as initially deployed when the motor/transmission housing is located in a vertical plane substantially centered with respect to the robot's left leg/foot assembly while the latter is firmly planted on the ground.
Figure 20:
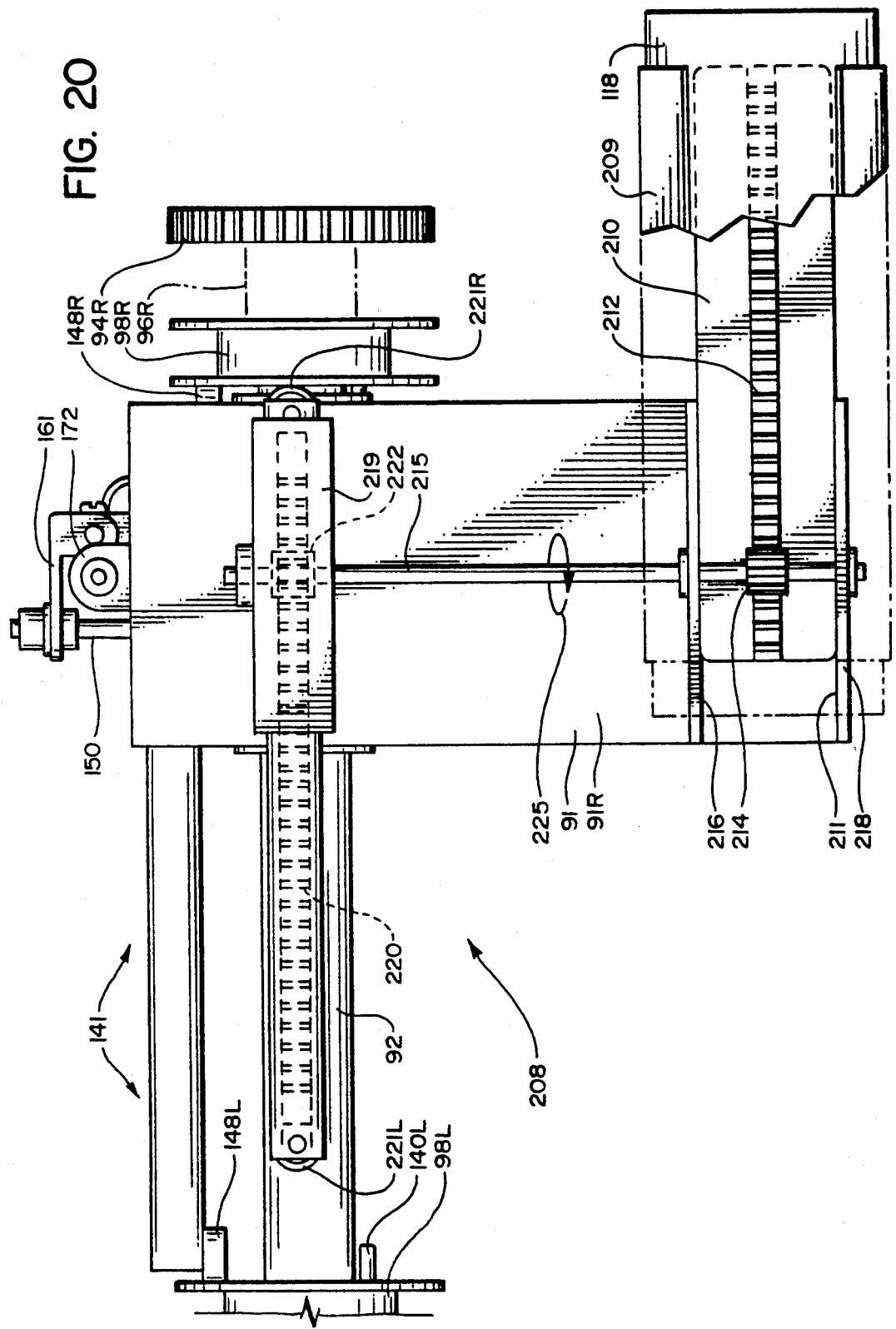
FIG. 20 is a fragmentary rear elevational view similar to that shown in FIG. 19, but here depicting the exemplary counterbalance system as initially deployed when the motor/transmission housing is substantially centered in a vertical plane containing the robot's right leg/foot assembly when the latter is firmly planted on the ground.

To enable lateral translation of the counterbalance weight 210 within channel 211, a rearwardly facing rack 212 is mounted on the rear vertical surface of the counterbalance weight 210, which rack extends laterally the full transverse width of the weight as best shown in FIGS. 19 and 20. Rack 212 is meshed with a pinion gear 214 splined or otherwise keyed on a vertical shaft 215 journaled for rotation at its lower end in a pair of vertically spaced, rearwardly extending, transverse flanges 216, 218 defining a portion of the C-shaped channel 211 on housing 91. At its upper end, shaft 215 is journaled for rotation in a bracket 219 rigidly secured to the rear face 91R of housing 91 in any suitable manner (not shown); and, in the exemplary counterbalance system 208, the bracket 219 also serves to support a forward facing, transverse, upper rack 220 which, as best shown in FIGS. 19 and 20, has a transverse length less than the distance between the right and left clutch mechanisms 98R, 98L. The upper forwardly facing rack 220 is positioned on the housing 91 immediately to the rear of drive shaft 92 such that it extends transversely between the right and left clutch mechanisms 98R, 98L at all times, with the opposite ends of the upper rack 220 having right and left rollers 221R, 221L secured thereto and which are engagable with respective ones of the clutch mechanisms 98R, 98L. Finally, the upper end of the vertical shaft 215 has a second pinion gear 222 splined or otherwise keyed thereon and in meshed engagement with the upper forwardly facing rack 220.

Thus, the arrangement is such that when the motor transmission housing 91 begins to translate from, for example, left-to-right as viewed in the rear elevational view of FIG. 19, the battery pack 118 and counterbalance weight 210 extend slightly outboard (i.e., to the left as viewed in FIG. 19) of the vertical centerline extending through housing 91. As left-to-right translation of housing 91 proceeds, the battery pack 118 carried in bracket 209 and the counterbalance weight 210 move from left-to-right in unison with the housing 91. However, when the housing 91 has moved partially to the right from its initial position as viewed in FIG. 19, and while it is still translating from left-to-right in unison with left-to-right movement of the housing 91, the right roller 221R on rack 220 engages the inboard face of the right clutch mechanism 98R, thereby precluding further left-to-right movement of the upper rack 220.

Consequently, as the housing 91 continues to translate from left-to-right, the upper pinion gear 222 is forced to "walk" along the now stationary, forwardly facing, upper rear rack 220, causing rotation of vertical shaft 215 in the direction of arrow 224; and, such rotation, though shaft 215 and the lower pinion gear 214, causes the rearwardly facing lower rack 212 on weight 210 to commence moving from left-to-right with respect to the housing 91 which is continuing to move from left-to-right. When the housing 91 is fully translated to the right and is located in the position shown in FIG. 20, it will be observed that the battery pack 118 and bracket 209, together with the counterbalance weight 210, have moved left-to-right relative to the housing 91 such that their center of gravity is now located outboard and to the right of a vertical centerline passing through the housing 91.

Conversely, when the motor/transmission housing 91 moves from right-to-left from the position shown in FIG. 20 towards that shown in FIG. 19, the battery pack 118, bracket 209 and counterbalance weight 210 will move from right to left in unison therewith until such time as the left roller 221L on the upper rack 220 engages the inboard face of the left clutch mechanism 98L. At this point, further right-to-left movement of the upper rack 220 is precluded, although the motor/transmission housing 91 on which the upper rack 220 is slidably mounted, continues to move from right-to-left. This forces the upper pinion gear 222 to "walk" along the upper rack 222, thus rotating shaft 215 in the direction of arrow 225 as viewed in FIG. 20. Such rotary motion of the shaft 215 and, therefore, of the lower pinion gear 214 splined or otherwise keyed thereto, forces the lower rack 212, counterbalance weight 210, battery pack 118 and bracket 209 to begin to move from right-to-left relative to the housing 91 which is continuing to move from right-to-left, thereby returning the counterbalance system 208 to the position shown in FIG. 19 when the housing 91 has completed its right-to-left translation.

Turning Mechanism 226

Figure 21:
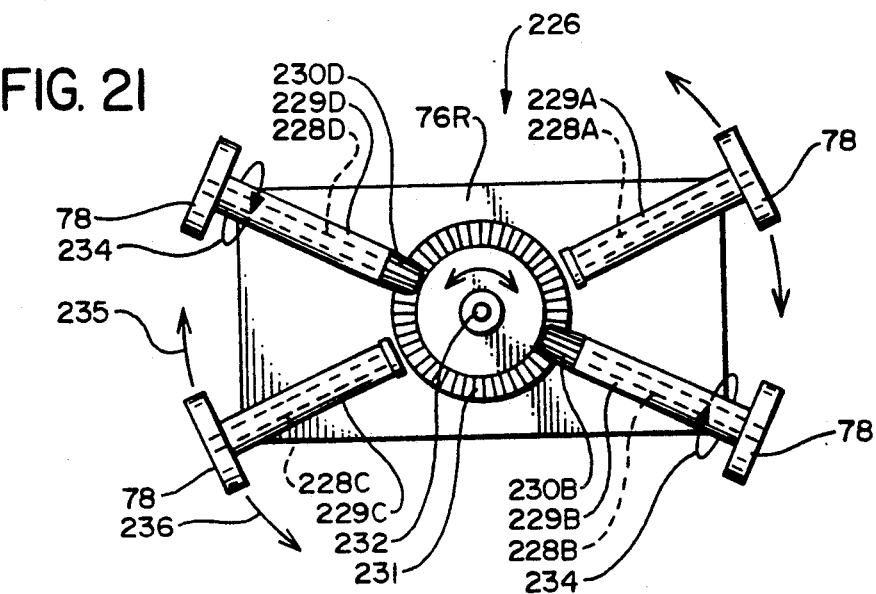
FIG. 21 is a bottom plan view taken substantially along the line 21<21 in FIG. 4, here depicting details of a portion of the mechanism permitting the robot to turn either to the left or to the right through any desired angle from 0° to 360° when the robot's right foot is placed on the ground; and, FIG. 22 is a fragmentary exploded schematic view, partially in block-and-line form, here diagrammatically illustrating a highly simplified exemplary electrical control system for actuating a remote controlled, two-legged walking robot embodying features of the present invention.

In accordance with yet another or the important aspects of the present invention, and as best understood by reference to, for example, FIGS. 4 and 21 conjointly, provision is made for enabling the exemplary robotic biped 50 (FIG. 1) to turn either to the left or to the right upon command. To accomplish this, and in the exemplary embodiment of the invention depicted in the drawings, the robotic biped 50 includes a turning mechanism, generally indicated at 226, which here includes four (4) rotatable wheels 78 supported on respective ones of shafts 228A through 228D, as best shown in FIG. 21, which are mounted for rotation within respective ones of four (4) shaft housings 229A through 229D fixedly secured in any suitable manner (not shown) to the bottom of, for example, the right foot platform 76R in a generally X-shaped configuration. In the illustrative form of the invention, shafts 228A and 228C are coaxial; and, both the shafts and the wheels 78 mounted thereon, while freely rotatable, are idlers and are not driven. Shafts 228B and 228D, which are also coaxial, together with the wheels mounted thereon, are, on the other hand, adapted to be rotatably driven in one direction or the other when the operator decides to turn the robotic biped 50 either to the left or to the right.

In carrying out this aspect of the invention, shafts 228B, 228D each include a slightly tapered bevel gear 230B, 230D splined or otherwise keyed to their inboard ends, such gears being meshed with a horizontally disposed ring-like bevel gear 231 rotatably mounted beneath the right foot platform 76R on the end of a drive shaft 232 which here constitutes the output drive shaft of the reversible servo motor 68. Thus, the arrangement is such that when the reversible servo motor 68 is energized to drive the ring-like bevel gear 231 in a clockwise direction as viewed in FIG. 21, the wheels 78 on the outboard ends of shafts 228B, 228D will be rotatably driven in the direction of arrow 234 in FIGS. 4 and 21, causing the robotic biped 50 to turn—i.e., rotate about the axis of the servo motor shaft 232 which is coincident with the vertical axis passing through the robot's ground-engaged right leg/foot assembly 71R—in the direction of the arrow 235 in FIG. 21 (i.e., in a clockwise direction as viewed in FIG. 21). Conversely, counterclockwise rotation of the servo motor drive shaft 232 as viewed in FIG. 21 will cause the driven shafts 228B, 228D to rotate in a direction opposite to the arrow 234, causing the robotic biped 50 to turn in the opposite direction as indicated by arrow 236 in FIG. 21.

System Operation/Exemplary Control Circuit 238

Referring now to FIGS. 12 and 22, the overall operation of the exemplary remote controlled robotic biped 50 (FIG. 1) of the present invention will be described. However, before proceeding with a brief description of the exemplary control circuit, generally indicated at 238 in FIG. 22, attention is first direction to FIG. 12. Thus, as previously described, motor 116, which serves to provide power for actuating the robot's right and left leg/feet assemblies 71R, 71L, is adapted to be selectively coupled to, and energized by, a power source which here takes the form of a completely conventional and, if desired, rechargeable battery pack 118. To enable such selective energization of motor 116, the exemplary robotic biped 50 includes a conventional servo control, indicated in phantom in FIG. 12 at 239, which can be mounted at any convenient place within housing 91 enabling electrical coupling and de-coupling of the battery pack 118 to or from the motor 116.

The reversible servo motor 68 (FIGS. 4 and 21) used to enable the robot's turning mechanism 226 derives its power from a second completely conventional battery pack indicated in phantom at 240 in FIG. 12—which second battery pack may also be rechargeable. Battery pack 240 may also be mounted on housing 91 at any convenient location and in any suitable manner (not shown).

Finally, the illustrative biped 50 (FIG. 1) includes a completely conventional dual channel receiver, indicated in phantom at 241 in FIG. 12. Again, the particular means for mounting the receiver 241 and its location are not critical to the present invention; but, the receiver 241 is preferably mounted on and carried by housing 91.

Having the foregoing in mind, attention is now directed to FIG. 22. Assuming the operator desires to initiate walking movement of the robotic biped 50, toggle switch 62 on the remote controlled transmitter 60 (FIGS. 1 and 22) is depressed, causing transmission of a wireless radio signal to the dual channel receiver 241. Upon receipt of such signal, the dual channel receiver 241 conveys a command via line 242 to the servo control 239 which serves to close switch S-1 so as to couple the positive and negative terminals 244, 245 of battery pack 118 to the motor 116 via lines 246, 248, thereby energizing the motor and initiating walking movement in the manner previously described. If desired, although completely optional, closure of switch S-1 can also serve to couple the positive and negative terminals 248, 245 of the battery pack 118 via lines 246/249 and 248/250 to lights (not shown) mounted in the sockets of the robot's eyes 54. In either case, closure of switch S-1 serves to energize motor 116, thereby initiating a series of steps in the manner described above; and, the robotic biped 50 continues to walk until such time as the operator releases toggle switch 62 or moves it in the opposite direction so as to open switch S-1.

Similarly, in order to cause the robotic biped 50 to turn, the operator moves toggle switch 66 on the remote control transmitter 60 in one direction or the other—e.g., to the right to make the robotic biped 50 turn to the right, or to the left to make it turn to the left. Once again, a wireless radio signal is conveyed to the dual channel receiver 241 which, dependent upon the direction of movement of the toggle switch 66, will cause a suitable command to be conveyed via line 251 to cause a switch S-2 to move its switch contacts: i) in one direction to couple the positive and negative terminals 252, 254 of the second battery pack 240 to respective ones of the terminals 255, 256 associated with the reversible servo motor 68, thereby driving the motor's output shaft 232 in one direction and causing the robotic biped 50 to turn in one direction about a vertical axis passing through its ground-engaged right leg/foot assembly 71R; or ii), in the opposite direction to couple the positive and negative terminals 252, 254 of the second battery pack 240 to respective ones of the terminals 256, 255 associated with the reversible servo motor 68, thereby driving the motor's output shaft 232 in the opposite direction and causing the robotic biped 50 to turn in the opposite direction about a vertical axis passing through its ground-engaged right leg/foot assembly 71R.

Those persons skilled in the art will appreciate that the particular details of the exemplary control circuit 238 depicted in generalized format in FIG. 22 do not form part of the present invention. That is, remote control transmitter 60, receiver 241, servo control 239, reversible servo motor 68, and switches S-1, S-2 are all completely conventional and can be configured in virtually any desired arrangement, using any of commercially available electronic components, to provide the desired result.

Thus, there has hereinabove been described a remote controlled robotic biped 50 (FIG. 1) which is capable of simulating the normal walking gaits of humans, humanoids, animals, aliens and/or similar creatures which can walk in either a straight line or follow a tortuous path, all by: i) lifting its trailing first leg/foot assembly while its weight is stably balanced on its leading ground-planted, second leg/foot assembly; ii) moving the raised first leg/foot assembly forward; iii) replanting the raised first leg/foot assembly on the ground in advance of the previously leading, and now trailing, second leg/foot assembly, thereby completing a first step with the first leg/foot assembly; iv) shifting its center of gravity laterally to a vertical plane containing the now leading, ground-engaged, first leg/foot assembly; and v), replicating the foregoing sequence of stepping operations to move its second leg/foot assembly through a second full step. Moreover, the present invention readily permits the robotic biped 50 to be turned to either the left or to the right about a vertical axis coincident with the vertical axis passing through the particular one of the ground-engaged leg/foot assemblies upon which the turning mechanism 226 is supported.

I claim:

1. An actuating mechanism for a multi-legged comprising, in combination:
  a) a skeletal frame;
  b) first and second leg/foot assemblies forming part of said skeletal frame and residing in respective ones of first and second spaced parallel vertical planes;
  c) means forming part of said skeletal frame for articulatably interconnecting said first and second leg/foot assemblies in such a manner that whenever both of said first and second leg/foot assemblies are firmly planted on the ground, one of said ground-engaged leg/foot assemblies is advanced relative to the other of said ground-engaged leg/foot assemblies, and for maintaining both of said first and second leg/foot assemblies in respective ones of said first and second spaced parallel vertical planes at all times;

d) means supported by said skeletal frame for establishing the robot's center of gravity substantially in the one of said first and second spaced parallel vertical planes containing the leading one of said ground-engaged first and second leg/foot assemblies and for shifting the robot's center of gravity laterally into the other of said first and second spaced parallel vertical planes when the trailing one of said ground-engaged first and second leg/foot assemblies is advanced into a ground-engaged position in advance of the previously leading one of said first and second leg/foot assemblies;

e) first actuating means mounted on said first leg/foot assembly adapted to be drivingly coupled to said second leg/foot assembly when said first leg/foot assembly is firmly planted on the ground in advance of said ground-engaged second leg/foot assembly for raising said trailing ground-engaged second leg/foot assembly off the ground and advancing said raised second leg/foot assembly into a ground-engaged position in advance of said ground-engaged first leg/foot assembly;

f) second actuating means mounted on said second leg/foot assembly adapted to be drivingly coupled to said first leg/foot assembly when said second leg/foot assembly is firmly planted on the ground in advance of said ground-engaged first leg/foot assembly for raising said trailing ground-engaged first leg/foot assembly off the ground and advancing said raised first leg/foot assembly into a ground-engaged position in advance of said ground-engaged second leg/foot assembly;

g) a source of motive power carried by said skeletal frame and, h) means for coupling said source of motive power to said first actuating means when said first leg/foot assembly is firmly planted on the ground in advance of said ground-engaged second leg/foot assembly so as to raise and advance said second leg/foot assembly and for coupling said source of motive power to said second actuating means when said second leg/foot assembly is firmly planted on the ground in advance of said ground-engaged first leg/foot assembly so as to raise and advance said first leg/foot assembly.

2. An actuating mechanism as set forth in claim 1 wherein said first and second actuating means include a transversely extending common drive shaft, said source of motive power is mounted on said drive shaft with freedom for left-to-right and right-to-left translation therealong, and said source of motive power forms a portion of said means for establishing the robot's center of gravity substantially in the one of said first and second spaced parallel vertical planes containing the leading one of said ground-engaged first and second leg/foot assemblies.

3. An actuating mechanism as set forth in claim 2 wherein said first and second actuating means include: i) respective ones of first and second stationary pinion gears fixedly mounted on respective ones of said first and second leg/foot assemblies; and ii), first and second rotatable pinion gears maintained in meshed relation with respective ones of said first and second stationary pinion gears with freedom for orbital movement about respective ones of said first and second stationary pinion gears; and, said first and second rotatable pinion gears are fixedly mounted on opposite ends of said transversely extending common drive shaft.

4. An actuating mechanism as set forth in claim 3 wherein said first and second actuating means respectively include first and second clutch mechanisms non-rotatably mounted on opposite ends of said transversely extending common drive shaft, said first and second clutch mechanisms including means for drivingly coupling said transversely extending common drive shaft and said first and second rotatable pinion gears non-rotatably mounted at the opposite ends thereof to said source of motive power when said source of motive power is shifted laterally on said transversely extending common drive shaft into engagement with the one of said first and second clutch mechanisms mounted adjacent the leading one of said ground-engaged first and second leg/foot assemblies so as to rotatably drive said shaft about its transverse axis, thereby causing: i) the one of said first and second rotatable pinion gears meshed with the one of said first and second stationary pinion gears mounted on the initially leading one of said ground-engaged first and second leg/foot assemblies to orbit about its associated meshed stationary pinion gear with the axis of said transversely extending common drive shaft orbiting upwardly, forwardly and downwardly about the axis of that one of said first and second stationary pinion gears mounted on the initially leading one of said ground-engaged first and second leg/foot assemblies during the first 180° of rotation of said first and second rotatable pinion gears while the other of said first and second rotatable pinion gears which is meshed with the one of said first and second stationary pinion gears mounted on the initially trailing one of said ground-engaged first and second leg/foot assemblies simultaneously orbits downwardly rearwardly, and upwardly about its associated meshed stationary pinion gear so as to cause the initially trailing one of said ground-engaged first and second leg/foot assemblies to be raised off the ground and advanced from its initially trailing position to a leading ground-engaged position and thereby complete one full step of the robot while said source of motive power is oriented in the one of said first and second spaced parallel vertical planes containing the initially leading one of said ground-engaged first and second leg/foot assemblies so as to insure that the robot's center of gravity is located substantially in the one of said first and second spaced parallel vertical planes containing the initially leading one of said first and second ground-engaged leg/foot assemblies; and ii), the one of said first and second rotatable pinion gears meshed with the one of said first and second stationary pinion gears mounted on the initially trailing, and now leading, one of said ground-engaged first and second leg/foot assemblies to orbit about its associated meshed stationary pinion gear with the axis of said transversely extending common drive shaft orbiting upwardly, forwardly and downwardly about the axis of that one of said first and second stationary pinion gears mounted on the initially trailing, and now leading, one of said ground-engaged first and second leg/foot assemblies during the second 180° of rotation of said first and second rotatable pinion gears while the other of said first and second rotatable pinion gears which is meshed with the one of said first and second stationary pinion gears mounted on the initially leading, and now trailing, one of said ground-engaged first and second leg/foot assemblies simultaneously orbits downwardly, rearwardly and upwardly about its associated meshed stationary pinion gear so as to cause the initially leading, now trailing, one of said ground-engaged first and second leg/foot assemblies to be raised off the ground and advanced from its trailing position to a leading ground-engaged position and thereby complete a second full step of the robot while said source of motive power is oriented in the one of said first and second spaced parallel vertical planes containing the initially trailing, now leading, one of said ground-engaged first and second leg/foot assemblies so as to insure that the robot's center of gravity is located substantially in the one of said first and second spaced parallel vertical planes containing the initially trailing, now leading, one of said first and second ground-engaged leg/foot assemblies.

5. An actuating mechanism as set forth in claim 4 wherein said source of motive power includes a continuously driven cylindrical rack coaxially mounted on said transversely extending common drive shaft with freedom for relative rotation about said shaft and left-to-right and right-to-left translation therealong, said cylindrical rack including one of an axially directed spring-loaded detent and means defining at least one axially directed detent opening formed on or in its opposite lateral extremities, and said first and second clutch mechanisms each including the other of said axially directed spring-loaded detent and means defining at least one axially directed detent opening formed thereon or therein such that when said source of motive power is shifted laterally on said transversely extending drive shaft so as to shift said continuously driven cylindrical rack towards one or the other of said first and second clutch mechanisms, said spring-loaded detent is initially depressed and as said rack rotates about its axis said depressed spring-loaded detent snaps into said means defining at least one detent opening when the two are aligned so as to establish a drive connection between said rack and the immediately adjacent one of said first and second clutch mechanisms.

6. An actuating mechanism as set forth in claim 1 wherein at least one of said first and second leg/foot assemblies includes power-driven, selectively operable, ground-engagable means for turning the robot and said skeletal frame to either the right or to the left about a vertical axis passing through said at least one leg/foot assembly when planted on the ground, and means for activating said power-driven, selectively operable, ground-engagable means when firmly planted on the ground to cause the robot to turn to the right or to the left either when standing still or while walking.

7. An actuating system for robots enabling the robot to: i) raise its trailing leg/foot assembly off the ground while its leading leg/foot assembly is planted on the ground and its center of gravity is disposed in a vertical plane normal to the robot's transverse axis and containing the leading leg/foot assembly; and ii), advance such raised leg/foot assembly into a ground-engaged position in advance of its previously leading, and now trailing, leg/foot assembly, said actuating system comprising, in combination:
   a) right and left leg/foot assemblies;
   b) tie rod defining means coupling said right and left leg/foot assemblies together with freedom for the initially trailing one of said right and left leg/foot assemblies to be raised off the ground and advanced in a vertical plane parallel to the vertical plane containing the initially leading one of said right and left leg/foot assemblies to a ground-engaged position in advance of the previously leading, now trailing, one of said right and left leg/foot assemblies;
   c) means defining a leg actuating mechanism for raising the trailing one of said right and left leg/foot assemblies and advancing said raised leg/foot assembly to a ground-engaged position in advance of the previously leading, now trailing, one of said leg/foot assemblies, said means defining a leg actuating mechanism including:
      i) right and left stationary pinion gears non-rotatably and fixedly secured to respective ones of said right and left leg/foot assemblies;
      ii) a transverse drive shaft;
      iii) right and left rotatable pinion gears non-rotatably secured to respective ones of the right and left ends of said transverse drive shaft;
      iv) a right gear support bracket rotatably coupled to each of said right stationary and rotatable pinion gears for maintaining said right stationary and rotatable pinion gears in meshed relation at all times; and,
      v) a left gear support bracket rotatably coupled to each of said left stationary and rotatable pinion gears for maintaining said left stationary and rotatable pinion gears in meshed relation at all times;
   d) said right and left rotatable pinion gears being oriented with respect to respective ones of said right and left stationary pinion gears such that when said robot's right and left leg/foot assemblies are both firmly planted on the ground with one of said right and left leg/foot assemblies trailing the other of said right and left leg/foot assemblies, all of said right and left rotatable and stationary pinion gears lie in a common horizontal plane with the one of said right and left stationary pinion gears mounted on the leading one of said right and left leg/foot assemblies being disposed forward of its associated meshed rotatable pinion gear and the other of said right and left stationary pinion gears mounted on the trailing one of said right and left leg/foot assemblies being disposed aft of its associated meshed rotatable pinion gear;
   e) power drive means supported by said transverse drive shaft with freedom for right-to-left and left-to-right translation therealong;
   f) means for shifting said power drive means laterally on said transverse drive shaft substantially into a vertical plane normal to said shaft and containing the leading one of said right and left leg/foot assemblies at such time as both of said right and left leg/foot assemblies are firmly planted on the ground with one advanced relative to the other; and,
   g) means for coupling said power drive means to the one of said right and left rotatable pinion gears meshed with the one of said stationary pinion gears mounted on the leading one of said right and left leg/foot assemblies so as to rotatably drive the same and thereby simultaneously rotatably drive said drive shaft and the other of said right and left rotatable pinion gears to cause the one of said rotatable pinion gears associated with the leading one of said leg/foot assemblies to walk about the one of said stationary pinion gears with which it is meshed from a position aft thereof and in the same horizontal plane therewith to successive positions vertically above said meshed stationary pinion gear and advanced with respect to said meshed stationary pinion gear and in the same horizontal plane therewith, thereby causing said driven rotatable drive shaft to orbit in a horizontal plane about the axis of the one of said stationary pinion gears associated with the initially leading one of said right and left leg/foot assemblies while simultaneously causing the other of said rotatable pinion gears associated with the initially trailing one of said right and left leg/foot assemblies to walk about its meshed stationary pinion gear from a position forward thereof and in the same horizontal plane therewith to successive positions vertically below said meshed stationary pinion gear and aft of said meshed stationary pinion gear and in the same horizontal plane therewith so as to raise the initially trailing one of said right and left leg/foot assemblies off the ground while the robot's center of gravity is substantially contained in the same vertical plane containing the initially leading one of said right and left leg/foot assemblies and to advance said initially trailing raised leg/foot assembly and replant it on the ground in advance of the initially leading, now trailing, one of said leg/foot assemblies.

8. An actuating system for robots as set forth in claim 7 wherein said power drive means is mounted within a housing; front and rear, spaced apart, facing racks extend transversely through said housing between said right and left leg/foot assemblies; means for precluding lateral movement of said front and rear racks relative to said right and left leg/foot assemblies are mounted on said right and left leg/foot assemblies; one of said front and rear racks is provided with an untoothed region at the extremity thereof adjacent said right leg/foot assembly and the other of said front and rear racks is provided with an untoothed region at the extremity thereof adjacent said left leg/foot assembly; said power drive means including a driven rotatable pinion gear positioned intermediate said front and rear racks for meshed engagement with one or the other of said front and rear racks; and, said means for shifting said power drive means laterally on said transversely extending common drive shaft includes means for shifting said last named driven rotatable pinion gear: i) into engagement with the one of said front and rear racks having said untoothed region at the extremity thereof adjacent said right leg/foot assembly when said right leg/foot assembly is initially planted on the ground in advance of said left leg/foot assembly so as to cause said last named rotatable pinion gear to walk along said one rack with which it is engaged until it reaches said untoothed region thereof and thereby cause said housing and said power drive means to translate laterally from a position lying substantially in the vertical plane containing said left leg/foot assembly to a position lying substantially in the vertical plane containing said right leg/foot assembly, whereby coupling of said power drive means to said right rotatable pinion gear causes said trailing left leg/foot assembly to be raised off the ground and advanced into a ground-engaged position in advance of said initially leading, now trailing, right leg/foot assembly as said last named driven rotatable pinion gear idles in said untoothed region of said one rack; and ii), into engagement with the other of said front and rear racks having said untoothed region at the extremity thereof adjacent said left leg/foot assembly when said left leg/foot assembly is initially planted on the ground in advance of said initially leading, now trailing, right leg/foot assembly so as to cause said last named driven rotatable pinion gear to walk along said other rack with which it is engaged until it reaches said untoothed region thereof so as to thereby cause said housing and said power drive means to translate laterally from a position lying substantially in the vertical plane containing said right leg/foot assembly to a position lying substantially in the vertical plane containing said left leg/foot assembly, whereupon coupling of said power drive means to said left rotatable pinion gear causes said trailing right leg/foot assembly to be raised off the ground and advanced into a ground-engaged position in advance of said previously leading, now trailing, left leg/foot assembly while said last named rotatable pinion gear idles in said untoothed region of said other rack.

9. An actuating system as set forth in claim 7 further including right and left clutch mechanisms non-rotatably mounted on respective ones of the right and left ends of said transverse drive shaft, said right and left clutch mechanisms including means for drivingly coupling said drive shaft and said right and left rotatable pinion gears non-rotatably mounted at the opposite ends thereof to said power drive means when said power drive means is shifted laterally on said drive shaft into engagement with the one of said right and left clutch mechanisms mounted adjacent the leading one of said right and left leg/foot assemblies so as to rotatably drive said drive shaft about its transverse axis, thereby causing: i) the one of said right and left rotatable pinion gears meshed with the one of said right and left stationary pinion gears mounted on the initially leading one of said ground-engaged right and left leg/foot assemblies to orbit about its associated meshed stationary pinion gear with the axis of said drive shaft orbiting upwardly, forwardly and downwardly about the axis of that one of said right and left stationary pinion gears mounted on the initially leading one of said ground-engaged right and left leg/foot assemblies during the first 180° of rotation of said right and left rotatable pinion gears while the other of said right and left rotatable pinion gears which is meshed with the one of said right and left stationary pinion gears mounted on the initially trailing one of said ground-engaged right and left leg/foot assemblies simultaneously orbits downwardly, rearwardly and upwardly about its associated meshed stationary pinion gear so as to cause the initially trailing one of said ground-engaged right and left leg/foot assemblies to be raised off the ground and advanced from its initially trailing position to a leading ground-engaged position and thereby complete one full step of the robot while said source of motive power is oriented in the one of said spaced parallel vertical planes containing the initially leading one of said ground-engaged right and left leg/foot assemblies so as to insure that the robot's center of gravity is located substantially in the one of said spaced parallel vertical planes containing the initially leading one of said right and left ground-engaged leg/foot assemblies; and ii), the one of said right and left rotatable pinion gears meshed with the one of said right and left stationary pinion gears mounted on the initially trailing, and now leading, one of said ground-engaged right and left leg/foot assemblies to orbit about its associated meshed stationary pinion gear with the axis of said drive shaft orbiting upwardly, forwardly and downwardly about the axis of that one of said right and left stationary pinion gears mounted on the initially trailing, and now leading, one of said ground-engaged right and left leg/foot assemblies during the second 180° of rotation of said right and left rotatable pinion gears while the other of said right and left rotatable pinion gears which is meshed with the one of said right and left stationary pinion gears mounted on the initially leading, and now trailing, one of said ground-engaged right and left leg/foot assemblies simultaneously orbits downwardly, rearwardly and upwardly about its associated meshed stationary pinion gear so as to cause the initially leading, and now trailing, one of said ground-engaged right and left leg/foot assemblies to be raised off the ground and advanced from its trailing position to a leading ground-engaged position and thereby complete a second full step of the robot while said power drive means is oriented in the one of said spaced parallel vertical planes containing the initially trailing, and now leading, one of said ground-engaged right and left leg/foot assemblies so as to insure that the robot's center of gravity is located substantially in the one of said spaced parallel vertical planes containing the initially trailing, and now leading, one of said right and left ground-engaged leg/foot assemblies.

10. An actuating system as set forth in claim 9 wherein said power drive means includes a continuously driven cylindrical rack coaxially mounted on said transversely extending drive shaft with freedom for relative rotation about said shaft and left-to-right and right-to-left translation therealong, said cylindrical rack including one of an axially directed spring-loaded detent and means defining at least one axially directed detent opening formed on or in its opposite lateral extremities, and said first and second clutch mechanisms each including the other of said axially directed spring-loaded detent and means defining at least one axially directed detent opening formed thereon or therein such that when said power drive means is shifted laterally on said transversely extending drive shaft so as to shift said continuously driven cylindrical rack towards one or the other of said first and second clutch mechanisms, said spring-loaded detent is initially depressed and as said rack rotates about its axis said depressed spring-loaded detent snaps into said means defining at least one detent opening when the two are aligned so as to establish a drive connection between said rack and the immediately adjacent one of said first and second clutch mechanisms.

11. An actuating system as set forth in claim 7 wherein at least one of said first and second leg/foot assemblies includes power-driven, selectively operable, ground-engagable means for turning the robot to either the right or to the left about a vertical axis passing through said at least one leg/foot assembly when planted on the ground, and means for activating said power-driven, selectively operable, ground-engagable means when firmly planted on the ground to cause the robot to turn to the right or to the left either when standing still or while walking.

12. A remote controlled walking robot comprising, in combination:
a) a skeletal frame including:
 i) a right leg/foot assembly;
 ii) a left leg/foot assembly; and,
 iii) means articulatably interconnecting said right and left leg/foot assemblies in such a manner that when both of said leg/foot assemblies are firmly planted on the ground, one of said leg/foot assemblies is initially advanced relative to the other of said leg/foot assemblies, and for maintaining said right and left leg/foot assemblies in respective ones of right and left spaced parallel vertical planes with freedom for the trailing one of said right and left leg/foot assemblies to be raised off the ground while the center of gravity of said robot is substantially located in the one of said right and left spaced parallel vertical planes containing the leading one of said ground-engaged right and left leg/foot assemblies for maintaining the robot's balance as said raised leg/foot assembly is advanced in the other of said right and left spaced parallel vertical planes from a trailing position to a ground-engaged leading position in advance of the initially leading one of said right and left ground-engaged leg/foot assemblies;
b) power drive means carried by said skeletal frame with freedom for right-to-left and left-to-right translation with respect thereto from one to the other of said right and left spaced parallel vertical planes;
c) right leg/foot assembly actuating means mounted on said left leg/foot assembly and drivingly coupled to said right leg/foot assembly;
d) left leg/foot assembly actuating means mounted on said right leg/foot assembly and drivingly coupled to said left leg/foot assembly;
e) means for drivingly coupling said power drive means to the one of said right and left leg/foot assembly actuating means which is mounted on the initially leading one of said right and left leg/foot assemblies while said power drive means is substantially located in the one of said right and left spaced parallel vertical planes containing the leading one of said right and left leg/foot assemblies for raising the trailing one of said right and left leg/foot assemblies from its trailing ground-engaged position and advancing said raised leg/foot assembly to a leading ground-engaged position while the robot's center of gravity remains located substantially in the one of said spaced parallel vertical planes containing the initially leading one of said right and left leg/foot assembly; and,
f) means responsive to movement of said initially trailing ground-engaged leg/foot assembly from its initially trailing position to a leading ground-engaged position in advance of said initially leading ground-engaged leg/foot assembly for shifting said power drive means laterally with respect to said skeletal frame from its initial position drivingly coupled to the one of said right and left leg/foot actuating means which is mounted on the initially leading one of said right and left leg/foot assemblies into the other of said spaced parallel vertical planes containing the initially trailing and now leading one of said right and left leg/foot assemblies so as to initiate a forward step with the initially leading, and now trailing, one of said right and left leg/foot assemblies while said power drive means and the robot's center of gravity are substantially located in the other of said spaced parallel vertical planes so as to balance said robot on the initially trailing, now leading, one of said right and left leg/foot assemblies.

13. A remote-controlled walking robot as set forth in claim 12 wherein said power drive means is mounted within a housing; front and rear, spaced apart, facing racks extend transversely through said housing between said right and left leg/foot assemblies; means for precluding lateral movement of said front and rear racks relative to said right and left leg/foot assemblies are mounted on said right and left leg/foot assemblies; one of said front and rear racks is provided with an untoothed region at the extremity thereof adjacent said right leg/foot assembly and the other of said front and rear racks is provided with an untoothed region at the extremity thereof adjacent said left leg/foot assembly; said power drive means including a driven rotatable pinion gear positioned intermediate said front and rear racks for meshed engagement with one or the other of said front and rear racks; and, said means for shifting said power drive means laterally with respect to said skeletal frame includes means for shifting said last named driven rotatable pinion gear: i) into engagement with the one of said front and rear racks having said untoothed region at the extremity thereof adjacent said right leg/foot assembly when said right leg/foot assembly is initially planted on the ground in advance of said left leg/foot assembly so as to cause said last named rotatable pinion gear to walk along said one rack with which it is engaged until it reaches said untoothed region thereof and thereby cause said housing and said power drive means to translate laterally from a position lying substantially in the vertical plane containing said left leg/foot assembly to a position lying substantially in the vertical plane containing said right leg/foot assembly, whereby coupling of said power drive means to said right rotatable pinion gear causes said trailing left leg/foot assembly to be raised off the ground and advanced into a ground-engaged position in advance of said initially leading, now trailing, right leg/foot assembly as said last named driven rotatable pinion gear idles in said untoothed region of said one rack; and ii), into engagement with the other of said front and rear racks having said untoothed region at the extremity thereof adjacent said left leg/foot assembly when said left leg/foot assembly is initially planted on the ground in advance of said now trailing right leg/foot assembly so as to cause said last named driven rotatable pinion gear to walk along said other rack with which it is engaged until it reaches said untoothed region thereof so as to thereby cause said housing and said power drive means to translate laterally from a position lying substantially in the vertical plane containing said right leg/foot assembly to a position lying substantially in the vertical plane containing said left leg/foot assembly, whereupon coupling of said power drive means to said left rotatable pinion gear causes said trailing right leg/foot assembly to be raised off the ground and advanced into a ground-engaged position in advance of said previously leading, now trailing, left leg/foot assembly while said last named rotatable pinion gear idles in said untoothed region of said other rack.

14. A remote-controlled walking robot as set forth in claim 12 wherein at least one of said first and second leg/foot assemblies includes power-driven, selectively operable, ground-engagable means for turning the robot and said skeletal frame to either the right or to the left about a vertical axis passing through said at least one leg/foot assembly when planted on the ground, and means for activating said power-driven, selectively operable, ground-engagable means when firmly planted on the ground to cause the robot to turn to the right or to the left either when standing still or while walking.

15. An actuating system for: i) raising the trailing first one of a pair of spaced first and second ground-engaged vertical support elements off the ground and advancing the raised first support element to a ground-engaged position in advance of the initially leading, and now trailing, second vertical support element; ii) raising the initially leading, and now trailing, second vertical support element and advancing the raised second vertical support element to a ground-engaged position in advance of the initially trailing, and now leading, first vertical support element; and iii), alternately raising and advancing such first and second vertical support elements to simulate a walking gait, said actuating system comprising, in combination:

a) first and second ground-engaged vertical support elements lying in respective different ones of first and second spaced parallel vertical planes;

b) first and second stationary pin-ion gears fixedly mounted on respective different ones of said first and second vertical support elements and lying in a common first horizontal plane;

c) a horizontally disposed drive shaft lying in said common first horizontal plane and in a first transverse vertical plane extending between said first and second spaced parallel vertical planes;

d) first and second rotatable pinion gears non-rotatably secured to the opposite ends of said horizontal drive shaft;

e) first means for maintaining said first rotatable pinion gear in meshed relation with said first stationary pinion gear with said first stationary pinion gear and said first vertical ground-engaged support element lying in a second transverse vertical plane spaced from and aft of said first transverse vertical plane;

f) second means for maintaining said second rotatable pinion gear in meshed relation with said second stationary pinion gear with said second stationary pinion gear and said second ground-engaged vertical support element lying in a third transverse vertical plane spaced from and forward of said first transverse vertical plane;

g) power drive means mounted on said horizontal drive shaft with freedom for lateral translation therealong between first and second laterally spaced positions substantially lying in said first and second spaced parallel vertical planes;

h) means for drivingly coupling said power drive means to said second rotatable pinion gear meshed with said second stationary pinion gear fixedly secured to said second vertical support element lying in said third transverse vertical plane so as to cause said second rotatable pinion gear to walk about the upper periphery of said second stationary pinion gear with which it is meshed while simultaneously transmitting rotational drive through said transverse drive shaft to said first rotatable pinion gear to cause said first rotatable pinion gear to simultaneously walk about the lower peripheral half of said first stationary pinion gear with which it is meshed whereby said driven drive shaft and said first and second rotatable pinion gears are moved out of said common first horizontal plane and said first transverse vertical plane into a second horizontal plane disposed above said first common horizontal plane and into said third transverse vertical plane while said first stationary pinion gear is simultaneously raised to a third horizontal plane disposed above said second horizontal plane to thereby lift said first vertical support element off the ground and advance it from said second transverse vertical plane into said third transverse vertical plane with all of said pinion gears and said first and second vertical support elements lying in the same third transverse vertical plane and to thereafter cause said first and second rotatable pinion gears to continue to walk about respective ones of the lower and upper peripheral halves on respective ones of said first and second stationary pinion gears with which they are meshed until such time as the raised first vertical support element is again replanted on the ground with all of said gears and said horizontal drive shaft again lying in said first common horizontal plane, said second stationary pinion gear and said second vertical support element initially lying in said third transverse vertical plane remaining in said third transverse vertical plane, said drive shaft and said first and second rotatable pinion gears having been shifted out of said first transverse vertical plane and now lying in a fourth transverse vertical plane spaced from and forward of said third transverse vertical plane; and said first pinion gear and said first vertical support element having been shifted out of said second transverse vertical plane and now lying in a fifth transverse vertical plane spaced from and forward of said fourth transverse vertical plane; and, i) means responsive to movement of said drive shaft from said second horizontal plane and said third transverse vertical plane back into said first common horizontal plane and said fourth transverse vertical plane for: i) uncoupling said power drive means from said second rotatable pinion gear; ii) translating said power drive means laterally into said first spaced parallel vertical plane; and iii), drivingly coupling said power drive means to said first rotatable pinion gear so as to raise said second ground-engaged vertical support element disposed in said third transverse vertical plane off the ground and advance it into a ground-engaged position spaced forwardly from said first vertical support element disposed in said fifth transverse vertical plane.

16. An actuating system as set forth in claim 15 wherein said power drive means is mounted within a housing; front and rear, spaced apart, facing racks extend transversely through said housing between said first and second vertical support elements; means for precluding lateral movement of said front and rear racks relative to said first and second vertical support elements are mounted on said first and second vertical support elements; one of said front and rear racks being provided with an untoothed region at the extremity thereof adjacent said first vertical support element and the other of said front and rear racks being provided with an untoothed region at the extremity thereof adjacent said second vertical support element; said power drive means including a driven rotatable pinion gear positioned intermediate said front and rear racks for meshed engagement with one or the other of said front and rear racks; and, said means for translating said power drive means laterally on said drive shaft includes means for shifting said last named driven rotatable pinion gear: i) into engagement with the one of said front and rear racks having said untoothed region at the extremity thereof adjacent said first vertical support element when said first vertical support element is initially planted on the ground in advance of said second vertical support element so as to cause said last named rotatable pinion gear to walk along said one rack with which it is engaged until it reaches said untoothed region thereof and thereby cause said housing and said power drive means to translate laterally from a position lying substantially in the vertical plane containing said second vertical support element to a position lying substantially in the vertical plane containing said first vertical support element, whereby coupling of said power drive means to said first rotatable pinion gear causes the trailing second vertical support assembly to be raised off the ground and advanced into a ground-engaged position in advance of the initially leading, now trailing, first vertical support element as said last named driven rotatable pinion gear idles in said untoothed region of said one rack; and ii), into engagement with the other of said front and rear racks having said untoothed region at the extremity thereof adjacent said second vertical support element when said second vertical support element is initially planted on the ground in advance of said now trailing first vertical support element so as to cause said last named driven rotatable pinion gear to walk along said other rack with which it is engaged until it reaches said untoothed region thereof so as to thereby cause said housing and said power drive means to translate laterally from a position lying substantially in the vertical plane containing said first vertical support element to a position lying substantially in the vertical plane containing said second vertical support element, whereupon coupling of said power drive means to said second rotatable pinion gear causes said trailing first vertical support element to be raised off the ground and advanced into a ground-engaged position in advance of the previously leading, now trailing, second vertical support element while said last named rotatable pinion gear idles in said untoothed region of said other rack.

17. An actuating system as set forth in claim 15 further including first and second clutch mechanisms non-rotatably mounted on respective ones of the opposite ends of said drive shaft, said first and second clutch mechanisms including means for drivingly coupling said drive shaft and said first and second rotatable pinion gears non-rotatably mounted at the opposite ends thereof to said power drive means when said power drive means is shifted laterally on said drive shaft into engagement with the one of said first and second clutch mechanisms mounted adjacent the leading one of said first and second vertical support elements so as to rotatably drive said drive shaft about its axis, thereby causing: i) the one of said first and second rotatable pinion gears meshed with the one of said first and second stationary pinion gears mounted on the initially leading one of said ground-engaged first and second vertical support elements to orbit about its associated meshed stationary pinion gear with the axis of said drive shaft orbiting upwardly, forwardly and downwardly about the axis of that one of said first and second stationary pinion gears mounted on the initially leading one of said ground-engaged first and second vertical support elements during the first 180° of rotation of said first and second rotatable pinion gears while the other of said first and second rotatable pinion gears which is meshed with the one of said first and second stationary pinion gears mounted on the initially trailing one of said ground-engaged first and second vertical support elements simultaneously orbits downwardly, rearwardly and upwardly about its associated meshed stationary pinion gear so as to cause the initially trailing one of said ground-engaged first and second vertical support elements to be raised off the ground and advanced from its initially trailing position to a leading ground-engaged position and thereby complete one full step while said power drive means is oriented in the one of said first and second spaced parallel vertical planes containing the initially leading one of said ground-engaged first and second vertical support elements so as to insure that the center of gravity is located substantially in the one of said first and second spaced parallel vertical planes containing the initially leading one of said first and second ground-engaged vertical support elements; and ii), the one of said first and second rotatable pinion gears meshed with the one of said first and second stationary pinion gears mounted on the initially trailing, and now leading, one of said ground-engaged first and second vertical support elements to orbit about its associated meshed stationary pinion gear with the axis of said drive shaft orbiting upwardly, forwardly and downwardly about the axis of that one of said first and second stationary pinion gears mounted on the initially trailing, and now leading, one of said ground-engaged first and second vertical support elements during the second 180° of rotation of said first and second rotatable pinion gears while the other of said first and second rotatable pinion gears which is meshed with the one of said first and second stationary pinion gears mounted on the initially leading, and now trailing, one of said ground-engaged first and second vertical support elements simultaneously orbits downwardly, rearwardly, and upwardly about its associated meshed stationary pinion gear so as to cause the initially leading, and now trailing, one of said ground-engaged first and second vertical support elements to be raised off the ground and advanced from its trailing position to a leading ground-engaged position and thereby complete a second full step while said power drive means is oriented in the one of said first and second spaced parallel vertical planes containing the initially trailing, and now leading, one of said ground-engaged first and second vertical support elements so as to insure that the center of gravity is located substantially in the one of said first and second spaced parallel vertical planes containing the initially trailing, and now leading, one of said first and second ground-engaged vertical support elements.

18. An actuating system as set forth in claim 17 wherein said power drive means includes a continuously driven cylindrical rack coaxially mounted on said horizontal drive shaft with freedom for relative rotation about said shaft and left-to-right and right-to-left translation therealong, said cylindrical rack including one of an axially directed spring-loaded detent and means defining at least one axially directed detent opening formed on or in its opposite lateral extremities, and said first and second clutch mechanisms each including the other of said axially directed spring-loaded detent and means defining at least one axially directed detent opening formed thereon or therein such that when said power drive means is shifted laterally on said drive shaft so as to shift said continuously driven cylindrical rack towards one or the other of said first and second clutch mechanisms, said spring-loaded detent is initially depressed and as said rack rotates about its axis said depressed spring-loaded detent snaps into said means defining at least one detent opening when the two are aligned so as to establish a drive connection between said rack and the immediately adjacent one of said first and second clutch mechanisms.

19. An actuating system as set forth in claim 15 wherein at least one of said first and second vertical support elements includes power-driven, selectively operable, ground-engagable means for turning said first and second vertical support elements to either the right or to the left about a vertical axis passing through said at least one vertical support element when planted on the ground, and means for activating said power-driven, selectively operable, ground-engagable means when firmly planted on the ground to cause said vertical support elements to turn to the right or to the left either when standing still or while walking.

20. The method of controlling a multi-legged robot having:
i) skeletal frame including first and second leg/foot assemblies articulatably interconnected in such a manner that when both leg/foot assemblies are firmly planted on the ground, the first leg/foot assembly is advanced relative to the second leg/foot assembly, and wherein the first and second leg/foot assemblies are maintained in respective ones of first and second spaced parallel vertical planes at all times with freedom for movement relative to one another;
ii) a first actuating mechanism mounted on the first leg/foot assembly and adapted to be drivingly coupled to the second leg/foot assembly for raising the second leg/foot assembly from a ground-engaged position aft of the first leg/foot assembly and advancing it to a ground-engaged position forward of the first leg/foot assembly;
iii) a second actuating mechanism mounted on the second leg/foot assembly and adapted to be drivingly coupled to the first leg/foot assembly for raising the first leg/foot assembly from a ground-engaged position aft of the second leg/foot assembly and advancing it to a ground-engaged position forward of the second leg/foot assembly; and,
iv) a remotely operated power drive mechanism carried by the skeletal frame with freedom for right-to-left and left-to-right movement with respect thereto from one to the other of the first and second spaced parallel vertical planes; so as to enable the robot to walk, said method comprising the steps of:
a) shifting the power drive mechanism laterally into the first spaced parallel vertical plane containing the initially leading ground-engaged first leg/foot assembly so as to position the robot's center of gravity substantially in the first spaced parallel vertical plane containing the initially leading ground-engaged first leg/foot assembly;
b) coupling the power drive mechanism to the first actuating mechanism mounted on the initially leading ground-engaged first leg/foot assembly so as to cause the initially trailing second leg/foot assembly to be raised off of the ground and advanced relative to the initially leading first leg/foot assembly from a ground-engaged position aft thereof to a ground-engaged position forward thereof so as to complete a first forward step with the second leg/foot assembly;
c) uncoupling the power drive mechanism from the first actuating mechanism mounted on the initially leading ground-engaged first leg/foot assembly in response to replanting of the initially trailing second leg/foot assembly on the ground in advance of the initially leading, now trailing, first leg/foot assembly;
d) shifting the power drive mechanism laterally into the second spaced parallel vertical plane containing the initially trailing, now leading, second leg/foot assembly so as to position the robot's center of gravity substantially in the second spaced parallel vertical plane containing the initially trailing., now leading, second ground-engaged leg/foot assembly;

e) coupling the power drive mechanism to the second actuating mechanism mounted on the initially trailing, now leading, ground-engaged second leg/foot assembly so as to cause the initially leading, now trailing, first leg/foot assembly to be raised off of the ground and advanced relative to the initially trailing, now leading, ground-engaged second leg/foot assembly from a ground-engaged position aft thereof to a ground-engaged position forward thereof so as to complete a second forward step with the first leg/foot assembly;

f) uncoupling the power drive mechanism from the second actuating mechanism mounted on the initially trailing, then leading, and now again trailing one of the ground-engaged second leg/foot assembly in response to replanting of the initially leading, then trailing, and now again leading first leg/foot assembly on the ground in advance of the now trailing second ground-engaged leg/foot assembly; and, g) iterating steps (a) through (f) in sequence so as to cause the robot to walk in a forward direction.

21. The method as set forth in claim 20 wherein the robot includes a ground-engagable reversible turning mechanism at the bottom of at least one of the first and second leg/foot assemblies; and, activating the reversible turning mechanism when the at least one of the first and second leg/foot assemblies is firmly planted on the ground so as to cause the robot to turn either to the right or to the left about a vertical axis passing through the at least one leg/foot assembly and the power drive mechanism then resident in the vertical plane containing the at least one leg/foot assembly.

* * * * *